(12) United States Patent
Chirnomas et al.

(10) Patent No.: US 7,334,701 B2
(45) Date of Patent: Feb. 26, 2008

(54) ARTICLE STORAGE MAGAZINE FOR AN ARTICLE HANDLING DEVICE

(76) Inventors: Munroe Chirnomas, 47 Sky Line Dr., Morristown, NJ (US) 07960; David K. Giegerich, 540 Westwood Ave., River Vale, NJ (US) 07675; Raymond B. Leski, 1082 June Ct., Toms River, NJ (US) 08753

( * ) Notice: Subject to any disclaimer, the term of this patent is extended or adjusted under 35 U.S.C. 154(b) by 301 days.

(21) Appl. No.: 10/517,896

(22) PCT Filed: Jun. 13, 2003

(86) PCT No.: PCT/US03/18888

§ 371 (c)(1),
(2), (4) Date: Jun. 9, 2005

(87) PCT Pub. No.: WO03/106311

PCT Pub. Date: Dec. 24, 2003

(65) Prior Publication Data

US 2005/0211721 A1 Sep. 29, 2005

Related U.S. Application Data

(60) Provisional application No. 60/419,168, filed on Oct. 16, 2002, provisional application No. 60/388,620, filed on Jun. 13, 2002.

(51) Int. Cl.
*B65H 1/00* (2006.01)
(52) U.S. Cl. .................. 221/197; 221/104; 221/92; 221/254

(58) Field of Classification Search ............... 221/104, 221/197, 254, 92
See application file for complete search history.

(56) References Cited

U.S. PATENT DOCUMENTS

| | | | |
|---|---|---|---|
| 2,694,505 A | 11/1954 | Hedges | |
| 3,019,941 A | 2/1962 | Gabrielsen | |
| 3,090,521 A | 5/1963 | Fazekas | |
| 3,110,417 A | 11/1963 | Wingate et al. | |
| 3,184,104 A | 5/1965 | De Domenico | |
| 3,194,432 A * | 7/1965 | Breitenstein et al. | 221/82 |
| 4,057,171 A * | 11/1977 | Hatori et al. | 221/6 |
| 4,236,649 A | 12/1980 | Fellner et al. | |
| 5,259,530 A * | 11/1993 | Ishine et al. | 221/68 |
| 5,460,294 A | 10/1995 | Williams | |
| 5,509,573 A | 4/1996 | Campoli | |
| 5,690,251 A | 11/1997 | Wade | |
| 5,997,236 A * | 12/1999 | Picioccio et al. | 221/197 |
| 6,330,958 B1 | 12/2001 | Ruskin et al. | |
| 6,367,653 B1 | 4/2002 | Ruskin et al. | |
| 2002/0117510 A1 | 8/2002 | Simson et al. | |

* cited by examiner

*Primary Examiner*—Gene O. Crawford
*Assistant Examiner*—Timothy Waggoner
(74) *Attorney, Agent, or Firm*—Lawrence C. Edelman

(57) ABSTRACT

An article handling apparatus having an article storage area (215) includes a movable storage structure (219). The movable storage structure (219) has a bin segment guidance structure to form a plurality of axially aligned article storage columns (216). The guidance structure includes a receiving device providing individual coupling to article storage bin segments (1202) so as to allow grouping of bin segments into the plurality of aligned article storage columns.

32 Claims, 35 Drawing Sheets

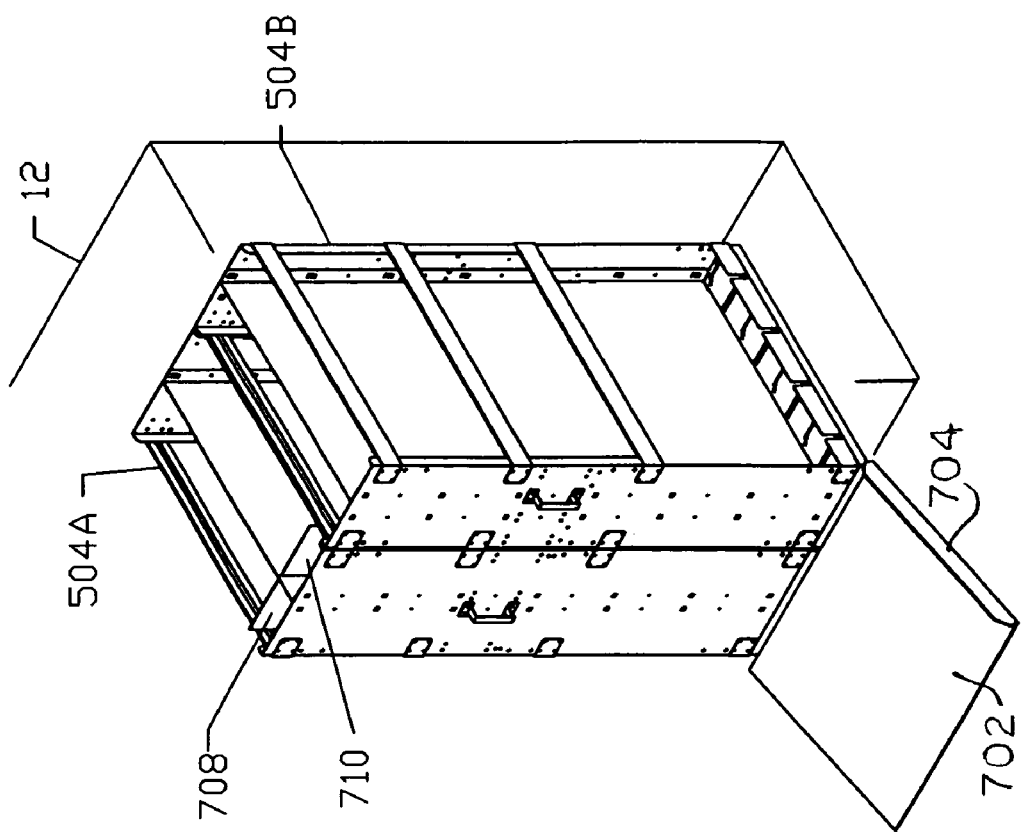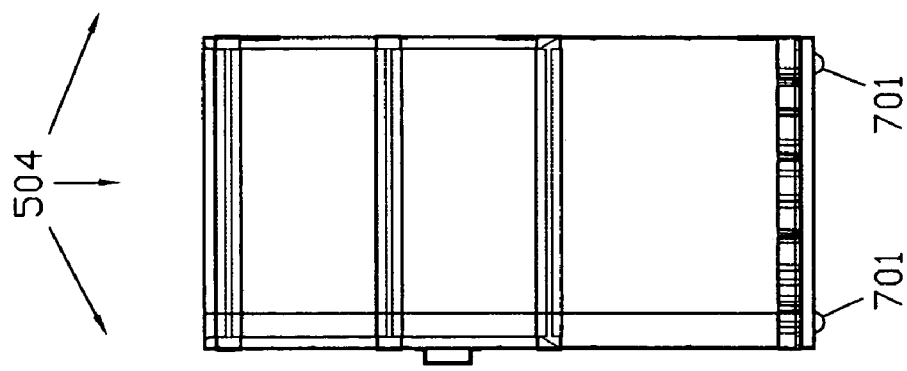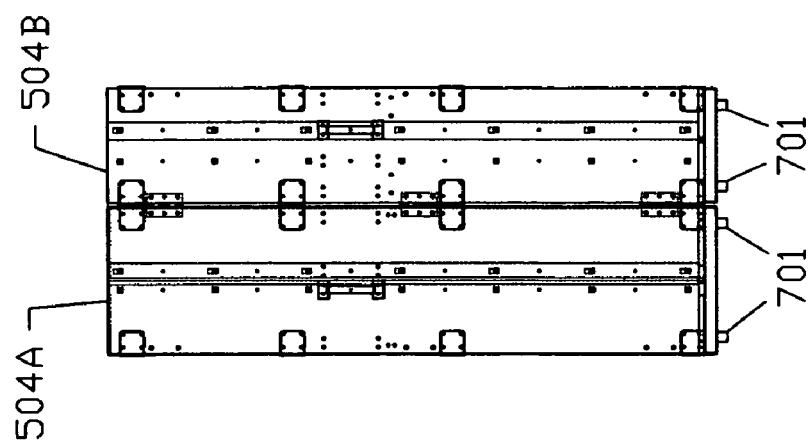
FIG. 7A

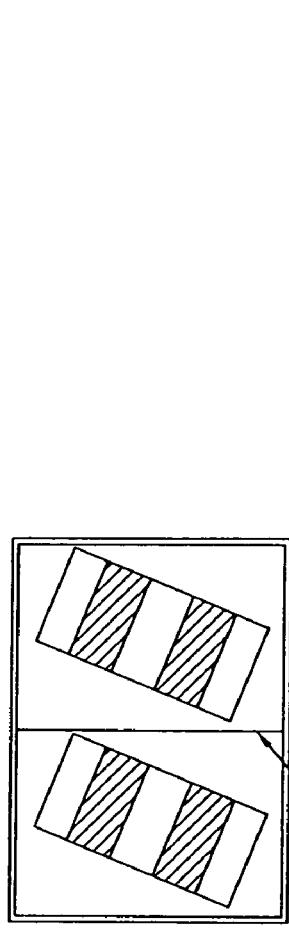
FIG.18
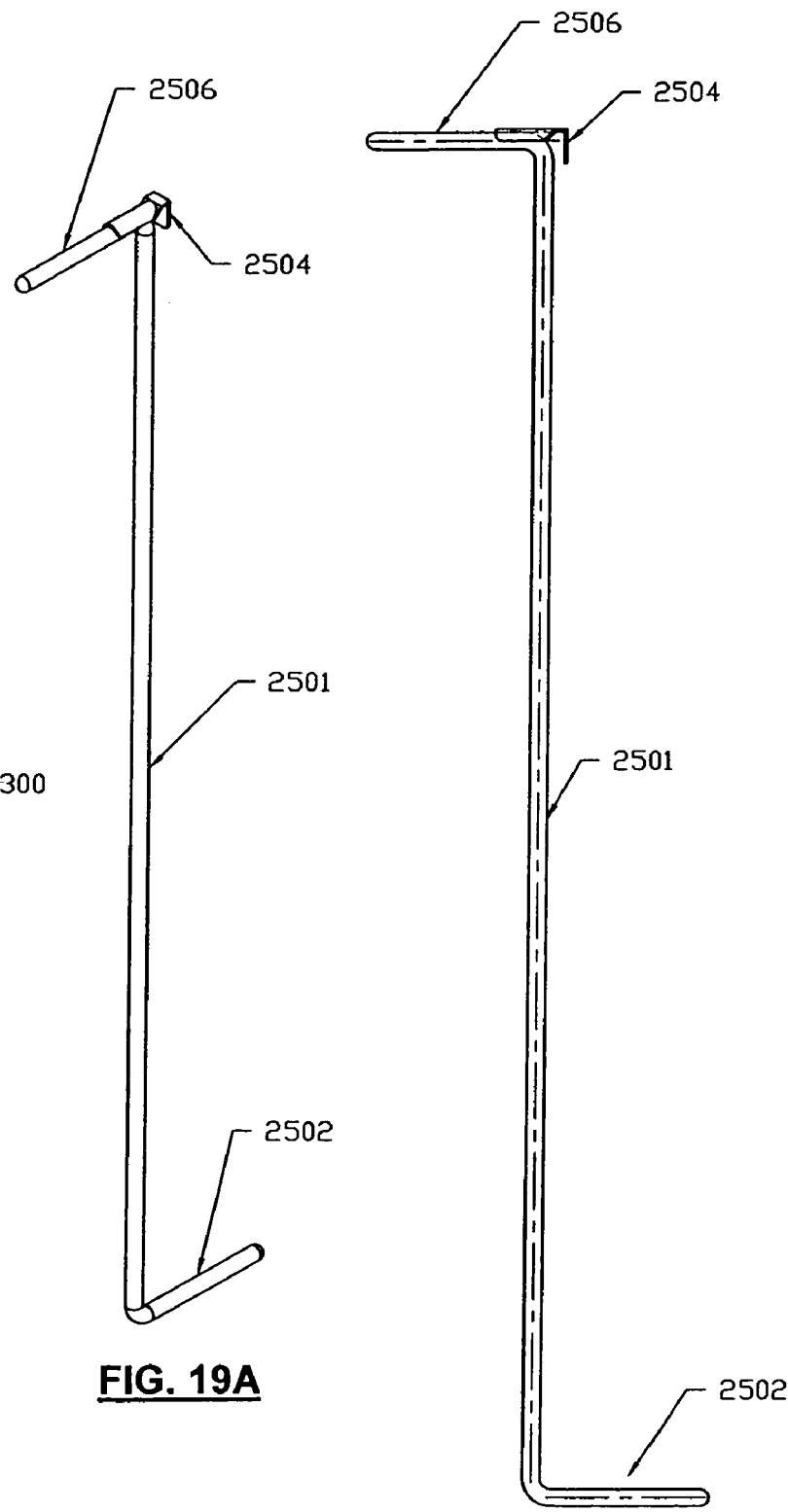
FIG. 19A
FIG. 19B

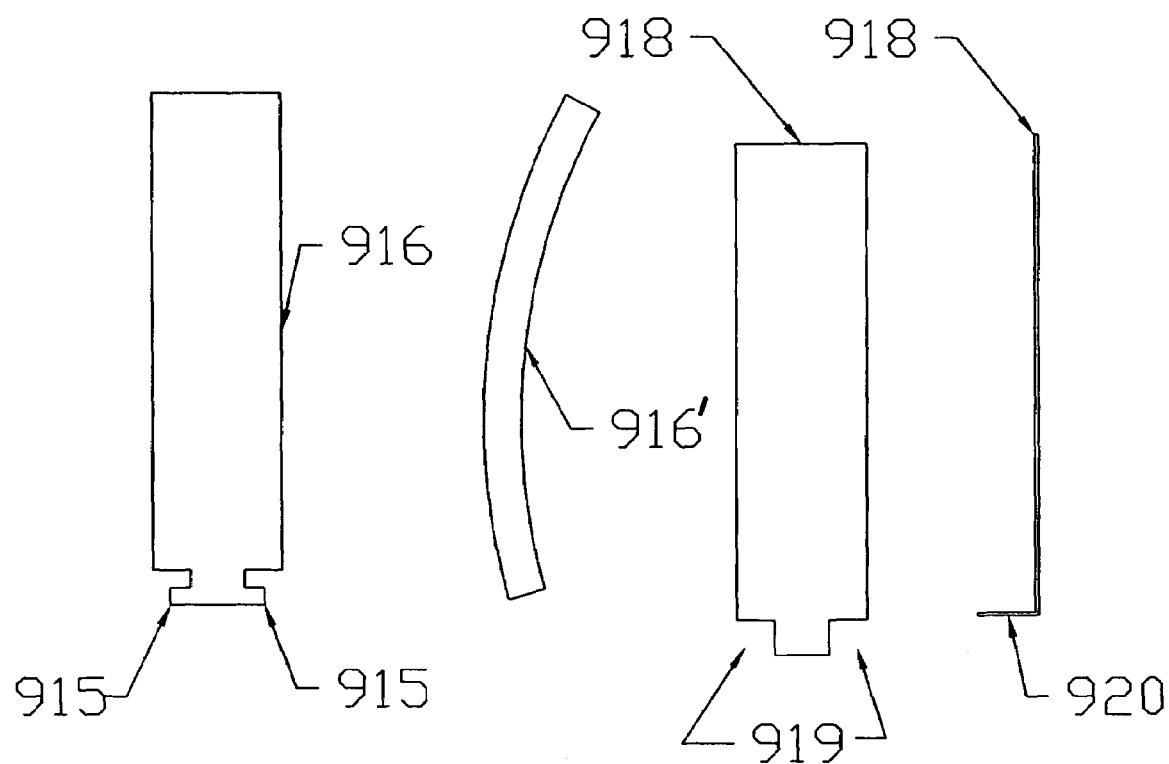
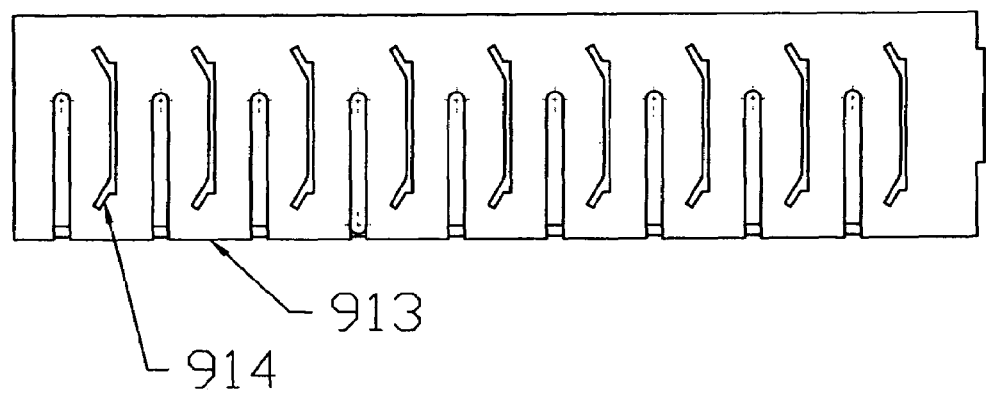
FIG. 20A

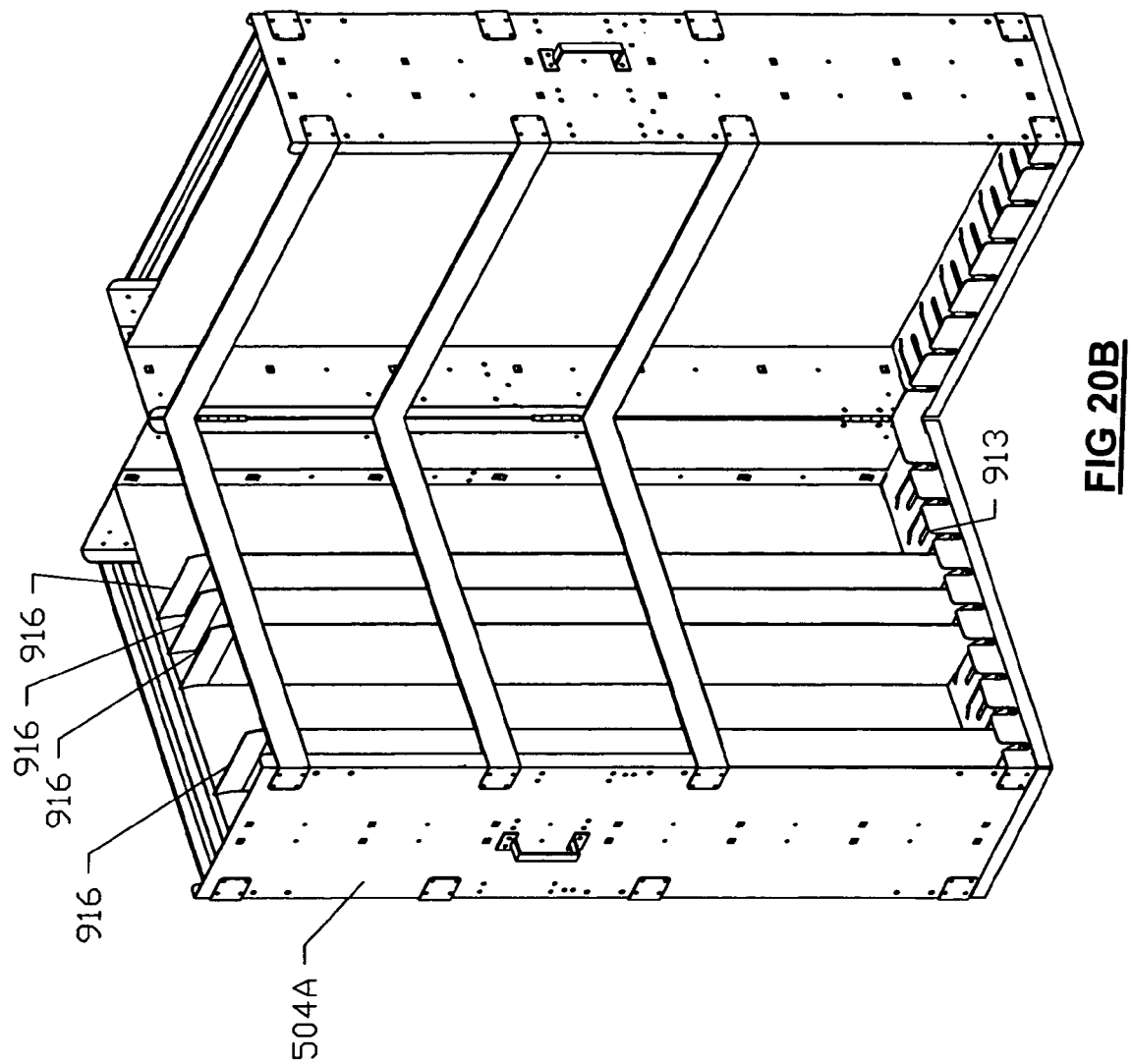

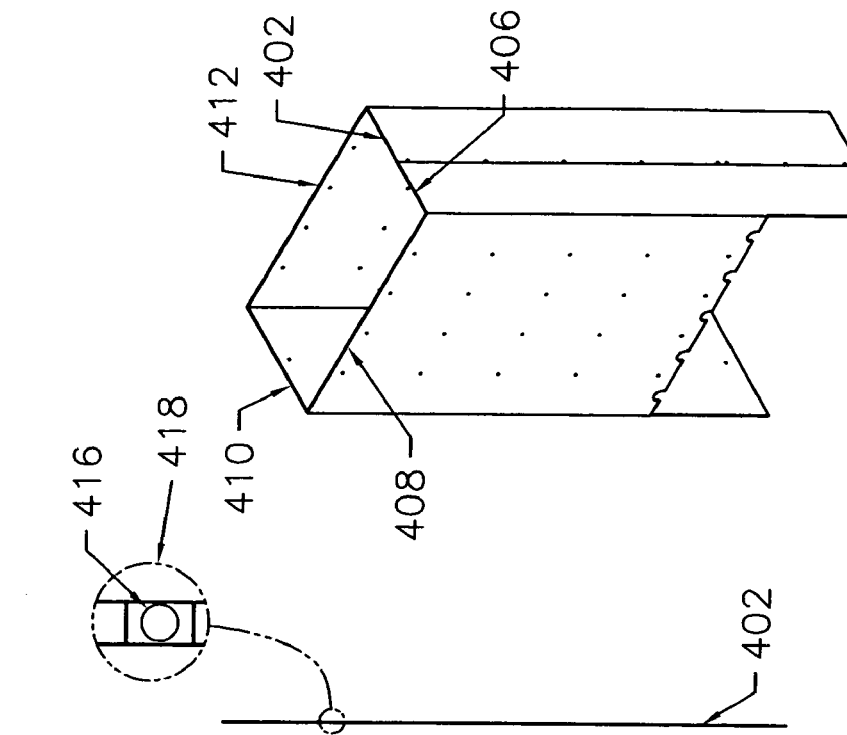
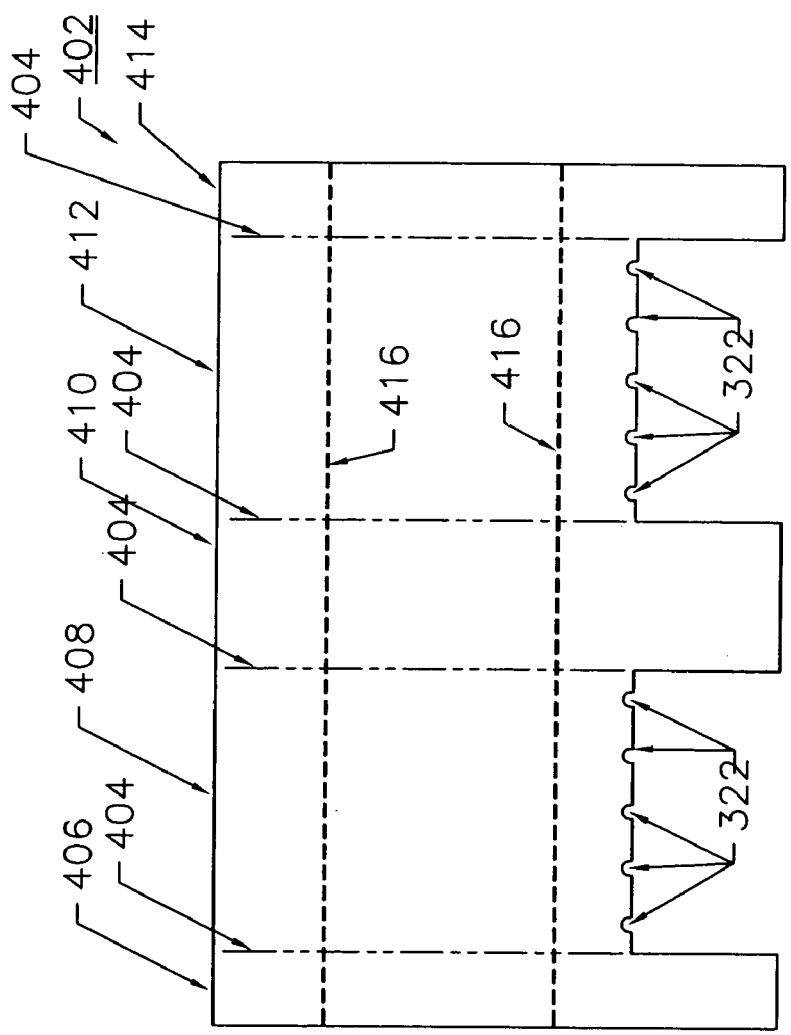
FIG. 23C
FIG. 23B
FIG. 23A

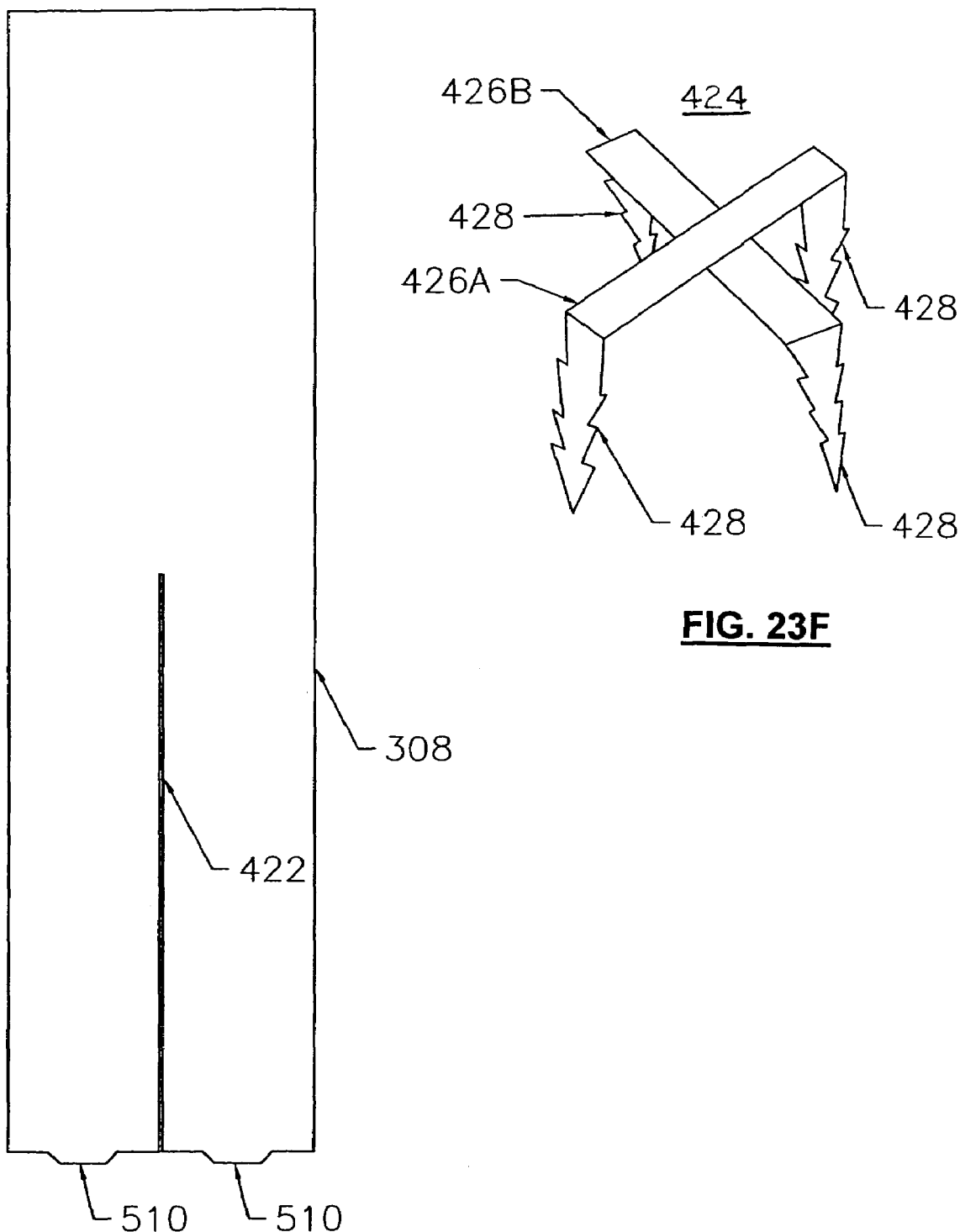

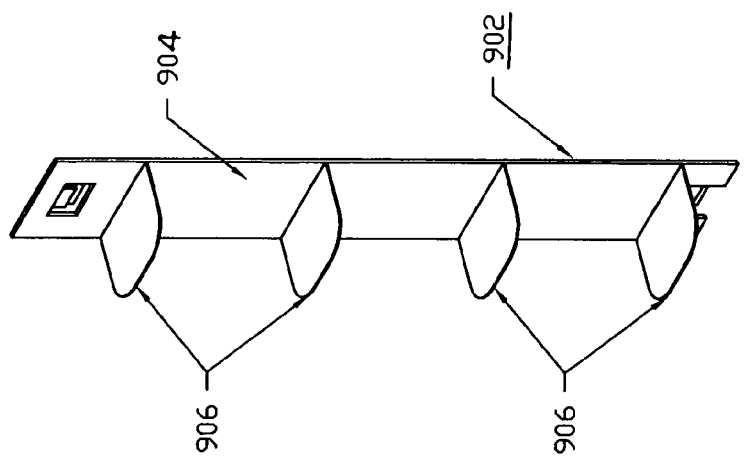
FIG. 28A
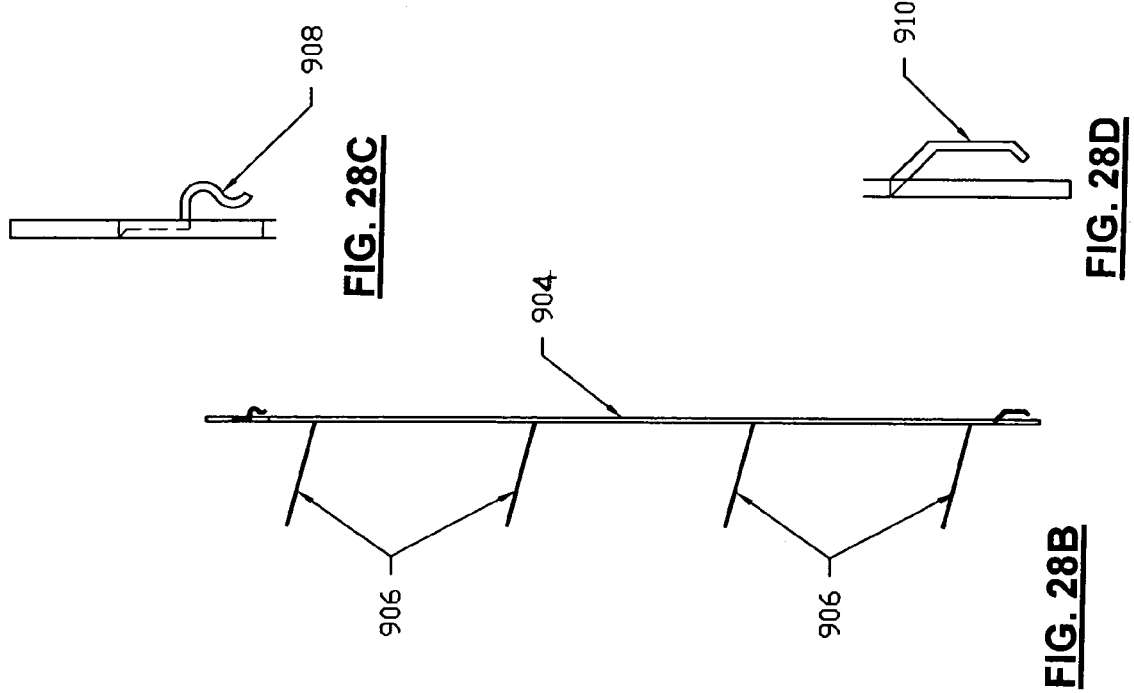
FIG. 28C
FIG. 28D
FIG. 28B
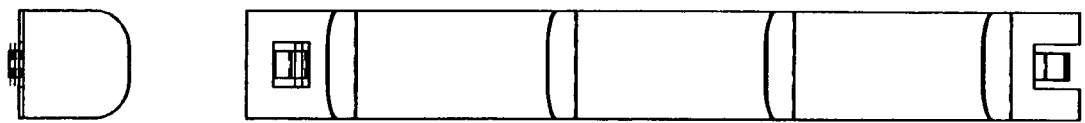

ARTICLE STORAGE MAGAZINE FOR AN ARTICLE HANDLING DEVICE

CROSS-REFERENCE TO RELATED APPLICATIONS

For U.S. purposes, this application claims priority under 35USC 120 of U.S. Provisional Patent Application No. 60/419,168, filed Oct. 16, 2002, entitled Article Storage Magazine For An Article Handling Device, claims priority under 35USC 120 of U.S. Provisional Patent Application No. 60/388,620, filed Jun. 13, 2002, entitled Article Storage Method and Apparatus for an Article Handling Machine. A significant portion of this application also has subject matter related to my PCT Application PCT/US01/16847. The entire disclosure of each of these patent applications are incorporated herein by reference in their entirety

BACKGROUND OF THE INVENTION

Field of the Invention

The present invention relates generally to improvements in the design and operation of an article storage area adapted for use with an article handling apparatus, such as a vending machine, as well as methods and systems useful therewith. The invention is particularly useful for transporting, storing and/or handling articles to be positioned in a columnar/stacked manner, and in some embodiments is particularly useful for handling fragile articles or packaging for such articles, such as candy bars or bags of potato chips. The methods and apparatus of the invention provide for quick, accurate and reliable filling of the article storage area of the article handling apparatus, and is particularly advantageous when a large number of articles are required to be handled.

BACKGROUND INFORMATION AND DESCRIPTION OF THE RELATED ART

Most prior art article handling mechanisms, more specifically referred to in the description of the present invention as being in the environment of a point-of-sale (POS) article dispenser, rely on a multitude of motors, switches and solenoids for moving various portions of the handling mechanism, and handling/retrieving of the articles themselves, such as packaged articles. Such machines typically require one motor, switch and/or solenoid dedicated for each row, column or type of article or package to be handled or dispensed therefrom. Such handling mechanisms conventionally comprise one or more of gates, elevators, conveyor belts or spiral wires. Machines of this type generally suffer from numerous disadvantages, such as poor reliability due to mechanical failures, difficulty making accommodations for differently sized packaged articles, time-consuming individual article handling for refilling of the storage area of the article dispenser, etc., as well known by those skilled in this art.

U.S. Pat. No. 5,240,139 represents a significant improvement in article handling devices. It describes the use of a negative air pressure lifter (i.e., article pickup or handling mechanism), which uses suction, i.e., a reduced or so-called "negative" air pressure created by a partial vacuum, for making a secure contact to an article to be retrieved by entering the open top of an article storage bin located in a refrigerated storage area of a vending machine. Thereafter, the article pickup mechanism moves the selected article from the storage area to a dispensing area. Although robotic, and specifically suction-type pickup mechanisms are in common use in factory settings, where space limitations are generally relaxed, their use in tight confines, such as an article vending machine, has not gained wide acceptance. Due to the greater reliability and versatility of vending machines of the type which utilizes suction technology for grasping and moving selected articles, it would be desirable to develop new techniques and methods for use with such machines, as well as for other more generalized article handling mechanisms.

Article storage is provided in the forenoted U.S. Pat. No. 5,240,139 by arranging a plurality of vertically aligned article storage columns or bins within a freezer compartment located in a storage area of the dispenser housing. Since the articles to be dispensed were frozen, the weight presented on the articles stored in a lower portion of the bin, by the stack of articles stored above, did not present a article crushing problem. In some applications however, such as those that do not use a freezer compartment, the articles stored in the bins may be fragile (such as flexible bags containing potato chips or chocolate bars), and some provision would be necessary to prevent crushing of the articles stored near the bottom of the bin. Even if article storage in the dispenser used horizontal placement of the article storage bins, fragile articles loaded in the bins could still be damaged during transportation of pre-loaded storage bins from an article storage warehouse or place of article manufacture, to the storage area in the article dispenser mechanism. It is desirable to make the article storage bins so that they have the most capacity possible, for example, by making the bins taller. However, replenishing of the bins with articles to be vended becomes more difficult as the length of the bins increases.

Furthermore, when the article storage bins store articles which are date sensitive, i.e. which may get stale with the passage of time, it would be desirable to provide means which would ensure that refilling/filling of partially empty bins are not only accomplished in a simple and reliable manner, but in a manner which preserves the filling order of the articles in the bins, i.e. in a manner which maintains a FIFO (First In, First Out) dispensing order. FIFO removal of the article from the article storage bins helps to insure the quality of the article dispensed to the consumer. It is noted, however, that when taller, higher capacity, bins are used, maintaining a FIFO requirement during refilling is exacerbated because refilling must be done at an end of the bin which is opposite the dispensing end. Even when dispensing is from an open-top end of the bin, access to the interior of the bin for refilling/filling must be provided at an end of the bin which is opposite from the dispensing end, i.e., at the bottom of the bin. Furthermore, each bin must be individually handled for refilling.

U.S. Pat. No. 4,236,649 entitled Compact Vending Machine describes the use of a movable article storage array (such as a 10×10 array of cubicles) for holding goods to be dispensed, which is selectively replaceable into the storage area of a small table-top vending machine for refilling the machine with replacement articles. The goods are dispensed from the storage array by trap doors which form the bottom portion of each cubicle in the array. Although such an arrangement allows for a rapid refilling of the vending machine with goods, because a significant part of the dispensing mechanism is embodied in the array, i.e., the trap doors and the associated hinges and actuators needed for enabling its controlled and selective dispensing operation, this technique is undesirable because of the complexity and cost of the replaceable array.

U.S. Pat. No. 6,330,958 entitled Compact Table-Top Vending Machine extends the concept of a replaceable goods holding/dispensing mechanism to what are known as "spiral" vendors. Spiral vendors typically have several goods holding horizontal shelves, each shelf having a parallel array of dispensing mechanisms comprised of a stiff wire spiral, whereby the goods to be dispensed are loaded into the spaces between adjacent turns of the spiral wire. Rotation of the wire spiral results in advancing of the goods to the end of the spiral, whereby the end good is dispensed when it falls out from the open end of the spiral. In this prior art patent, the plurality of horizontal shelves are combined into a single replaceable magazine, so that a plurality of the shelves can be reloaded with goods at a remote location, and by replacing the magazine, all of those shelves are refilled with goods. As with the forenoted U.S. patent, although such an arrangement allows for a rapid refilling of the vending machine with goods, because a significant part of the dispensing mechanism, i.e., the spiral wire dispenser mechanism needed for moving the goods to the end of the storage shelves, is also included in the replaceable goods holding/dispensing mechanism, this arrangement also suffers from undesirable complexity and increased cost. Additionally, it requires careful attention to positioning during replacement to ensure that the motors that activate the spiral dispensing mechanism are properly engaged into spirals of the replaceable goods holding/dispensing mechanism.

Inventor Chirnomas' prior PCT patent Application PCT/U01/16847 entitled Method and Apparatus for Storing Articles For Use With An Article Handling Device (incorporated herein by reference for at least US purposes), describes an article handling device that stores the articles to be dispensed in simple columnar guidance structures, such as bins, and uses a dispensing mechanism of the type that travels into the article storage bins in order to retrieve an article to be dispensed. In one embodiment the dispensing mechanism comprises a suction hose, but in practice can be any type of article grasping device.

This prior PCT patent Application discloses the use of a "macrobox" which groups together a plurality of the article storage bins for simultaneously moving bins, thereby simplifying and facilitating the handling of groups of the articles to be vended. It also discloses the use of bin segments for facilitating a more rapid and trouble free re-loading of individual ones of the article storage bins, as well as help insure FIFO article reloading.

OBJECTS OF THE INVENTION

It would be desirable to provide a method and apparatus which develops even further the basic techniques as disclosed in this PCT patent application.

Such improvements have as goals a standardization of the size of the article storage bins, so as to help obtain lower cost storage system components, as well as reducing errors during reloading and allowing a pre-set programming of the dispenser to be used after the article storage bins have been moved during the reloading process. However, it is also important that the article storage system have a very high article storage capacity, which leads to high packing densities. Such high article storage densities make it difficult to provide easy access into the storage system for the purpose of reloading it with fresh articles. If one were to break-up the storage system into multiple parts to aid accessibility for reloading, the multiple parts may lead to physical instability of the system. An additional goal of such a system is to have FIFO article reloading, which can be aided by having the articles only removed from one end of the storage columns. With such a system, the goals of accessibility and high density are not ordinarily compatible with the FIFO goal, since, for example, to help ensure FIFO, reloading should be from an end of the columns which is opposite to the dispensing end, yet that opposite end is ordinarily not accessible.

BRIEF SUMMARY OF THE INVENTION

In accordance with one aspect of the present invention, an article handling apparatus having a article storage area includes a movable article storage structure adapted for being positioned therein. The movable article storage structure includes a bin-segment guidance structure adapted for individually guiding groups of articles to be handled, i.e., article storage bin-segments which are preloaded with articles, so as to form therewith a plurality of axially aligned article storage columns. The guidance apparatus includes a receiving device which provides individual coupling to the article storage bin-segments, so as to allow grouping of the article storage segments into the plurality of axially aligned article storage columns. Once received, the bin-segments are individually guided by the guidance apparatus from one end of the column, along the longitudinal axis of the column, in a direction toward an article grasping portion of the article handling apparatus which is adjacent an opposed end of the column. In one embodiment, the article storage structure comprises a combination of at least two bin-segment guidance structures connected together by a hinging arrangement for allowing an arcuate movement therebetween so as to "open" and "close" the hinged combination of bin-segment guidance structures. Each hinged combination may include two back-to-back rows of columns, so that the movable article structure can be moved at least partially out of the storage area and then opened up, thereby providing access to the columns on both inside and outside facing walls of the hinged combination. With this arrangement, all of the bins stored therein can be easily accessed. After such access is complete, the hinged structure can be "closed" and moved, by i.e., sliding or using wheels, fully into the storage area of the handler.

In accordance with another aspect of this invention, a weight bearing support used to assist the movement of the movable article storage structure into and out of the storage area provides a movable coupling between the movable article storage structure and a fixed portion of the article handling apparatus. Such weight bearing support may be positioned above, to the side or below the movable article storage structure. An example of one such support would be a ramp or other guide, such as linear of folding slides. If a ramp is used, it may include one or more raised walls at one or more perimeter edge thereof that serves to guide the structure during its movement into and out of the storage area. Such wall may also serve to protrude into the storage area and reside therein against the movable storage structure, so as to maintain the storage structure at a predetermined position within the storage area during operation of the article handling apparatus. This maintenance of a predetermined position allows the same programming of the handler "memory" of the column positions before the reloading, to be used after the reloading.

This arrangement provides a method and apparatus for quickly, easily and accurately transporting and placing a large quantity of articles into the storage area of the article handling apparatus. Furthermore, the guidance apparatus may additionally include a mechanism that co-acts with the segments so as to help enforce a FIFO (First-In-First-Out) ordering of the segments in the column. Such a mechanism may include one-way tabs which prevent the segments from being loaded into the column from the dispensing end. In an alternative embodiment, flexible dividers may be used between the columns of segments, so that when a segments is removed from a top of the column, the divider flexes into the space of the column, thereby blocking the insertion of an additional segment into the column from the dispensing end thereof. Such flexing can also serve to "catch" or provide a retaining force to the top edge of the segments, thereby making it less likely that an empty segment will be lifted up by the passing therethrough of articles being dispensed from a lower positioned segment. Even furthermore, the flexible dividers provide a uniform and constant urging force between the segments, thereby helping to keep them in alignment with one another (and helping insure the accuracy of their position, as required to properly dispense articles in accordance the pre-programming of the article dispenser arrangement), as well as maintaining a snug/tight relationship with the segments of the adjacent column. If desired, the top of the dividers could have a bend or added protrusion so as to aid in keeping the top segments in place when they are empty. In an even further embodiment, selectively movable bar could be positioned above the top segments in each column to help retain them during the dispensing operations, yet is movable to allow the segments to be removed during the refilling/servicing operations.

In one embodiment, the dividers can be formed by cutting strips out of a roll of polyvinyl or polycarbonate sheet material, so that along their length, there is a natural and permanent curl in the direction that the material was stored as a roll. All the dividers used to form the columns in the article storage structure should then be placed so that their pre-set curl acts in the same direction between each of the columns. Once the columns are loaded with segments, the longitudinal curl in the dividers is prevented from taking place, until a top segment is removed, as noted above.

The receiving devices may comprise openings near the bottom of the guidance apparatus, which openings provide access for respective ones of the article storage segments to be admitted into respective ones of the plurality of axially aligned article storage columns. In the embodiment where the movable article storage structure comprises a refillable article storage magazine having a 2 by 1+N matrix (where N=0 or a positive integer), the openings may comprise, for example, openings in the bottom of opposed sidewalls that may be used to form an outside perimeter for the magazine, or openings in the bottom floor of the magazine, depending upon the desire to insert the segments into the columns either laterally (from the side) or longitudinally (from the floor) with respect to the longitudinal axis of the article storage columns.

The shape of the movable article storage structure could be varied as desired, and, for example when a magazine is used, other than rectangular shapes are possible, such as a round or doughnut shape, where the openings for the segment face the outside of the doughnut for easy access by the server person to refill the article storage structure.

In one preferred embodiment of the invention, the magazine includes a bottom portion that functions as a sled or cart, and may include a weight bearing support arrangement, such as wheels or a slide, so as to facilitate movement of the magazine at least partially out of the storage area of the article handling apparatus so as to facilitate its loading with prepackaged bin-segments. It is noted that, depending on design considerations, such weight bearing support arrangement could be coupled to the top, bottom or even a side of the magazine.

In another preferred embodiment, each half of the magazine can include two opposed end walls spanning a lower floor portion for forming a U-shape, and brackets or other supports can link the opposed end walls, thereby forming opposed sidewalls which give rigidity to the structure. A divider wall can be spaced half-way between the opposed sidewalls, each side of the divider wall forming a space for a row of article storage columns.

A space is left between the lower brackets of the opposed sidewalls and the floor portion of the U-shape so as to provide the access opening in the side of the magazine for the article storage segments.

In accordance with a further embodiment of the invention, one or more of the inside of the wall portions used for constructing the upper body can be formed using (or just be covered with) a sheet (s) of polycarbonate or polyvinyl plastic (or some other smooth sheet material), so as to improve the "slideability" of the segments within the columns in the magazine. Such sheets, if clear or translucent, also allow for visualization of the contents of the magazine, to help ensure correct reloading. Such sheets can also be used to form the dividers between the columns.

In accordance with a further embodiment of the present arrangements, the use of standardized bin segments is facilitated, yet differently sized articles can be accommodated by appropriate resizing means. Such resizing means can be integrally formed with the segments, or be "inserts", such as extruded or other preformed profiles, which when inserted into the segments, changes the interior shape/size thereof, to accommodate differently sized (i.e., length, height and width) articles. The use of standardized bin segments facilitates reduced cost in the manufacturing and handling of the many bin segments needed to service a large collection of vending machines constructed and adapted to use these aspects of the invention. For example, with standardized bin segment sizes, standardized bin layouts, i.e., plan-o-grams, can be used. When standardized bin segment sizes are used, their locations in the bin magazines, and consequently the centers of the bin segments (which is typically the "target" point for the article grasping pick-up head), is also standardized. Thus, pre-set programming of the robotic handler is more easily facilitated.

In accordance with even further aspects of the invention, also described herein are techniques for forming highly durable segments and columns for the present invention using molded or extruded plastic material. These segments preferably include integrally formed therewith, in addition to means for allowing the material to maintain a desired cross-section/profile, means for allowing a standardized outside dimension for the segments, but which resizes the inside cross-section of the segment so that differently sized articles can be accommodated. Furthermore, if desired, additional means can be provided for supporting the articles and preventing the weight of articles stored in an upper portion of the column from crushing or otherwise damaging articles stored in a lower portion of the column. Manufacturing the segments in accordance with these techniques is particularly cost-effective, since the article supporting tabs and/or resizing portions are "built-in" to the molded or extruded process, thereby saving assembly labor and secondary component cost, as well as the costs associated with the extra inventory. Extra strong tabs are particularly advantageous at the bottom of bin segments, and can function as "end stops" to prevent articles stored in the segment from falling out during transport and handling of the segments from a manufacture of the articles, a distribution center for the articles, as well as during refilling of a bin magazine.

Further embodiments of the invention are described toward the end of this application, and the following BRIEF SUMMARIES OF THE INVENTION are applicable to those embodiments, as well as to the above-noted summaries of the invention where they are not in conflict.

Accordingly, in a further preferred embodiment of the invention the guidance apparatus groups the article storage cartridges into a matrix that is at least one, but preferably two, article storage columns deep and at least two article storage columns long. In this embodiment of the invention, the receiving devices are positioned at outwardly facing opposed sides of the two article storage columns which form the depth of the article storage matrix.

In a further embodiment of the invention, the removable article storage structure comprises a refillable article storage magazine having a bottom portion and an elongated upper portion supported by the bottom portion for providing the guidance apparatus which helps for the plurality of the axially aligned.

In this embodiment, the upper portion may comprise an intersecting arrangement of walls or dividers, arranged so as to form a matrix of columns. The matrix may have a rectangular cross-section, so as to form a matrix of columns which is at least one, but preferably two article storage columns deep, and one or more article storage columns long. The exact positioning of the dividers in the upper portion of the magazine is not as important as their positioning in the bottom portion (where precisely predetermined slots, for example, as described below, are used for positioning purposes), since the primary purpose of the dividers in the upper portion of the magazine is to allow the cartridges to slide in the columnar arrangement/direction without having the edges of adjacently positioned ones of the cartridges cause interference to such sliding movement.

In another embodiment, the upper portion may comprise a track or rail guidance apparatus mounted to extend in the columnar direction from the bottom portion of the article storage structure. The track or rail guidance apparatus may be free-standing in their extension from the bottom portion, or be attached to walls that extend up from the bottom portion in the columnar direction. In an even further embodiment, the guidance apparatus may be formed on the walls of the individual article storage cartridges themselves, so that an interlocking of the article storage cartridges with adjacent article storage cartridges provides the grouping of the article storage cartridges into the plurality of axially aligned article storage columns.

The receiving devices may comprise magnetic couplings that slide on the guidance apparatus, or in a further embodiment, they may comprise openings near the bottom of the guidance apparatus, which openings provide access for respective ones of the article storage cartridges to be admitted into respective ones of the plurality of axially aligned article storage columns. In the embodiment where the movable article storage structure comprises a refillable article storage magazine having a 2 by 1+N matrix (where N=0 or a positive integer), the openings may comprise, for example, openings in the bottom of opposed sidewalls that may be used to form an outside perimeter for the magazine, or openings in the bottom floor of the magazine, depending upon the desire to insert the cartridges into the columns either laterally or longitudinally with respect to the longitudinal axis of the article storage columns.

In an embodiment where the guidance apparatus comprises a track or rail guidance apparatus, the tracks or rails would have an opening which allows a tab portion of the cartridges to be inserted therein so as to securely engage the guidance apparatus and thereby form the columnar arrangement of stored articles. Alternatively, the aforementioned magnetic coupling/slides can be used to provide the same function as the openings.

The precise shape of the movable article storage structure is not important, and, for example when a magazine is used, other than rectangular shapes are possible, such as a round or doughnut shape, where the openings for the cartridge face the outside of the doughnut.

In a further, more minimalist embodiment, the magazine can simply comprise a skeleton having a shape sufficient to position the cartridges into the columnar matrix arrangement. Such an embodiment can be formed from intersecting walls which create article storage columns on either side of the intersection, and a plurality of axially aligned tracks adapted to engage the article storage cartridges can be provided along each column. To help enforce a FIFO ordering of the cartridges in the column, each track can include a spring detent or catch to force only a one-way movement of the cartridges along the track, such as the upward direction, towards the article grasping mechanism.

In a preferred embodiment of the invention, the magazine includes a bottom portion that functions as a sled so as to facilitate sliding movement of the magazine into and out of the storage area of the article handling apparatus.

In a preferred embodiment the bottom sled portion can comprise a substantially unitary construction, such as a U-shape, where opposed sidewalls of the U-shape provide smaller length side walls of a rectangular cross-section for the magazine, and the space between the opposed sidewalls comprise a longer dimension of the rectangular cross-section of the magazine. The space between the opposed sidewalls provides the access opening for the article storage cartridges. Support beams along the longer dimension of the cross-section can be used to join the opposed sidewalls, and be positioned at a height above the bottom portion of the U-shape so as to define a height for the access opening. Such a construction provides substantial structural rigidity to the magazine, as well as serving as an attachment structure for internal and external wall portions for construction of the upper body portion of the magazine.

In accordance with a further aspect of the invention, the internal and external wall portions used for constructing the upper body can be formed using a low-cost corrugated material, such as corrugated paper or corrugated plastic. Using corrugated plastic material may not only provide an increased durability over a paper-based corrugated material, but can also improve the "slideability" of the cartridges within the columns in the magazine.

In accordance with even further aspects of the invention, also described herein are techniques for forming highly durable cartridges and columns for the present invention using corrugated plastic material, and including reinforcement rods appropriately positioned within selected ones of the corrugations.

In an alternative embodiment, the upper body of the magazine and the cartridges can be molded out of plastic, or made of any other material suitable for performing the function of these elements, as described herein.

In accordance with one aspect of the present invention, the present arrangement of corrugated material used to form the cartridges, the reinforcement rods, and cutouts in the material which are aligned with the reinforcement rods, provides several advantages, one of which being that attachment points are conveniently provided for additional apparatus associated with the cartridges and/or magazine. For example, a reinforcement rod aligned with a window in the sidewall of the cartridge can be used as an attachment point for structures to be positioned inside the cartridges, such as an auxiliary strip which provides a plurality of article supporting flaps inside the cartridge, or a spacer which customizes the interior cross-section of the cartridge so that it more accurately positions and/or fits the particular shape of a particular article to be stored therein.

In a further embodiment of the invention, article supporting flaps inside the cartridge can be formed using the sidewalls of the cartridge itself, rather than using an auxiliary strip. In this embodiment, a plurality of spaced apart "inverted-U" shaped slits can simply be punched in the material forming opposed walls of the cartridge to form the flaps. Thereafter, the flaps can be simply and easily pushed into the interior of the cartridge so as to support the articles, at the time that the articles are loaded into the cartridge. Article supporting flaps manufactured in this manner have a tendency to be self-retracting as the articles below the flaps are raised past the flap, thereby further preventing the flaps from interfering with retrieval of articles below the flap. Alternatively, the article supporting flaps can be associated with the columns of the upper body portion of the movable magazine, and the cartridges can have openings in their sidewalls, so that the article supporting flaps can protrude into the cartridges and support the articles carried thereby.

In accordance with another aspect of the invention, the bottom portion of the sled also includes a keying apparatus such as tabs, which mates with a corresponding keying apparatus, such as slots, in the storage area of the article handling apparatus to insure proper positioning/repositioning of the magazine within the storage area of the article handling machine.

In accordance with a further aspect of the present invention, a replaceable graphics display panel which enables a quick change graphics, can be used in conjunction with "keying" aspects of the movable article storage structure, so as to further enhance/enforce "brand loyalty". More specifically, a unique ID (such as a bar code) associated with the replaceable graphics display panel can be sensed, for example by a bar code scanner, so as to inform the controller of the vending machine what articles are to be vended, and which columns they are stored in. Even furthermore, the novel article storage apparatus may include a bar code which also can be used to inform the controller what articles are stored therein, and which columns they are stored in. Due to the "keying" aspects of the movable article storage structure, this information can, in effect, auto-program the controller of the vending machine, thereby further enhancing the desired benefits of providing for quick, accurate and reliable filling the article storage area of the article handling apparatus with a large number of articles. Additionally, due to the preprogramming aspect of this invention, "brand loyalty" by the machine operator is enforced since the machine will operate/vend incorrectly if it is not refilled with the articles as expected by the combination of the bar codes on the graphics card and novel article storage apparatus. Even furthermore, these aspects of the invention are particularly useful when the vending machine includes an article ID device, as described above, since adherence to the brand loyalty can then be independently monitored, and even reported to a third party via the communication link portion of the control portion of the vending machine.

In accordance with another aspect of the invention, the bottom portion of the sled also includes additional keying means, such as slots, for facilitating the positioning of wall portions for manufacturing the article storage column portions of the magazine. There can be multiple slots in the sled floor, so that the wall portions can be relatively easily and quickly "repositioned", so as to re-dimension the matrix of columns for a different size, and/or quantity of articles. In this regard, another technique which can be used to accommodate differently sized articles, is to use "inserts", such as extruded profiles, which when inserted into the columns, changes the interior shape/size thereof, to more closely match the size, and therefore accommodate the differently sized articles.

In a further aspect in this regard, in one embodiment, the sled may have a bottom portion that has two slotted tracks formed along its longitudinal length and equally spaced within its width. The intersection walls can be formed of straight wall sections having the width of one column and having a "tee" fitting at the bottom thereof. The "tee" portion at the bottom of each wall section is inserted into the track, and then the wall section is slide down the track to an appropriate position. At that point, the wall section is rotated ninety degrees so as to lock that wall section in place. By appropriate positioning/re-positioning of such wall sections, a matrix of columns can be easily formed, as well know. This aspect of the invention is particularly useful in that it allows a quick, easy and reliable method and apparatus for re-dimensioning the matrix of columns for a different size, and/or quantity of articles.

In accordance with another aspect of the invention, the bottom portion of the sled also includes a detent/retaining clip apparatus for retaining an article storage cartridge after it has been inserted into the bottom portion of an article storage column via an access opening at the bottom of the magazine.

In accordance with another aspect of the invention, dimensional tolerances and rigidity for the upper body portion of the bin magazine can be somewhat relaxed, as compared with the dimensional tolerances and rigidity for the lower body portion of the bin magazine, since when the magazine is placed in the predetermined position within the storage area, the walls of the adjacent magazines, bins or of the storage area itself, will press upon and force the upper body portion, with the matrix of columns therein, into a predefined and repeatable position within the storage area. This is of particular importance, since such relaxed tolerances of the upper body portion lowers the cost to manufacture and assemble such components, yet maintains the dimensional tolerance of the matrix in the fully loaded storage area, thereby allowing the positional programming of the article handling device to stay the same after servicing.

Additionally, the use of such a magazine or groups of such magazines for rapid, accurate and reliable refilling of the storage area of article handling apparatus with articles lends itself to a technique which allows a apparatus to have a predetermined percentage of its articles as "standard" articles, by providing those articles in, for example, two of three magazines used in a article handling apparatus in accordance with the present invention. The third magazine can be easily, quickly and reliably moved to a different article handling apparatus upon each servicing of the article handling apparatus, so as to provide new/different articles to the users of the article handling apparatus.

BRIEF DESCRIPTION OF THE FIGURES

FIG. 7A illustrates front, side and isometric views of a bin magazine for positioning in the center of the vending machine storage area.

FIG. 18 illustrates a further resizing technique.

FIGS. 19A and 19B illustrate isometric and side views, respectively of a bin magazine reloading assistance tool.

FIG. 20A illustrates a front view of bin dividers and a top view of the floor portion of a bin magazine of the present invention, and FIG. 20B illustrate isometric view of the bin magazine of FIG. 9 having some of the dividers of FIG. 20A mounted therein.

FIGS. 23A-23F illustrate further details for forming one embodiment of the upper portion of the storage arrangement of FIG. 22.

FIGS. 28A-28D illustrate further details for forming one embodiment of an article supporting strip/clip for the article storage cartridge of FIG. 26.

DETAILED DESCRIPTION OF PREFERRED EMBODIMENTS OF THE INVENTION

Figure 1:
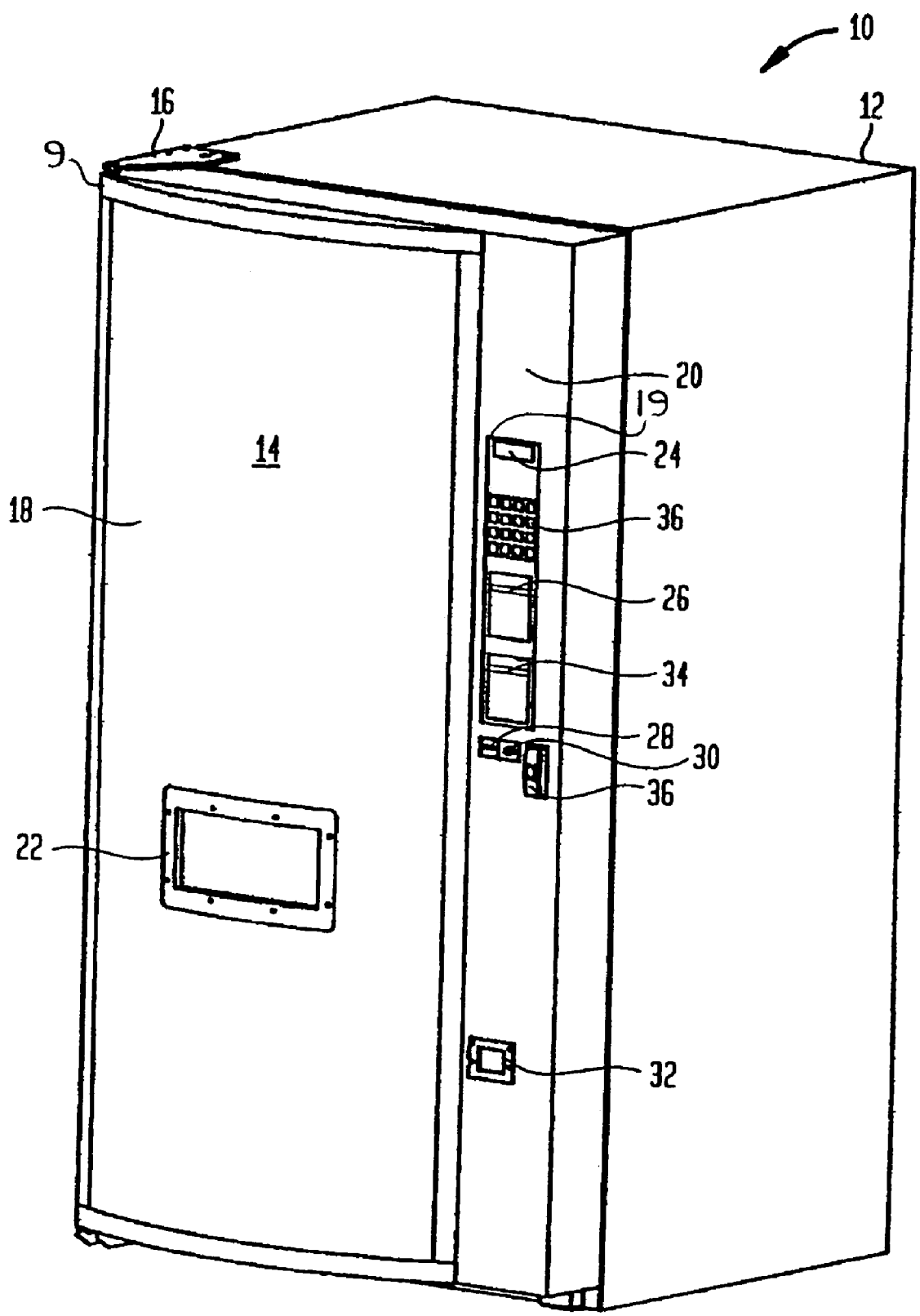
FIG. 1 is a front perspective view of a vending machine constructed and operating in accordance with the principles of the invention.

FIG. 1 illustrates as an environment of the invention described herein, an article merchandiser, such as a point-of-sale (POS) article dispenser. Although throughout the following description, reference is made to implementation of the invention in a vending machine environment, it is intended that the term "vending machine", and in fact the environment of the present invention, include more general purpose article merchandising, handling, retrieval and/or dispensing apparatus, as well as POS equipment. Such equipment, if embodied as a portable device may comprise and be about the size of a traditional vending machine or as large as a tractor-pulled trailer, and if embodied as a non-portable device may comprise an automated dispensing room or an area located in a permanent structure, such as in a building (with or without interior walls and in some embodiments without an enclosing cabinet). Such an automated dispensing room could be easily constructed using the article dispensing mechanism and article storage techniques as described herein.

Accordingly, FIG. 1 illustrates a perspective view of a vending machine 10, comprising one embodiment for an apparatus that is constructed and operates according to the present invention. Vending machine 10 includes a main cabinet 12 and a front door 14 mounted on a hinge 16 for providing access to the interior of the vending machine for servicing (refilling it with articles, maintenance, etc.), such refilling using the methods and apparatus of the inventions to be described. Note, in a further vending machine embodiment, a service door or access port to the interior of cabinet 12 could be positioned anywhere on or as a part of cabinet 12. In FIG. 1, front door 14 is shown in a closed position, forming an enclosure with main cabinet 12, the interior of which various components of vending machine 10 are housed, as explained in more detail below.

Front door 14 includes a convex-shaped display face panel 18 (commonly referred to as a "bubble" front); adjacent a flat section 20, however, these particular shapes are not necessary for the invention. Display face panel 18 is attached to the front of door 14 via a perimeter frame 9 of conventional design. In the illustrated embodiment the display face panel 18 is back-lit using fluorescent bulbs, not shown, to enhance the visibility of its graphics, and may therefore comprises a translucent plastic base material. Display panel 18 typically has brand name and/or logo graphics pre-printed or screened on an interior facing side thereof, and may even include graphics which illustrate the individual articles that are vendible by vending machine 10, as well as the price and/or selection information for the articles.

A customer retrieval area 22 is formed in the panel 18 on door 14 so that articles stored therein can be discharged to a user of vending machine 10. In a further embodiment, area 22 can be formed on flat section 20, or another wall of cabinet 12.

Various user interface components are mounted on flat section 20 of door 14. A customer display 24 may be a conventional fluorescent or LED display panel for displaying various items of information to a user of machine 10, such as feedback to the user of the selection made, the amount tended, and if the article is sold out or being vended. For accepting payments, a bill acceptor slot 26 accepts paper money into a conventional bill acceptor mechanism (mounted inside machine 10 so as to have its user interface portion extend through an opening 19 in flat section 20) for purchasing articles or for making change. A coin insertion slot 28 accepts coins into a conventional coin changer (also mounted inside machine 10 so as to have its user interface portion extend through opening 19) for purchasing articles or for making change. A coin return actuator 30 comprises a conventional push-button mechanism for activating a coin return portion of the coin changer mechanism which, upon actuation returns coins inserted by the current user, to a coin return well 32. The coin return portion of the coin changer mechanism also provides change to the coin return well 32 either in response to the purchasing of articles or for making change for paper money or larger coins. A credit/debit card slot 34 accepts a plastic credit/debit card inserted into a conventional card reader mechanism (also mounted inside machine 10 so as to have its user interface portion extend through opening 19) for allowing a user to pay for purchases via credit/debit cards. A door handle/lock mechanism 36 enables front door 14 to be secured so that it cannot be opened without a key. For allowing user selections, display panel 18 may include graphics, as noted above, which indicates the various articles vendible by the machine, as well as their associated price and a unique selection number. A conventional keypad push-button mechanism 38 is provided for enabling a user to select a desired article from vending machine 10. Although not shown in FIG. 1, machine 10 also includes a conventional telecommunications component that can be used for authenticating credit card purchases, as well as other uses relating to machine control and reporting the inventory and operational status of machine 10 to a remote location, as well known to those of ordinary skill in this technology.

Although vending machine 10 is illustrated to include the above described user interface components, in a more minimal embodiment of the invention, most, if not all, of these user interface components could be omitted, and the dispenser could in fact be controlled from a remote location, with or without a local payment system.

Figure 2:
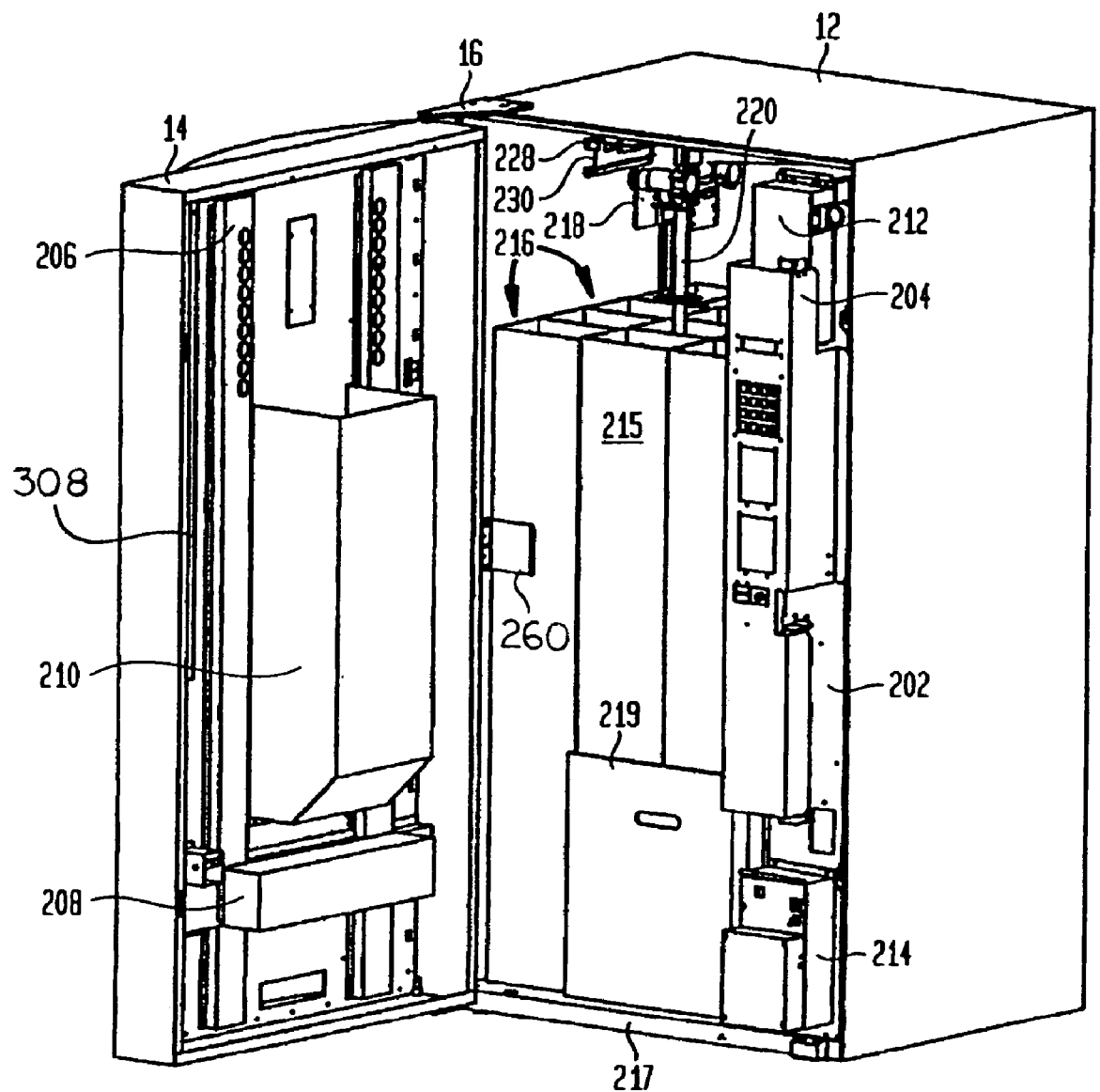
FIG. 2 is front perspective view of the vending machine of FIG. 1, with the front door open, so as to illustrate the main mechanical and electrical components therein.
Figure 3:
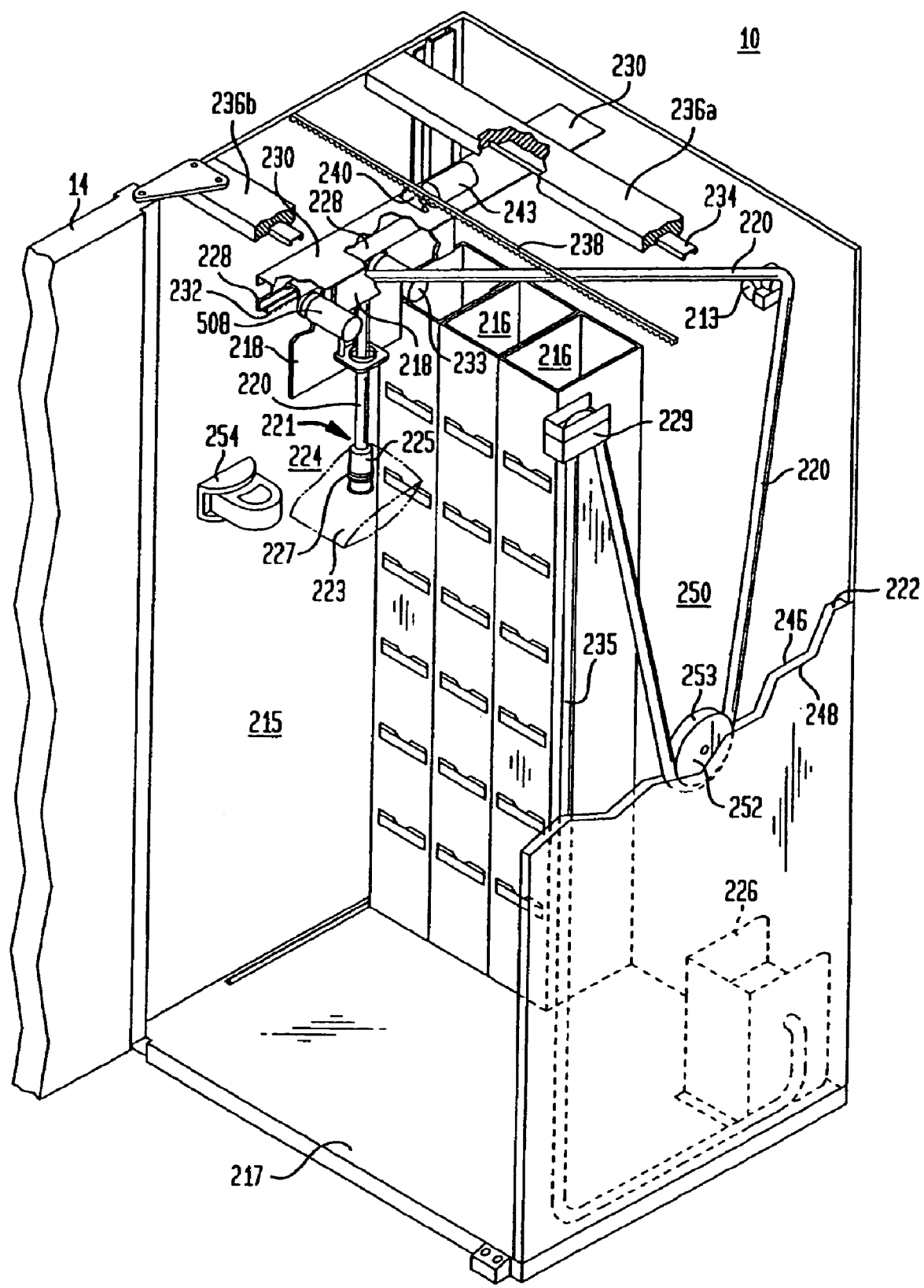
FIG. 3, illustrates the interior of the vending machine of FIG. 1, with certain wall portions shown cut-away to aid visualization.

FIG. 2 is front perspective view of the vending machine of FIG. 1, with the front door open, so as to illustrate the main mechanical and electrical components therein. FIG. 3 is a somewhat idealized version of the main components of the article handling mechanism portion of vending machine 10, and is useful for understanding its general operation. Note, some portions of vending machine 10 are shown in these FIGURES cut away in order to better illustrate the interior components.

As shown in FIG. 2, the right portion of the front of cabinet 12 includes a vertically mounted support panel 202, which is used for mounting most of the user interface components. A hinged mounting bracket 204 is mounted on panel 202 and aligned with an opening in door 14 so that the user interface components, such as the selection button keypad 38, coin insertion slot 30, bill acceptor slot 28, coin return 32, and customer display 24, are all accessible to the user from the front side of door 14. Mounted on the interior of front door 14 are two fluorescent bulb light sources (not shown) that emit light for backlighting panel 18. The fluorescent bulb light sources are behind protective covers 206 so as to provide security (vandal protection), which is desirable as a result of the slot openings (not shown) in the structure of door 14 which allow for insertion of the fluorescent bulbs. Also mounted on the interior of front door 14 is a article delivery chute 210, and a ballast 208 for supplying power to the fluorescent bulbs. Note, the article delivery chute 210 is unconventional in that it is extremely tall, and therefore serves as a security measure to help prevent unauthorized access into the machine by insertion of an arm or other grasping mechanism into the customer retrieval area 22 from the exterior side of the machine. In typical prior art vending machines, a swinging security door is usually found in chute 210, which swings into a vandal blocking position when the customer pushes in the swinging door at the entrance to the article retrieval area 22. Mounted behind hinged mounting bracket 204 is a conventional bill acceptor mechanism for causing paper money inserted into bill acceptor slot 28 to be drawn into vending machine 10, a conventional coin changer which accepts coins inserted into coin insertion slot 28 and supplies coins to coin return well 32, a magnetic card reader, and a conventional bill validator which ascertains proper insertion of paper money into bill acceptor slot 28.

The interior of cabinet 12 substantially comprises a storage area 215, wherein a plurality of a vertically aligned bins 216 having open tops, store therein stacks of articles to be vended. Although in the illustrated embodiment a robotic article dispenser comprising a suction gripper at the free end of a suction hose 220 (shown more clearly in FIG. 3 as 224), is used to dispense the stored articles, such type of mechanism is not required for the present invention, and in fact any type of dispensing mechanism could be used which would be able to retrieve articles from the open ends of the aligned columns. In the illustrated robotic dispenser, a hose positioning mechanism is coupled to the suction hose 220, and comprises: a carriage 218 which includes a driven "pinch roller" aligned for driving hose 220 in the vertical (Z) direction, a beam 230 from which carriage 218 is slidably suspended and adapted for motorized movement therealong (in the front/back "Y" direction); and a slider arrangement (not shown) mounted in the left/right "X" direction at the top underside of cabinet 12, to which beam 230 is slidably suspended therefrom and adapted for motorized movement therealong. In the operation, a blower motor (not shown) provides suction to said hose 220, and the hose positioning mechanism controllably positions hose 220 to enter a selected bin 216, contact and become secured to an article at the top of the stacked in the bin, remove the selected article and position the article in the delivery chute 210. As noted above, although a robotic dispenser is described herein, it will be clear that the principles of the invention are not particular to any type of dispenser nor its dispensing arrangement and thus a gravity feed or article grasping claw-type dispenser, to name just two types of dispensing arrangements, could alternatively be used.

A control board 212 is mounted on panel 202 and comprises a printed circuit board on which circuitry is formed and to which integrated circuit chips are attached. A power supply 214 is also mounted on panel 202 and supplies power for the electrical components of vending machine 10. Control board 212 includes a microprocessor that is electrically connected to various sensors, hose positioning motors, the above described user interface elements, as well as other devices within vending machine 10, to control the operation of vending machine for dispensing articles, in a manner that is well known to those of ordinary skill in this technology. Accordingly, further description of the construction and operation of the remainder of the basic electrical components/functioning of the vending machine is believed to not be necessary.

Figure 14:
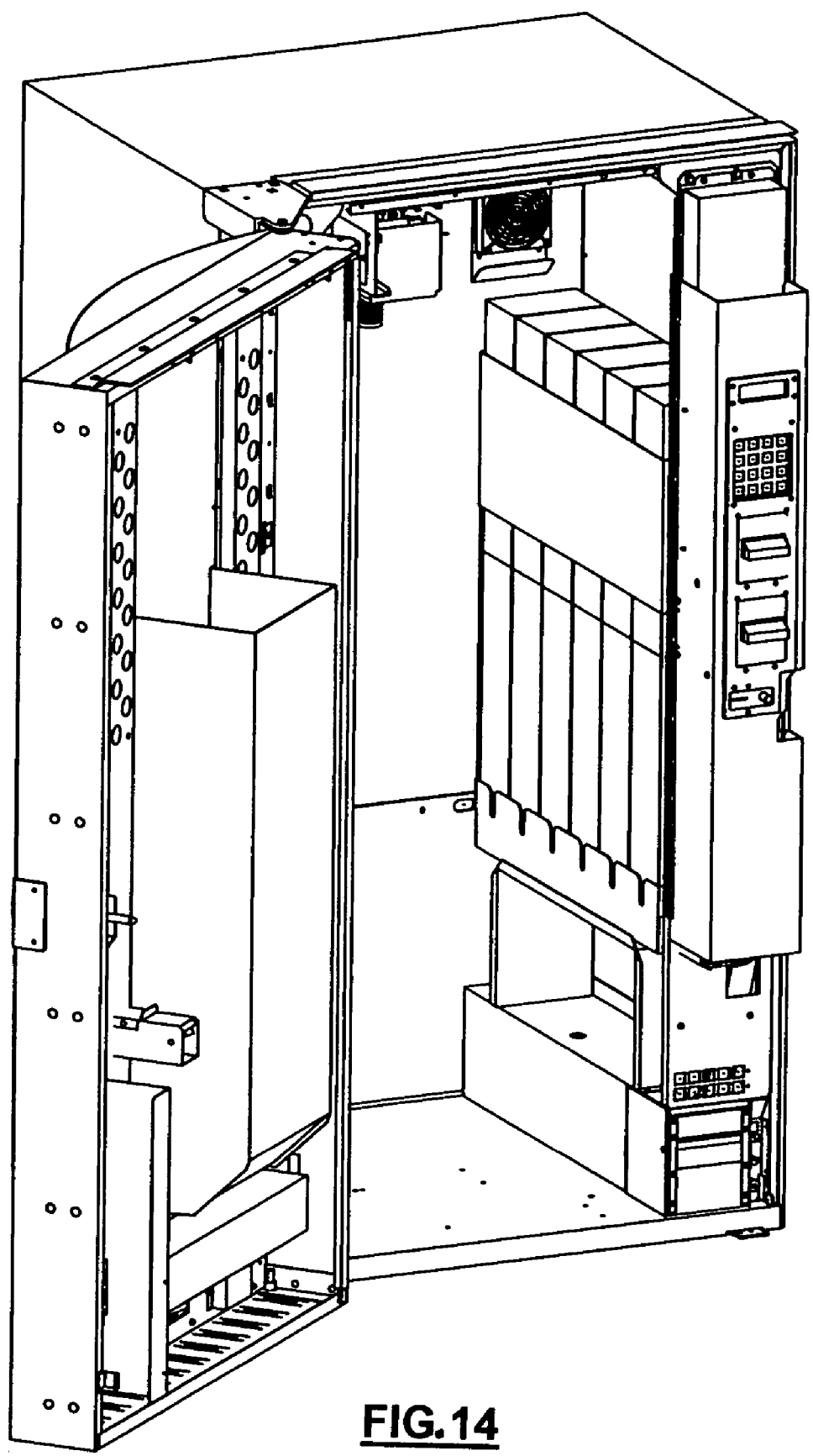
FIG. 14 is a photograph illustrating the bin magazine of FIG. 8 in position in a vending machine.

Referring now also to FIG. 3, it is apparent that the bulk of the interior of cabinet 12 is available as an article storage area 215. Storage area 215 includes a plurality of vertically aligned article storage bins 216 arranged on the interior floor 217 of cabinet 12. In a refrigerated environment for the present invention the bins could be arranged to sit on a shelf positioned above the refrigeration system and serving as a thermal separator. Such a shelf could comprise the entire floor area or only a portion thereof, such as a shelf at one side of cabinet 12, which encloses and thermally separates the electrical and refrigeration equipment used for operating the vending machine, from the storage area. FIG. 14, to be described later, shows use of such a shelf on the right side of cabinet 12, which supports an article storage magazine holding a group of bins 216, about a foot above an electrical enclosure. This space could be used for housing refrigeration equipment, with air ducts placed about the interior of cabinet 12 for distributing the cooled air throughout area 215. Alternatively, such refrigeration equipment could be placed at the top inside portion of cabinet 12 above the robotic dispenser arrangement, or even above the outside of cabinet 12. In several of the illustrated embodiments, bins 216 are specifically designed for supporting and storing fragile articles 223 to be vended by machine 10. Further details relating to bins 216 and structures for use therewith are known, for example, by the additional text and Figures of the forenoted PCT Application PCT/US01/16847, which is incorporated herein by reference for US purposes.

An open-top container 219 (shown in FIG. 2) is dimensioned to hold a plurality of article storage bins 216 therein, and used, for example to facilitate the simultaneous handling (i.e., removal; installation and transportation) of the plurality of bins 216 into/out of the article storage area 215. Container 219 also facilitates rapid and accurate positioning of a plurality of the article storage bins into the storage area of the article handling apparatus. More specifically, the individual article storage bins can be pre-filled with fresh articles and prearranged within the container 219 at a warehouse (or a manufacturing or distribution center), and transported by the operator to the vending machine in order to rapidly, efficiently, and without error replace all or substantial all of the inventory of the vending machine by merely exchanging a new container 219 with the old container 219 presently in the machine. The removed container 219 can then be replenish with fresh article by the operator back at his truck or at a warehouse, and then used for swapping/replacement in a subsequent vending machine. This "swapping" technique facilitates rapidly, efficiently, and without error changing all or part of the layout of the article selections, i.e., commonly called the "plan-o-gram", of the vending machine. It is noted, however, that trying to refill the bins in container 219 with new articles to be vended becomes problematic, due to, for example, the length of the bins. The present invention provides various methods and apparatus that improves upon the basic technique of using container 219, thereby further assisting the operator of the vending machine to more rapidly, efficiently, and without error replace all or substantial all of the inventory of the vending machine The forenoted carriage 218 portion of the article handling apparatus (which carriage may be more generally referred to as an X-Y or planar positioning mechanism) is coupled to the interior topside of cabinet 12 and adapted for being controllably positioned by the control board portion 212 of machine 10, to a location centered over (so as to be aligned with) the open top-end, i.e., dispensing end, of a selected one of article storage bins 216.

Although vertical (Z-axis) alignment of the article storage bins 216 is shown, non-vertical, i.e., slanted or even horizontal X or Y axis) alignment may also be possible (such as found in the well know glass front vending machines of the type using a "spiral wire" type of dispensing apparatus). In the event of substantially horizontal alignment of the storage bins, the planar positioning mechanism will be appropriately changed so as to position carriage 218 for movement in the X/Z or Y/Z plane. In fact, a curvilinear plane, such as a cylinder, is also considered to be within the scope of the present invention. The combination of substantially horizontally aligned stacks of articles with a robotically controlled article transport mechanism which moves in a vertical plane adjacent to dispensing ends of the stacks of articles, is known, for example in my earlier filed patent application PCT/US02/37790 entitled MACHINE AND METHODS FOR VENDING ARTICLES, which is incorporated herein by reference for US purposes. The article storage methods and apparatus of the present invention could find use just as well in an article dispenser of the type noted above.

Use of a curvilinear plane for article transport is also known, for example in the videocassette vending art, wherein the videocassette's are stacked in an outwardly facing manner in a central storage carousel, and a robotic gripper encircles the carousel. Such a curvilinear plane for the article storage area is also compatible with the present invention. Furthermore, although article storage bins 216 are shown to be an ambient environment, bins 216 could in fact the positioned in a refrigerated environment, such as a freezer located in the bottom of storage area 217, and the article transport mechanism can enter the bins from a top opening in the freezer, such as shown and described in the forenoted U.S. Pat. No. 5,240,139. Alternatively, in the event the refrigerated environment is of the type including a substantially horizontal alignment of the storage bins, a vertically oriented opening could be used to provide access to the dispensing end of the article storage bins. Even furthermore, the entire storage area can be refrigerated, rather than use of a separate thermal area, such as a freezer mounted therein.

As shown more clearly in FIG. 3, in the illustrated embodiment an air hose 220 is continuous from a point before it's exit from a hose storage area 222 over orthogonally positioned rollers 213 (or other low-friction arrangement), to its free end 221. Free end 221 includes a weighted portion 225 in combination with a bellows extension tip portion 227. Depending upon the physical characteristics of the articles to be dispensed, article pickup head 224 may comprise only the weighted portion 225, or this portion in combination with a fitting specifically adapted to the type of packages to be dispensed, such as the bellows tip 227 (serving as an active suction cup) or a compliant tip without a weight. Hose 220 has one end coupled to a source of negative air pressure, i.e., suction, which source of suction comprises in the preferred embodiment a blower motor 226, and a free end coupled to the article pickup head 224. In the present description, the word continuous is intended to mean a hose which is connected and acts between it's end points, in order to accomplish the functions required by it, as a unitary/single hose, i.e., one than one hose can be coupled together to act as a single hose. Such a continuous hose is not required for the present invention, but using one allows for a compact article grasping arrangement.

An air hose portion 235 provides suction from blower motor 226 to the pick up head, via, in the illustrated embodiment, connection to one port of an air junction box 229. Continuous hose 220 is connected to a second port of air junction box 229. Air junction box 229, included at a top portion of hose storage area 222, includes an airflow sensor and vacuum breaker assembly which can optionally be used with this embodiment. The airflow sensor is used to develop a signal which is applied to the controller of the vending machine and is representative of the airflow through air hose 220. The vacuum breaker assembly is used to quickly bring the air pressure in hose 220 to the ambient pressure, thereby facilitating a "quick-release" of an article transported by the article pickup head, into the dispensing chute 210. It is noted that a quick release of the articles does not have to occur at the top of dispensing chute 210, and in the event that it is desirable to avoid subjecting the article to forces which result from jarring or dropping, the article pickup head could proceed to the bottom of the dispensing chute 210 before providing release of the article, with or without the use of the quick release valve. In one embodiment, the airflow sensor arrangement may comprises a two-part switch, a first part includes a reed switch mounted on a top portion of box 229, and a second part includes a magnet mounted at the free end of a swinging arm mounted inside box 229. As the arm swings inside box 229 due to changes in airflow, the switch is "toggled", thereby indicating changes in airflow. The use of this airflow signal will be described in greater detail later. In an alternative embodiment, the functions of the airflow valve and quick release could be built into the blower motor enclosure, or they could be eliminated entirely. With this arrangement, hose 220 would be continuous from the picker head all of the way to the blower motor.

A clever hose positioning arrangement is provided for aligning carriage 218 with a selected one of bins 216. This alignment is accomplished in the front/back (Y) direction using a front/back linear slide 228 (shown in a cut away view) mounted to an "L" shaped front/back beam 230 so that carriage 218 can be controllably positioned therealong using slide 228. A bottom edge portion of beam 230 includes a rack portion 232 and carriage 218 includes an electric motor 233 that drives a gear (not shown) which engages rack portion 232. Application of forward and reverse motor control signals from control board 212 to motor 233 causes carriage 218 to be driven in the front/back directions. Alignment of carriage 218 in the left/right (X) direction is accomplished in a similar manner, using a left/right linear slide 234 which slidably couples the top side of front/back beam 230 to the underside of each of spaced apart left/right beams 236a and 236b. Beams 236a and 236b are rigidly attached to the inside top portion of cabinet 12. A rack 238, also rigidly attached to the top inside portion of cabinet 12 and in parallel with beams 236, is engaged by a gear 240 driven by a reversible motor 243 mounted near the inside corner of beam 230. Application of forward and reverse motor control signals from control board 212 to motor 243 causes a rotation of gear 240 and a corresponding movement of beam 230, and hence carriage 218, in the left/right (X) directions.

Note that although carriage assembly 218 only moves in a single plane (which in the illustrated embodiment is illustrated as being horizontal, but other orientations are possible), it is responsible for precisely positioning pickup head 224 in each of the X, Y and Z directions. More specifically, carriage 218 includes a roller arrangement (not specifically shown, but which may comprise three orthogonally positioned rollers at the point where hose 220 enters carriage 218) for redirecting the movement of hose 220 from the substantially horizontal direction along the top interior portion of machine 10 (i.e., in the X,Y direction), to a direction perpendicular thereto (i.e., in the Z direction). Thus, movement of carriage 218 will move the article pickup head 224 at the free end 221 of hose 220 so that it can be aligned with the longitudinal axis of a selected one of bins 216. Thereafter, a hose drive mechanism (not specifically shown, but which may comprise a set of conventionally operated "pinch rollers" carried by carriage 218), is driven by a reversible motor 508 for driving pickup head 224 into/out of the selected bin 216 in order to retrieve articles stored therein. In the illustrated embodiment the hose drive mechanism is mounted in carriage 218, but in a further embodiment motor 241 and the pinch rollers, or some other drive mechanism, such as an articulated arm, could be mounted so as to act somewhere else along the length of hose 220 so as to enable driving of pickup head 224 into/out of a selected bin 216. Alternatively, carriage 218 could carry a reel or drum for dispensing hose 220.

This arrangement, where hose 220 travels in the same X,Y plane that carriage 218 travels, facilitates a compact hose positioning and drive mechanism embodiment for the present invention.

Since hose 220 is formed of a continuous material from its connection to the stationary source of suction at one end (which connection in the illustrated embodiment is at the vacuum junction box 229) to the movable pickup head 224 at its other end, means are necessary for providing hose storage and/or retraction during travel of the pickup head 224 in the X, Y and Z directions during the article dispensing operations.

A hose storage area 222 is formed by placing an interior wall 246 parallel and adjacent to an exterior wall 248 of cabinet 12. Walls 246 and 248 are shown in FIG. 3 as partially cut-away so as to illustrate a gravity feed self retracting loop 250 in hose 220. Loop 220 is constrained for movement within hose storage area 222, and made self retracting by providing a rolling weight 252 having a groove 253 along its periphery in order to provide constant centering of the weight within hose storage area 222 and providing a constant "loop forming" tension on hose 220. Furthermore, centering of the grooved rolling weight 252 within hose storage area 222 results in centering of hose 220, thereby preventing hose 220 from rubbing with the walls of hose storage area 222 during X,Y and Z repositioning of pickup head 224. In order to prevent binding of hose 220, rolling weight 252 is dimensioned so as to be slightly larger than the diameter of hose 220 and the width dimension of hose storage area 222 is dimensioned to be only slightly larger than the width dimension of rolling weight 252.

It is also noted that this gravity-based retraction/hose storage technique meets the storage requirements needed for both the X and Y movements of carriage 218 (left/right and front/back), as well as for the Z movement of pickup head 224. Of course this gravity-based retraction/hose storage technique would work equivalently well in an embodiment wherein the robotic hose positioning mechanism used a rotary type device (R, θ), an articulated arm, telescoping or scissor system, or other technique. Furthermore, the illustrated gravity-based retraction/hose storage technique is not necessary for the present invention, and in fact a fully or partially motorized retraction technique could also be used. Furthermore, in other embodiments, it may be desirable to place hose storage area at another location, such as parallel to the top or rear portion of cabinet 12.

In the environment of the present invention, it is noted that FIGS. 2 and 3 also illustrate that as the hose positioning arrangement causes an article 223 to be moved by pickup head 224 from a storage bin 216 to chute 210, it is positioned past an article identification (ID) device 254 mounted within cabinet 12. Although an article ID device is not required for the present invention, depending upon system requirements, such a device may be used. The ID device may comprise, for example, a bar code scanner or other optical image/pattern recognition system, or even a non-optical system, such as a radio frequency identification (RFID), or magnetic-based system mounted within cabinet 12, for uniquely identifying and confirming that the article being dispensed is in fact the article that was selected.

Such article or bar code recognition uniquely identifies the transported article to control board 212, and can be used for inventory management, as well as operational control of vending machine 10. The construction and operation of such article identification devices are well known to those of ordinary skill in this technology, and therefore further description in this regard is not necessary.

A bin holder 260, shown in FIG. 2, comprising in the illustrated embodiment a pair of rectangular brackets 260 secured in a spaced manner to opposed interior side walls of cabinet 12, is used to maintain the bins situated therebetween in a predetermined position relative to the interior of the vending machine cabinet. This is required in view of the pre-programming of control board 212 so that the controller knows the precise X-Y position of each bin, and can thereafter control the robotic structure so as to allow it to correctly retrieve a selected article from a predetermined one of bins 216.

As described above, positioned inside storage area 215 is a plurality of axially aligned article storing bins 216, with a central group of the bins arranged for simultaneous handling by the macrobox 219. Additional bins are shown being individually positioned within storage area 215 so as to fill that portion of area 215 which surrounds macrobox 219. For simultaneously handling a plurality of the article storage bins for refilling, the vending machine, service person need only perform a single action, removal of the macrobox from the storage area 215. Although this arrangement greatly speeds up the article re-loading of the storage area of the vending machine, it is still required that the individual bins be removed from the macrobox in order that they can be re-loaded with fresh articles. Removing tall bins from macrobox can be somewhat cumbersome and time consuming. Furthermore, maintaining a FIFO order for the articles during refilling can be problematic due to the length of the storage bins. Even furthermore, there is the possibility that after bin refilling, some of the bins will be placed in the macrobox at a position which is not a predetermined position for that bin. That is, there is a specific "plan-o-gram" or matrix for the bins, and if the plan-o-gram is inadvertently changed by incorrect positioning of one or more bins within the macrobox (and the controller of the vending machine is not updated), then the article handling mechanism will retrieve and dispense incorrect articles to the customer. The present invention is directed to improvement in at least these areas.

Figure 4A:
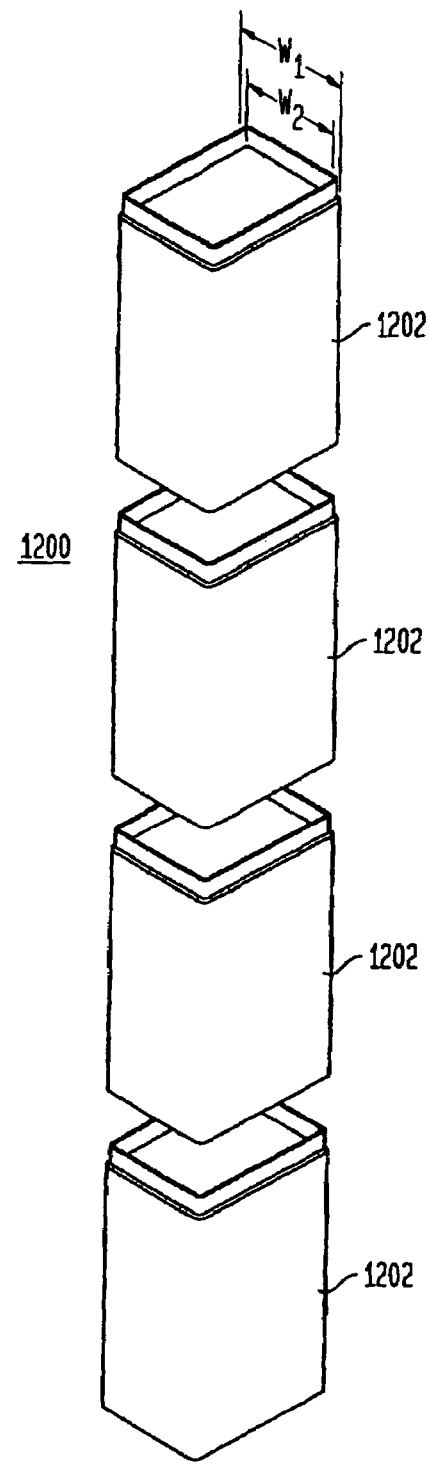
FIGS. 4A, 4B and 4C illustrate the use of stackable bin segments, in combination with flexible "anti-crush" tabs for preventing crushing of articles stacked lower in the column by the articles stacked thereabove.

PCT patent application PCT/US01/16847 also describes the use of bin segments for facilitating a more rapid and trouble free re-loading of individual ones of the article storage bins, and which helps insure FIFO article reloading. FIG. 4A herein shows the use four bins segments 1202 (also described in the forenoted PCT application), for forming a full height bin 1200. Use of bin segments facilitates FIFO since it is a relatively simple matter to replace only a used, and therefore empty portion of a bin column, and place the segments loaded with fresh articles under the ones with the older articles, instead of trying to fill a partially full column from the bottom up.

Figure 4B:
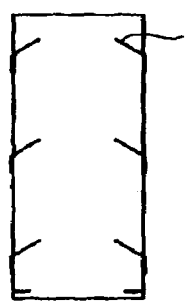
Figure 4C:
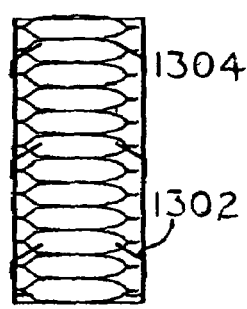

FIG. 4B herein shows a cross-section of one of the segments 1202 and illustrates the use of flexible "anti-crush" tabs 1302 (also described in the forenoted PCT application) which extend from opposed walls of the segments 1202 into the interior storage space thereof. These tabs are pre-formed so as to have a preferred direction of bend, which is easily bent in the upward direction and much more difficult to bend in the downward direction. Accordingly, they will easily bend out of the way as articles are being moved in an upward direction in the article storage columns (and therefore not disturb the articles during dispensing), but not easily move out of the way while the articles are sitting thereon. As shown in FIG. 4C, these tabs at least partially, and preferably fully, support the weight of articles 1304 stored in the segments 1202. Additionally, due to this bi-directionality of the anti-crush tabs, it is more difficult to not adhere to FIFO practices when refilling the segments. These anti-crush tabs can be attached to each wall of the bin segments in an opposed manner, or can be on only adjacent walls (i.e., corners), or can alternate their position in place of being opposed, or a combination of opposed and alternating (i.e., alternating corners), whichever is appropriate for the particular articles being stored therein. Alternating opposed tabs may be particularly advantageous where there may be a tendency for articles to be dropped by the pickup head 224. When alternating tabs are used, the article is allowed to "tilt" in one direction as it moves past a tab on one side, and then tilt in an other direction when the article moves past the opposed tab.

Different materials can be used to make tabs of different flexibility, as may be appropriate depending upon the weight of the articles and the vertical spacing between the tabs. In operation, segments 1202 can be prefilled with articles before the segments are brought to the machine 2 for re-stocking, or they can be filled by the vending machine operator when she arrives at the machine.

Although this technique provides a quicker method and apparatus for refilling bins 1200 with articles to be vended, it does not appear to lend itself particularly well to use with article storage bins which are to be grouped for simultaneous handling, such as by use of the macrobox technique described above. When the bin segments are grouped so as to form a full height bin 1200 and placed in a macrobox, the full height bins must still be removed from the macrobox in order to be broken down into bin segments in order to be re-stocked with articles while maintaining a FIFO ordering of the articles. Additionally, there is still the possibility that after the filled bin segments are assembled into full height bins, if the bins are placed in the macrobox at a position which is not in accordance with the specific "plan-o-gram" or matrix for that machine (and the controller of the vending machine is not updated), then the article handling mechanism will retrieve and dispense incorrect articles to the customer. Improvement in at least these areas would be desired.

It would be desirable to maintain the advantages of simultaneous bin handling using the macrobox technique, without losing the benefits of rapid FIFO bin refilling as know by the bin segment technique. Additional advantages are also desirable.

It is noted that although one preferred environment for the inventions described herein would be in a vending machine of the type shown in FIG. 1, namely one using a robotically controlled article gripper for retrieving/dispensing stored articles from a plurality of axially aligned, vertically positioned, article storage columns, the invention may just as easily find use in the storage area of an article handling apparatus which is not a vending machine, and the article handling apparatus does not necessarily have to be a robotically controlled article gripper, nor do the article storage columns need to be vertically oriented. That is, any type of article gripping mechanism can be used, the mechanism can be either manually or automatically controlled, and the article storage columns can be horizontally oriented or at some angle which is in-between vertical and horizontal. These are only some of the variations that can be made to the present invention and the environment where it may find particular use. That is, the bin magazines of the present invention could carry columns that are horizontally oriented, and provide access to the dispenser mechanism at one end of the columns, and loading access to the column at an end of the column that is opposite the dispensing end, such as at the front and back, or top and bottom, respectively, of the dispenser.

The present improvements are principally found in the following areas:

the layout or "Plan o gram", for the article handler (such as in one embodiment use of a movable left bin magazine, a movable right bin magazine, and a movable center bin magazine);

a movable bin magazine including a bin-segment guidance structure adapted for individually guiding groups of bin-segments which are preloaded with articles, so as to form therewith a plurality of axially aligned article storage columns, where the guidance structure includes a receiving device which provides individual coupling to the article storage bin-segments, so as to allow grouping of the article storage segments into the plurality of axially aligned article storage columns;

methods for refilling an article handler of the type using such a movable bin magazine.

a hinging-together of at least two of the movable bin magazines; and a weight bearing support useful for moving the bin magazine into and out of the article storage area, as well as various improvements relating to the article storing segments.

Many variations are possible, such as hinging together all of the bin magazines contained in the article handler, such as adding wheels to the bottom of the bin magazines, or substituting slides therefore to assist with its movement into and out of the storage area.

Figure 5:
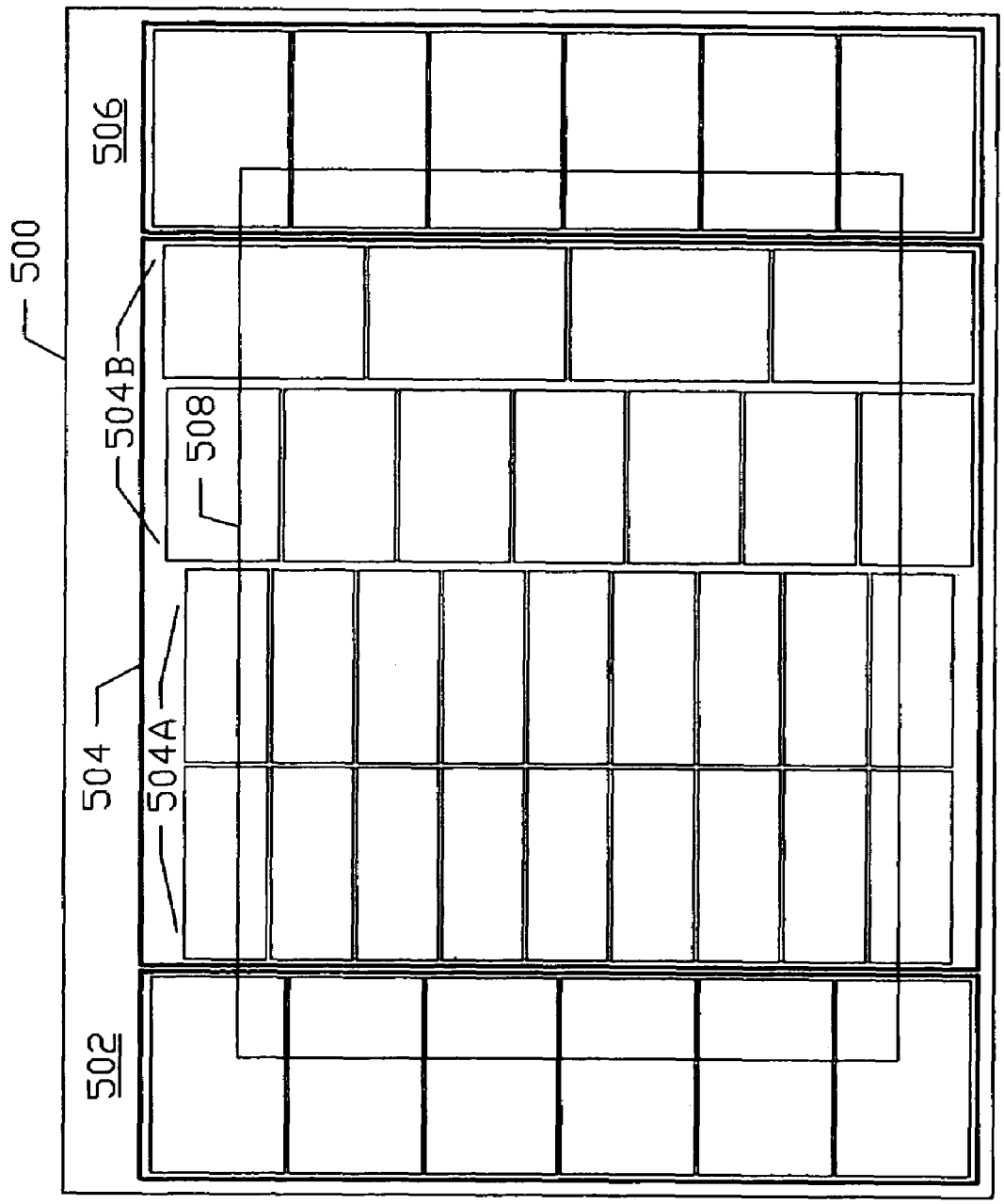
FIG. 5 illustrates a cross-sectional top view of a vending machine such as shown in FIG. 1, having an exemplary article storage plan-o-gram.

FIG. 5 illustrates a cross-sectional top view of a vending machine such as shown in FIG. 1, having an exemplary article storage configuration, commonly referred to as a plan-o-gram, which is laid-out in accordance with one aspect of the present invention. Plan-o-gram 500 is arranged so that refilling of the vending machine with articles can be accomplished in a quick and reliable manner. In this embodiment, the article storage area is completely filled using three bin magazines, bin magazine 502, 504 and 506, located on the left side, center and right side, respectively, of storage area 215. Bin magazines 502 and 506 each have only one row of article storing columns, while been magazine 504 includes four rows of article storing columns and comprises a cart. This arrangement takes maximum advantage of the unobstructed access into storage area 215, and uses bin magazine cart 504, to be described in greater detail later, so that the cart can be quickly, simply and reliably simultaneously moving an array of four article storage columns into and out of the storage area of the vending machine.

Note that differently sized and oriented article storing columns are used, as appropriate, in order to maximize usage of the storage area to accommodate desired articles. However, it is not economically feasible to have a great number and variety of differently sized columns. Accordingly, certain standardized sizes for the columns is preferred, and differences in article shapes/sizes in accordance with one aspect of the invention, is taken into account by using integrally formed resizing elements (described in greater detail later). In the illustrated embodiment, the larger columns of magazines 502, 506 and those on the right side of magazine 504, can be used for items such as bags of salty snack foods (such as Dorito's® potato chips) and/or pastries (such as Pop Tarts®), while the narrower columns on the left side of magazine 504 can be used for smaller items such as candy bars (i.e., Snickers®). Additional types of articles which could be handled includes containerized beverages such as milk, soda or water or water bottles, sandwich containers, photographic film container, or other food and non-food articles.

In one preferred embodiment, bin magazines 502 and 506 are initially positioned into their respective place at the left and right sides, respectively, in article storage area 215, and then magazine cart 504 is moved into position therebetween, preferably using wheels mounted on the bottom of magazine cart 504. Line 508 illustrates the outer perimeter path of pickup head 224, which clearly shows that the top (dispensing end) of all of the article storing columns is accessible thereto. Cabinet 12 preferably includes a shelf or other suitable mounting area, which may also include a "key" arrangement (such as a series of pins in the cabinet back wall or floor which mate with a corresponding series of holes in the bin magazine), for one or both of supporting/securing and/or guiding into a predetermined position, the bin magazines 502 and 506. A similar "key" arrangement can be used for bin magazine 504 after it has been rolled into place in storage area 215, one portion of the key arrangement for locking the magazine into a position so it doesn't move after positioned, and a second portion of the key arrangement to ensure that the position it is moved into is a repeatable and pre-determined position for that bin magazine, after all, if magazine 506 was inadvertently switched with magazine 502 during servicing, the following customers would received erroneous articles. A shelf for supporting the magazine 506 is shown in FIG. 14, and described later on.

Figure 6:
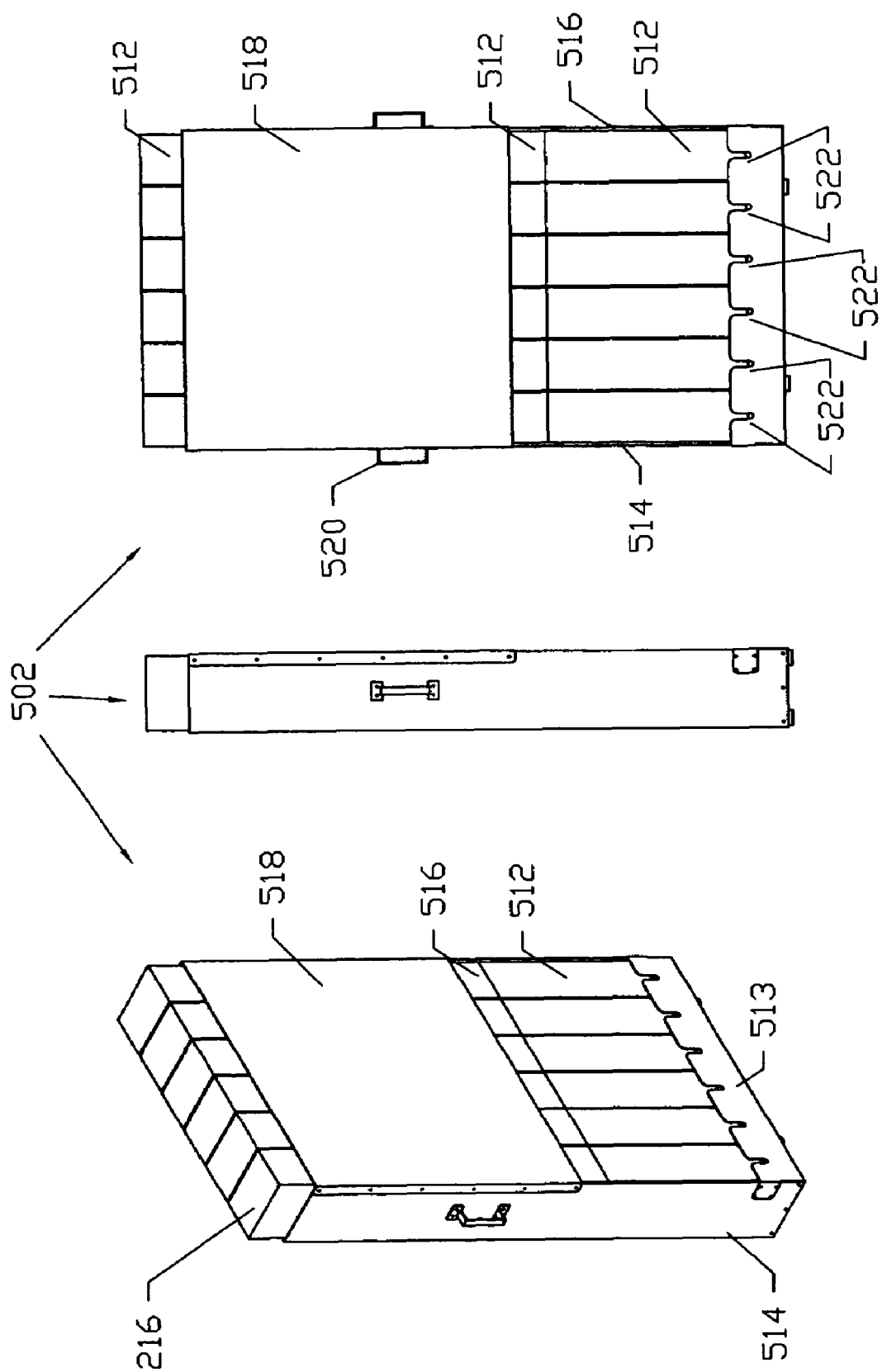
FIG. 6 illustrates isometric, side and front views of a bin magazine for positioning on the left side of the vending machine storage area.
Figure 8:
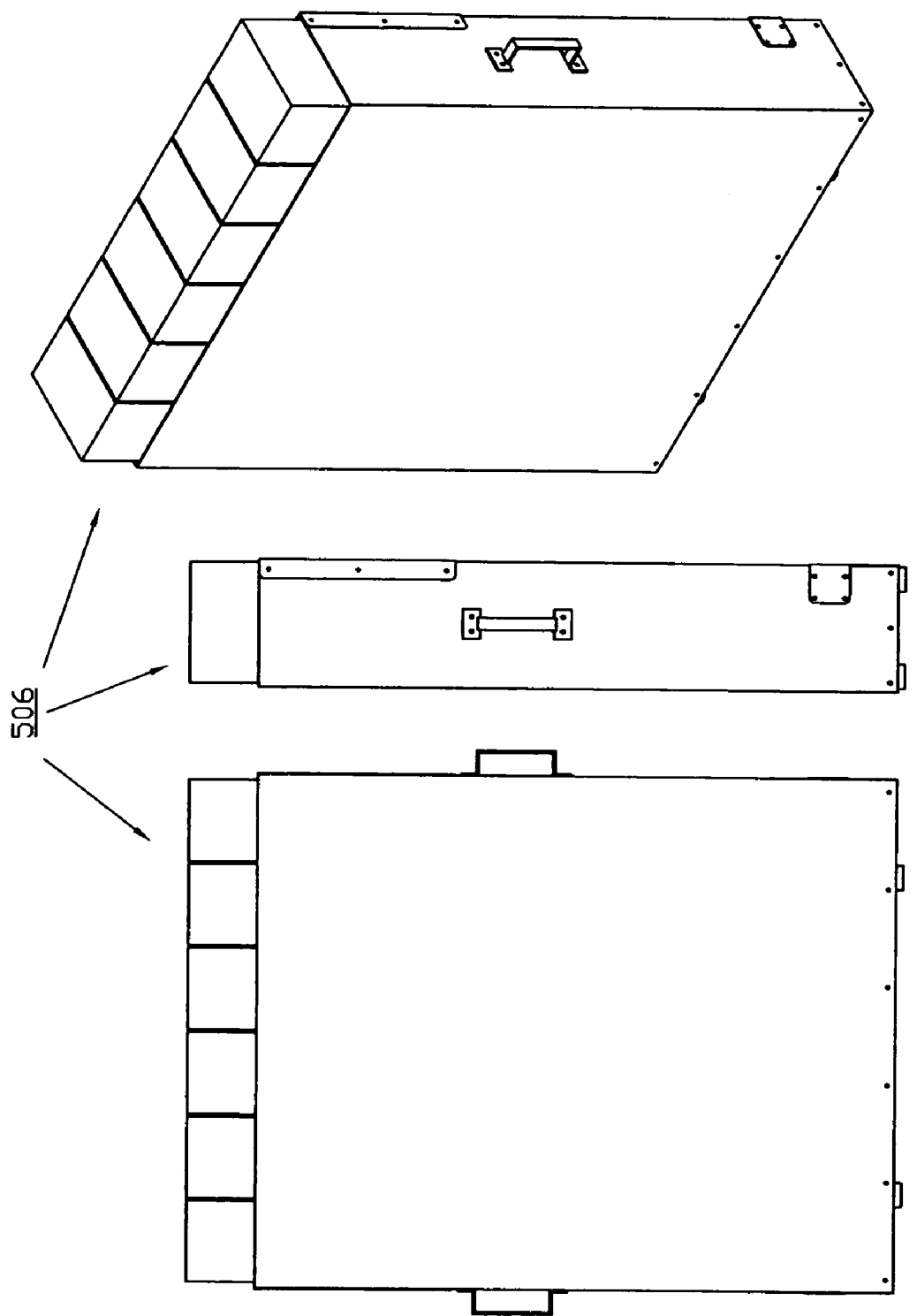
FIG. 8 illustrates front, side and isometric views of a bin magazine for positioning on the right side of the vending machine storage area.

FIGS. 6 and 8 illustrate isometric, side and front views of magazines 502 and 506. Each magazine comprises a one by six array of columns 216, each column comprising a vertical stack of three article storing segments 512 (although in further embodiments more or less segments could be used). Each of magazines 502 and 506 comprise a sled formed of a suitably strong material, such as sheet metal and includes a bottom rectangular portion 513 having vertically oriented walls 514 and 516 at opposed end thereof, thereby forming a U-shape for these magazines. Walls 514 and 516, and the wall therebetween which forms the back of magazine 502, can be formed of a single piece of sheet metal. A support wall 518 is positioned so as to span the front surface of magazine 502 between walls 514 and 516. A lower edge of wall 518 is positioned a predetermined distance above the floor 513 so as to form an opening at the bottom of magazine 502 which will allow insertion into the lower portion of the article columns 216 of bin segments 512 which are filled with fresh articles to be dispensed. Use of this opening, as will be described in greater later, also allows the upper segments to slide in an upward direction when the lowermost segment 216 is raised, thereby making room for the new segment. Replacement of fresh bin segments using this technique preserves a FIFO dispensing order for the articles. A hole near the lower end of the bin segments can be used for inserting a finger or tool to assist in raising the lowermost bin in the column so as to make room for a fresh bin, thereby preserving FIFO.

In a further embodiment, upper and lower support brackets can be used in place of wall 518, and the space therebetween can be spanned by a smooth LEXAN or PET plastic sheet, for reducing the weight of magazine 502, while providing a smooth surface for segments 512 to slide along as they are raised during the column refilling process. This embodiment also advantageously allows the service person to actually see all the bins in the magazine, and thereby verify correct segment positioning and if the segments themselves are made of at least a translucent material to visually verify that the correct products are stored at the correct places in the bin magazine. It is also noted that in the event that the segments are not made using a clear or transparent material to aid visibility of the articles stored therein, the holes described herein which are used for lifting the segments, would also serve this visual inspection purpose.

The same type of material used to make wall 518 could also be used for making flexible dividers/guides that may be positioned between the columns of segments, for guiding and improving the "slideablity" of the segments in the magazine. FIG. 21B illustrates, in the interest of clarity, insertion of a few such dividers into bin magazine 504A.

Slideability is improved by the fact that the surface of the dividers covers/prevents any screws or other fasteners used for the forming bin magazine, or any edges thereof, from hindering smooth movement of the segments during a refilling operation. In accordance with one aspect of the invention, such dividers also function so that when a segment is removed from a top of the column, the divider flexes into the space of the column, thereby blocking the insertion of an additional segment into the column from the dispensing end thereof. This action helps enforce FIFO refilling of the magazine. Although in FIG. 21B dividers 916 are shown substantially straight, it is because although the bin segment are not show positioned therebetween, the effect of the bin segments so positioned is still shown in the figure. Accordingly, only the very top of the dividers is allowed to flex/bend.

In accordance with another aspect of the invention, such flexing also causes the top of the divider to serve as a "catch" or provide a retaining force to the top edge of the top segments, thereby making it less likely that an empty segment will be lifted up by the passing therethrough of articles being dispensed from a lower positioned segment. Even furthermore, the flexible dividers provide a uniform and constant urging force between the segments, thereby helping to keep them in alignment with one another (and helping insure the accuracy of their position, as required to properly dispense articles in accordance the pre-programming of the article dispenser arrangement), as well as maintaining a snug/tight relationship with the segments of the adjacent column. If desired, the top of the dividers could have an additional bend or even an added protrusion so as to aid in keeping the top segments in place when they are lightened as a result of being previously emptied of articles to be stored. In an even further embodiment, a selectively movable bar could be positioned above the top segments in each column to help retain them during the dispensing operations, yet is movable to allow the segments to be removed during the refilling/servicing operations.

Figure 21A:
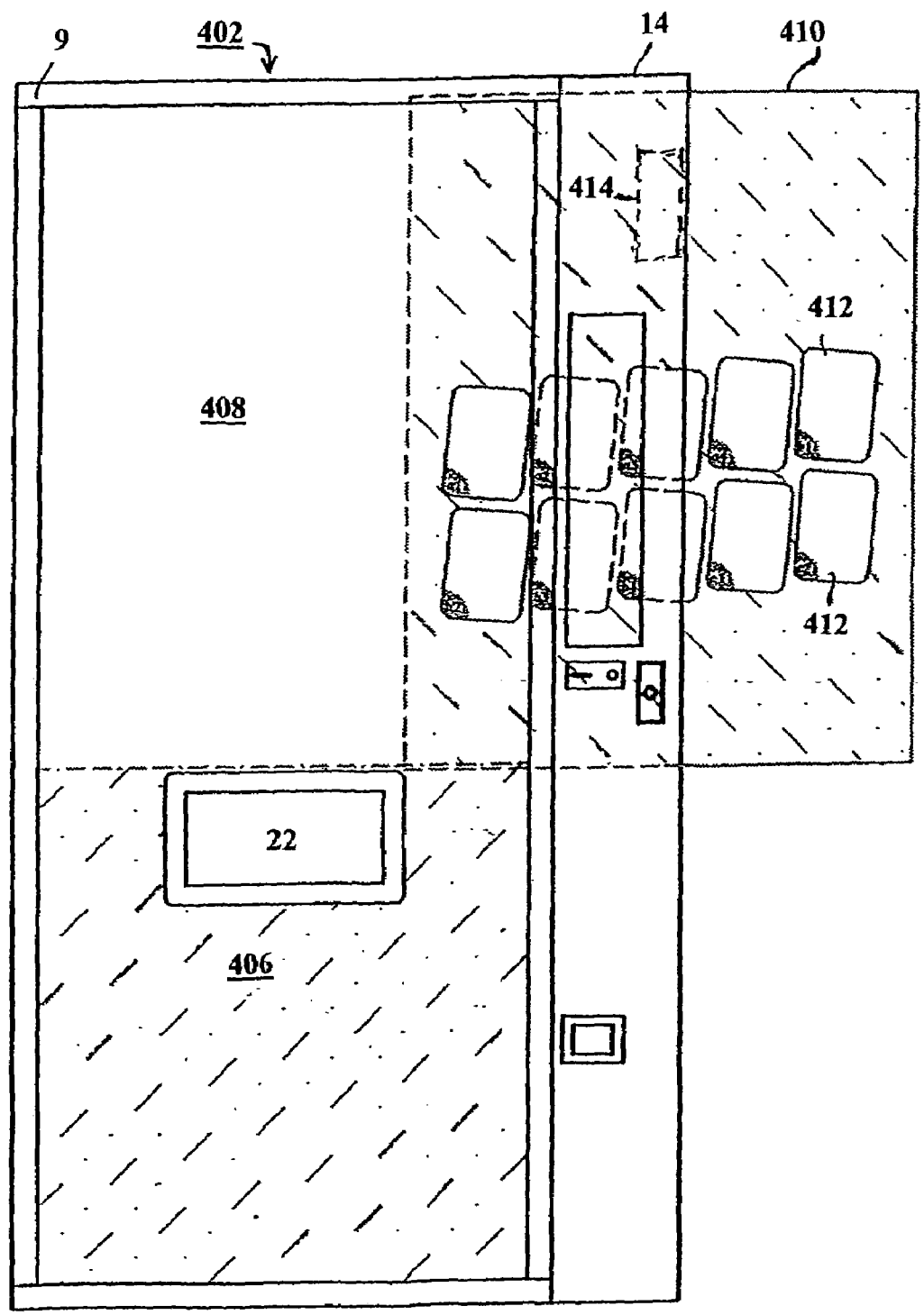
FIGS. 21a and 21b illustrate the cooperation of a replaceable graphics panel with a clear portion of a pre-printed graphics panel mounted to the front door of the vending machine of FIG. 1, for enabling customization of the display face of the vending apparatus of FIG. 1 in accordance with a further aspect of the present invention that enhances brand loyalty, and reduces errors in re-loading.
Figure 21B:
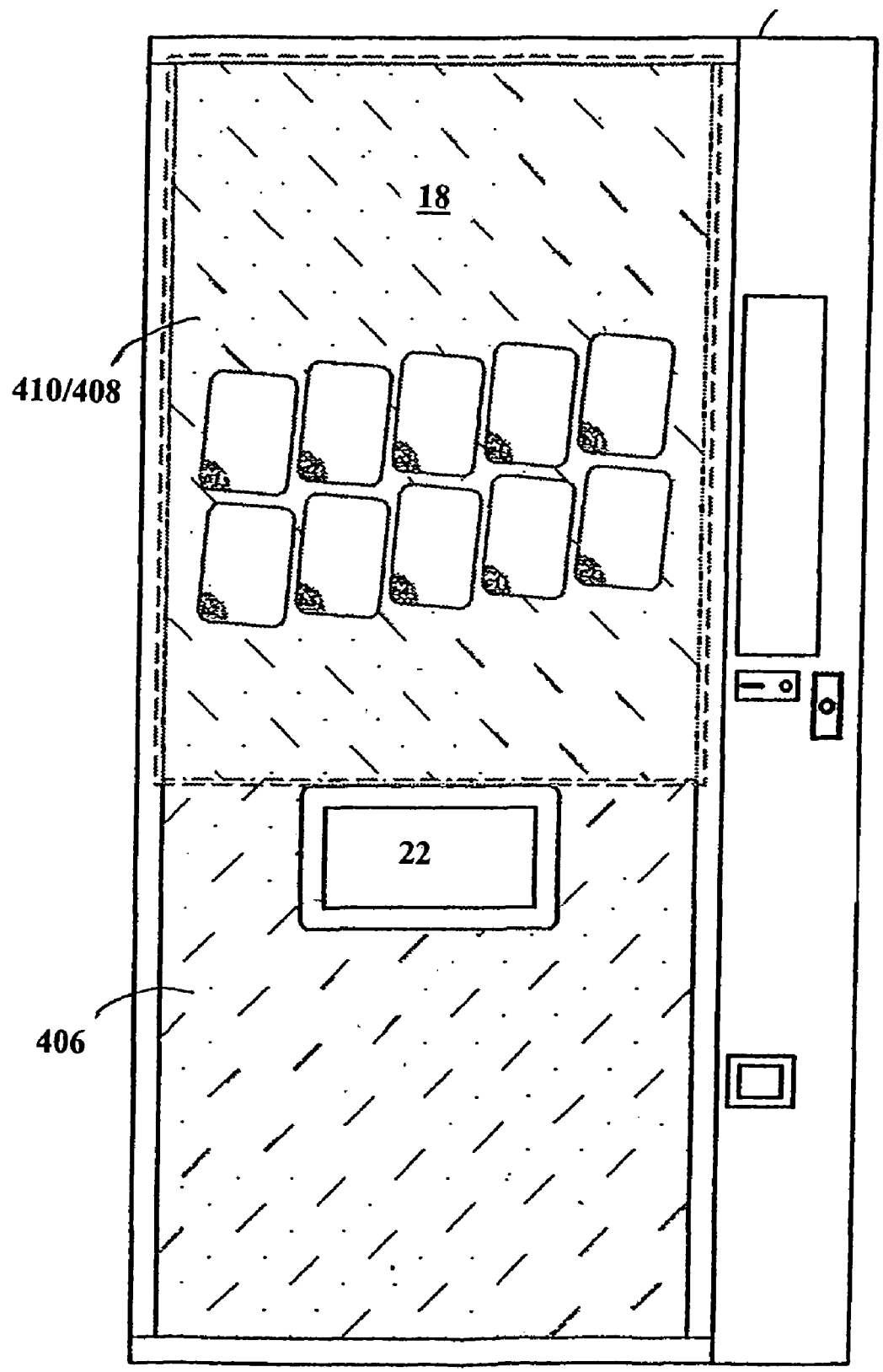

In one embodiment, shown by FIGS. 21A and 21B, the dividers can be formed by cutting strips 916 out of a roll of PET, polyvinyl or polycarbonate sheet material, so that along their length, there is a natural and permanent curl 916' in the direction that the material was stored as a roll. All the dividers used to form the columns in the article storage structure should then be placed so that their pre-set curl acts in the same direction between each of the columns, and the top of the dividers should extend slightly above the top of the top segment. Once the columns are loaded with segments, the longitudinal curl in the dividers is prevented from taking place, until a top segment is removed, as noted above, thereby curling into the vacant space left by the removed upper segment, and helping to ensure FIFO by at least partially blocking access into the column from the dispensing end thereof. Additionally, it is believed that the urging force which aids the tight fit between the columns is generated by a "cupping" of the dividers along their width, which may result from the adjacent columns forcing the dividers to be straight along their length. This cupping aids a uniform tension fit between the adjacent columns. Due to the tendency of the dividers to curl, when a lower segment is removed, the divider on one side of the access opening formed by the removed segment, may slightly curl into the access opening. This may not be an impediment to the insertion of a new segment into that opening, since if the natural curl of all the dividers are in the same direction, the intrusion in the access opening by a divider at one side, will not happen at the opposite sidewall of the opening. In an alternative embodiment, if may be desireable to provide the dividers in pairs between each column, with the natural curvature of one of each paired divider being opposed to the natural curvature of the other one of the paired dividers. Thus, there will always be at least one side of an access opening that has a smooth edge which will allow at least a corner of a new segment to be loaded into the opening.

Figure 9:
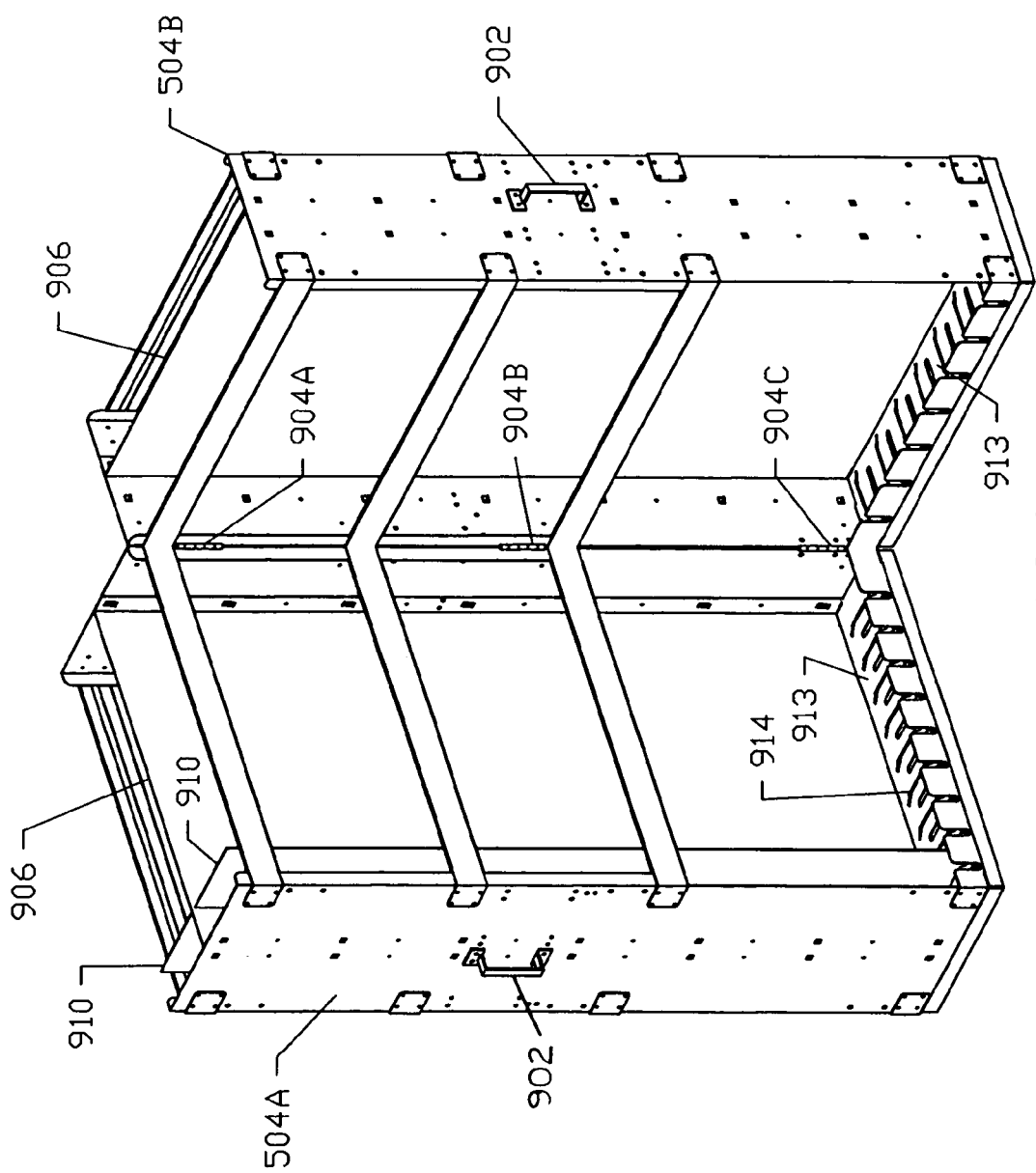
FIGS. 9 and 10 illustrate the bin magazine of FIG. 7 in an open position, with and without, respectively, a partial loading of article storage bins therein.

The dividers could have an "I" shape at their lower end, so that ends 915 of the "I" shape can be bent inward so as to match the curvature of slots 914 formed in floor 913 (also shown in FIG. 9, to be described). After the ends of dividers 916 are so inserted, when the ends 915 spring back to their naturally straight shape, they are trapped below raised floor 913. Attachment in a manner like or equivalent to this is desirable in order to not only prevent the dividers from falling through floor 913, but also to prevent them from raising off the floor when bin segments adjacent thereto are raised. Additionally, such attachment locates the dividers at a predetermined desired position in the bin magazine, thereby maintaining the centers of the bin segments at predetermined positions. Such predetermined positioning is important due to the pre-set programming of the robotic article pickup head 224. A further embodiment useful for attaching a divider to floor 913, is by use of a different shape at its end, as shown by divider 918. Here, a simple ninety-degree cut-out 919 at each of the lower corners allows use of shorter length slots in the floor, so that the slots are less detrimental to the structural integrity of the floor. The shoulders formed at the junction of full width of the dividers and the cut-outs 919 prevents the dividers from falling further into the floor. An "L" shaped bend 920 formed at the end of the dividers 918 results in a tab that is simple to angle and slide into a slot like 914 but without the angled end sections, and then result in the divider 918 being retained thereby so as to not be lifted up as adjacent bin segments are raised. As with the dividers described in the priority documents, it is most important that the dividers be positioned properly at floor 913, but higher up in the magazine, their main function is to assist slideability of the segments in the columns. Alignment of the bin segments at the top of the magazines is facilitated by having and maintaining a tight fit of the adjacently positioned columns.

Figure 7B:
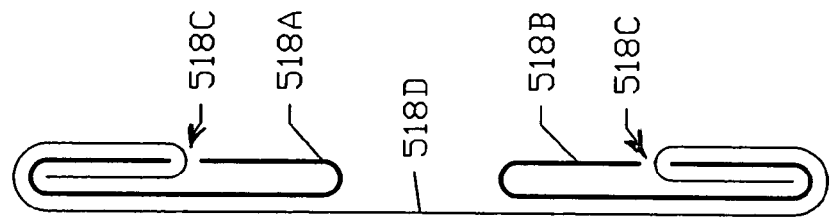
FIG. 7B illustrates a support bracket and clear front wall useful in any of the forenoted bin magazines.

FIG. 7B illustrates such an alternative embodiment of wall 518 using upper and lower support brackets 518A and 518B. Brackets 518A and 518B are made using sheet metal having upper and lower longitudinal halves which are folded inward for additional longitudinal strength. Such folding forms a hem which has an opening 518C in the center of the hem. Opening 518C advantageously serves as an attachment point for the plastic sheet material 518D used to form the remainder of wall 518, when the sheet material is suitably folded at its ends and inserted into the opening 518C. Preferably, the opposed upper and lower ends fo sheet 518D are bent 180 degrees, and the lower bend is placed or slide into the hem of bracket 518B, and the upper bend is placed or slide into the hem of bracket 518A. Thereafter, tension can be applied to the sheet 518D by suitable slight spreading of the distance between brackets 518A and B before mounting them to the walls of the magazine.

A vertical retaining wall portion of floor 513 which helps to retain the lower bin segments 512 therein, includes a plurality of slots 522 therein which are aligned with the center of each column 216. Slots 522 facilitate insertion of a tool or finger for raising of a lower bin segment in a column so as to make room for the introduction into the column of a new segment freshly loaded with articles to be vended.

FIG. 19A and 19B illustrate isometric and side views, respectively of a reloading assistance tool 2500 which operates in conjunction with slots 522. Tool 2500 comprises an elongate structure, in this embodiment a rod 2500, having a segment lifting hook 2502 near one end, and a tool retaining hook 2504 near the other end. A user handle 2506 is provided near hook 2504. The length of the rod between the two hook is slightly greater than the distance between the upper and lower edges of wall 518. The reloading tool can be used by the service personnel to aid reloading of the magazine with new segments, by facilitating raising bin segments 512, thereby providing room for the addition of bin segments fully loaded with articles to be inserted in the opening now provided at the bottom of the column. The hook at one end of the rod can be inserted into a hole or slot at or near the bottom of one of the segments 512. As shown in FIG. 9 and FIG. 20B, the floor 913 is actually a sub-floor, in that it is raised so as to create a small space thereunder. This space allows the full length of hook 2502 to be inserted under the bin segment to be raised, so that it can help support the items stored therein during the lifting process, and help prevent slipping of product out from the bottom of the segment.

After hook 2502 is inserted under the bin segment, the rod and bin segment can be raised by the service person until the lower edge of the segment 512 is raised to the point that it is even with the bottom edge of wall 518. At this point hook 2504 is placed on the upper edge of wall 518, so as to hold the lowermost bin segment in place. At this point in time, an opening at the bottom of that column 216 is maintained, and both hands of the service person is available for removing the empty segment from the top of the column and putting a new segment into the bottom of the column. Accordingly, with one hand the service person can retrieve the empty bin segment that is pushed out of the top of magazine 502 (which is put aside for refilling with fresh articles), while with the other hand a replacement segment (one loaded with articles to be dispensed), is inserted into the opening. Then reloading tool 2500 is removed by slightly raising it so as to release hook 2504 from the top of wall 518, and then lowered so that the bins that are above the opening are no longer held-up by the tool. This process is repeated at each column in the magazine until all of the empty (or even partially empty) bin segments are replaced. Partially empty segments can be refilled at the machine, or brought back to the warehouse for refilling with fresh articles.

Figure 13:
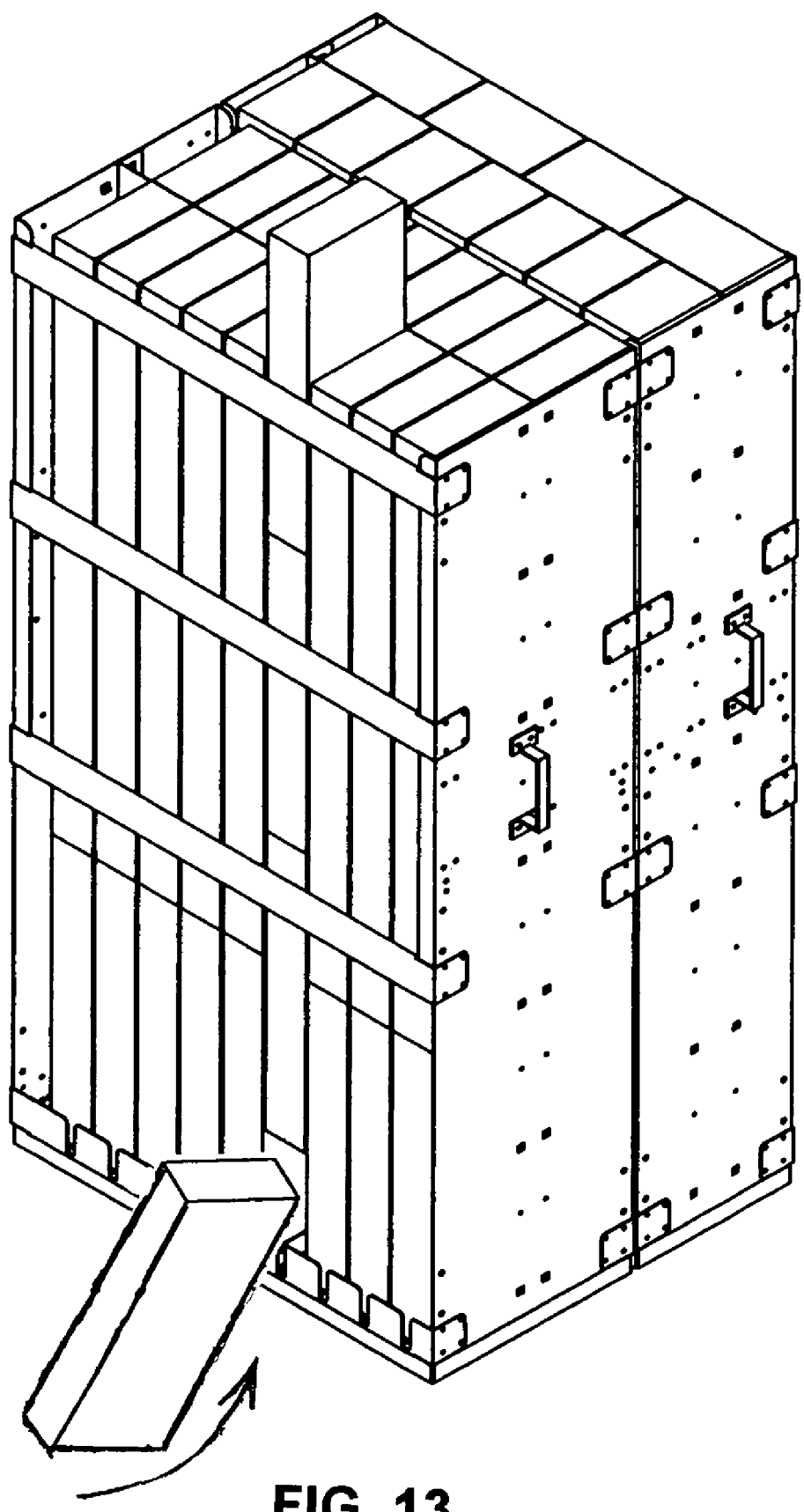
FIG. 13 is a photograph illustrating one technique for loading a bin magazine of the type described herein with a replacement article storage segment.

Replacement of articles into the storage are using this process results in a maintenance of FIFO requirements, since the articles stored in the magazine at an earlier time, are relocated in the column so as to be closer to the dispensing end of the columns than the newer/replacement articles. Thus, the older articles will be dispensed first. This process can be used with any of the bin magazines described herein, and allows for a simple, reliable, and very rapid refilling of the magazines with articles to be dispensed. Although use of a reloading tool is described to assist the serviceperson so she doesn't have to bend down during reloading, such reloading can be done manually by the serviceperson by bending down and inserting one's index finger into the lifting hole in the segment, in order to raise the segments during the refilling process. The photograph of FIG. 13 illustrates reloading without use of tool 2500. Note that the bin magazines have handles, such as handle 520 on magazine 502 to assist moving the magazine into and out of storage area 215. Skids or wheels can be included on the bottom of magazine 502 in order to aid its maneuverability, as well as the addition of handles 520 on wall 514.

The construction and operation of bin magazine 506 is substantially the same as bin magazine 502, and therefore further discussion is not deemed necessary.

Figure 10:
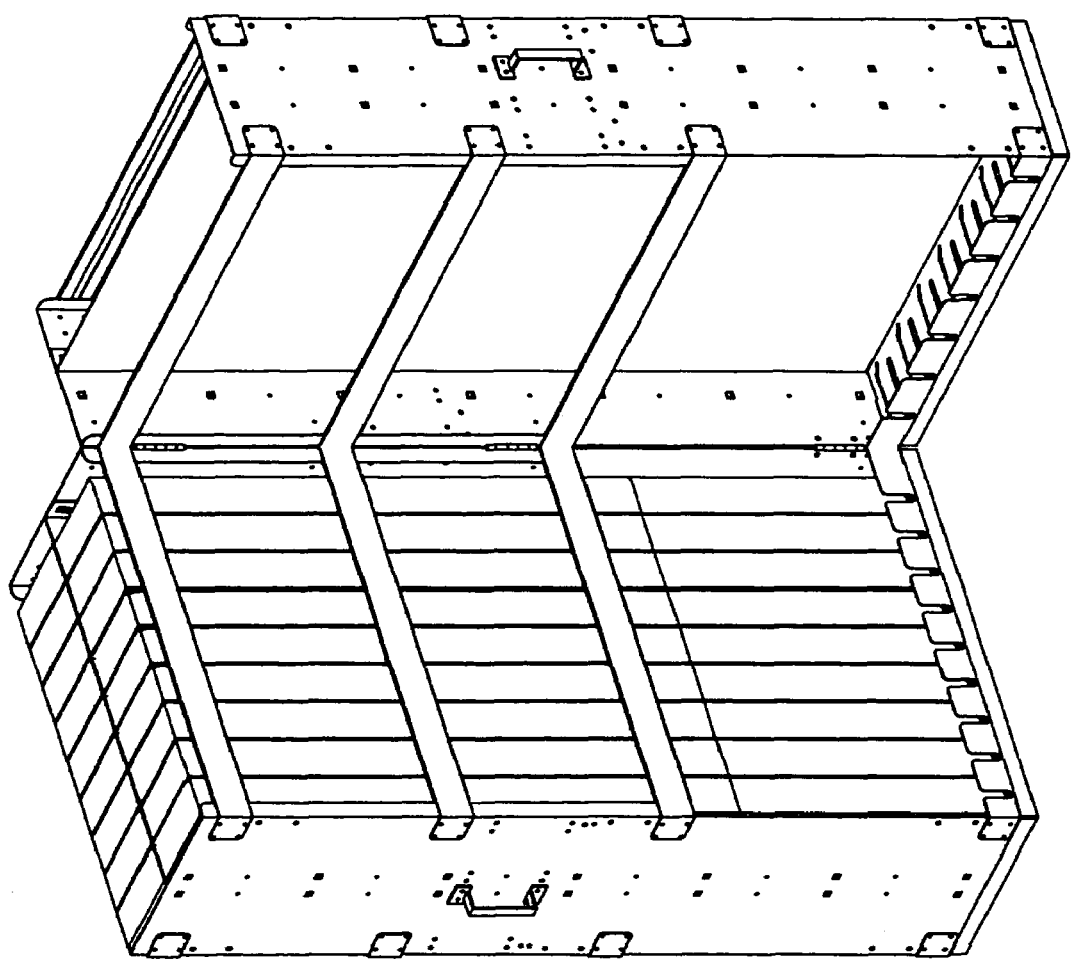

Central bin magazine 504 is illustrated in FIG. 7A in a closed position, and in an open position in FIG. 9 and FIG. 10. Magazine 504 is constructed and operated in accordance with principles of the present invention so as to allow a rapid refilling of the majority if not all of the interior portion of the vending machine. Since in the illustrated embodiment portions of the vending machine obstruct the left and right sides of storage area 215, the magazine 504 is dimensioned to maximize the usable unobstructed access to the storage area, while magazines 502 and 506 can be positioned into their locations at the left and right sides of area 215 before magazine 504 is inserted.

Central bin magazine 504 is basically constructed by hinging two magazines 504A and 504B similar to previously described magazines 502 and 506, together. Note that each of magazines 504A and 504B, however, each hold two rows of article storage columns. As shown in FIG. 5, magazine 504A holds two rows of relatively narrow columns (useful for candy), and magazine 504B holds two rows of larger columns (useful for larger items, such as bags of chips). In a further embodiment, if the usable unobstructed access to the storage area was wider, perhaps left bin magazine 502 could also be hinged to one of the front or back left edge of magazine 504A, thereby forming either a Z or M shape of three bin magazines. A set of wheels 701 mounted at the bottom of each of magazines 504A and 504B facilitate the moving of magazine 504 into and out of area 215. Additional bin magazines could also be hinged thereto, if there were sufficient unobstructed access space, so that in a further embodiment, the entire storage area 215 could be reloaded by moving into and out of the dispenser using only one "jumbo" bin magazine. The refilling technique noted above for the one by six row column of bin magazines 502 and 506 can also be used with each side of bin magazine 504, where a one by six row of columns is accessible at each side of each bin magazine 504A and 504B.

FIG. 7A also illustrates use of a magazine loading ramp 702, which in one embodiment can be hinged to the floor of cabinet 12 at the front edge of area 215, so it can be flipped up out of the way when not in use, and down to provide a ramp which will allow magazine 504 to easily roll into and out of area 215. Note, one side of ramp 702 includes a raised wall 704 which, in accordance with one aspect of the present invention, acts as a guide to assist safe and accurate movement of magazine 504 into and out of area 215.

Additionally, in accordance with a further aspect of the present invention, when ramp 702 is folded up after magazine 504 is loaded into area 215, the wall 704 advantageously acts, in combination with the lower-right side of the bottom of magazine 504, as a positioner/guide to ensure that magazine 504 is in the same and proper position that it was in previously. Such proper positioning of magazine 504 (as well as magazines 502 and 506), is desirable in order that the programming of the pickup head will not have to be changed in order for it to remain accurately programmed to find the center of each column. In a further embodiment, the other side of ramp 702 could also include a wall portion like wall 704, but in the illustrated embodiment, a fixed-position magazine guide (not shown) is positioned on the floor of cabinet 12 at the left edge of the opening into area 215. In an even further embodiment, ramp 702 could slide out from the cabinet instead of hinge out, and could even be replaced with tracks that slide out or fold/hinge out from the cabinet. In order that the ramp 704 not hinder with closing of the door 14, and by being in the way of chute 210 (FIG. 2), and present a smooth continuation of the floor of the cabinet to the wheels of magazine 504, in the actual embodiment, a pivoting hinge mechanism is provided at the outer edges of ramp 704. During operation, the top edge of ramp 704 is recessed into storage area 215 about 2 inches, so a one inch pivoting linkage is used to form the hinge between ramp 704 and the floor of cabinet 12.

As noted above, in order that the programming of the pickup head will not have to be changed, it is not only critical that the magazine have a repeatable position within the storage area, but that the columns of bin segments within the magazine also have a repeatable position within the magazine. To help insure this, the magazines include spacers, such as spacers 708 and 710 shown in isometric view of FIG. 7A, which keeps the bins in tightly arranged adjacent one another. Spacers 708 and 710 would fill the space shown at the top of section 504A shown in FIG. 5, and for aiding clarity are shown here as exemplary of the one type of spacer that can be used to prevent the position of the columns from changing due to the movements the magazines are subjected to during refilling/servicing. The column dividers also assist with keeping the columnar arrangement of bin segments tight, due to their above-noted "springiness.

FIG. 9 illustrates bin magazine 504 in an opened position, so that hinge 904A, 904B and 904C are clearly visible, which hinges serve to join together the rear ends of bin magazine sections 504A and 504B. Handles 902 are useful for moving bin magazine 504 into and out of storage area 215, and a latch of conventional design (not shown), located beneath handles 902 can be used to secure together bin magazine sections 504A and 504B after they have been serviced/refilled. As shown therein, magazines 504A and B each include a raised sub-floor 913 of construction similar to floor 513 described in conjunction with magazines 502 and 506, and includes slots which assist reloading of magazine 504 with fresh articles in the same manner as was previously described for reloading magazines 502 and 506. Each half of bin magazine 504 includes a divider wall 906, for further separating each half into a one by six array of columns 216. A solid divider wall 906 is particularly useful in that it maintains a smooth surface for the segments to slide over. In an alternative embodiment, in an effort to save weight, wall 906 could be replaced with support brackets and a plastic sheet, similar to the alternative embodiment discussed above for wall 518 in conjunction with FIG. 7B.

FIG. 10 illustrates the bin magazine of FIG. 7A, where portion 504A is shown fully loaded with bin segments.

Figure 11:
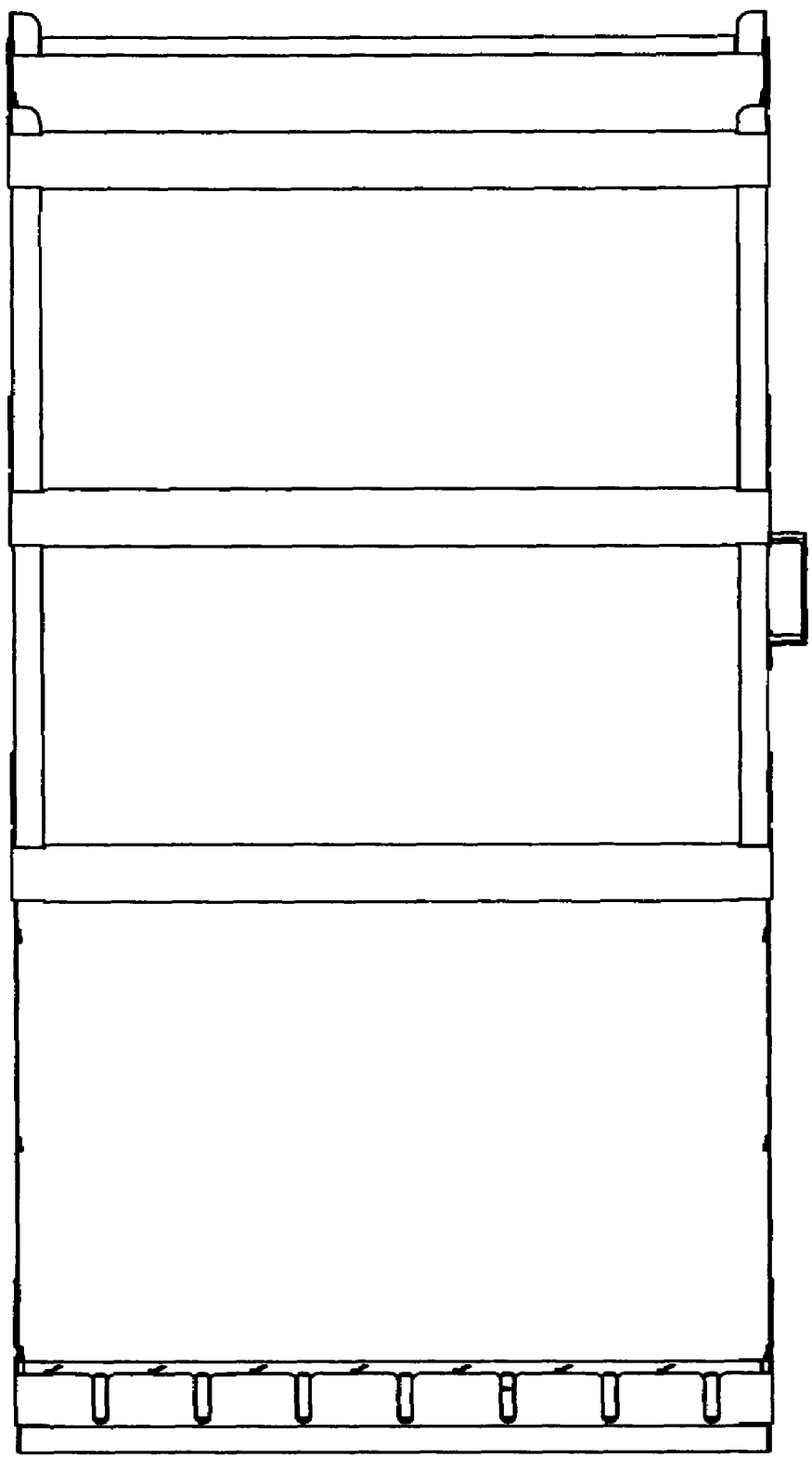
FIG. 11 is a photograph of the front view of bin magazine 504.
Figure 12:
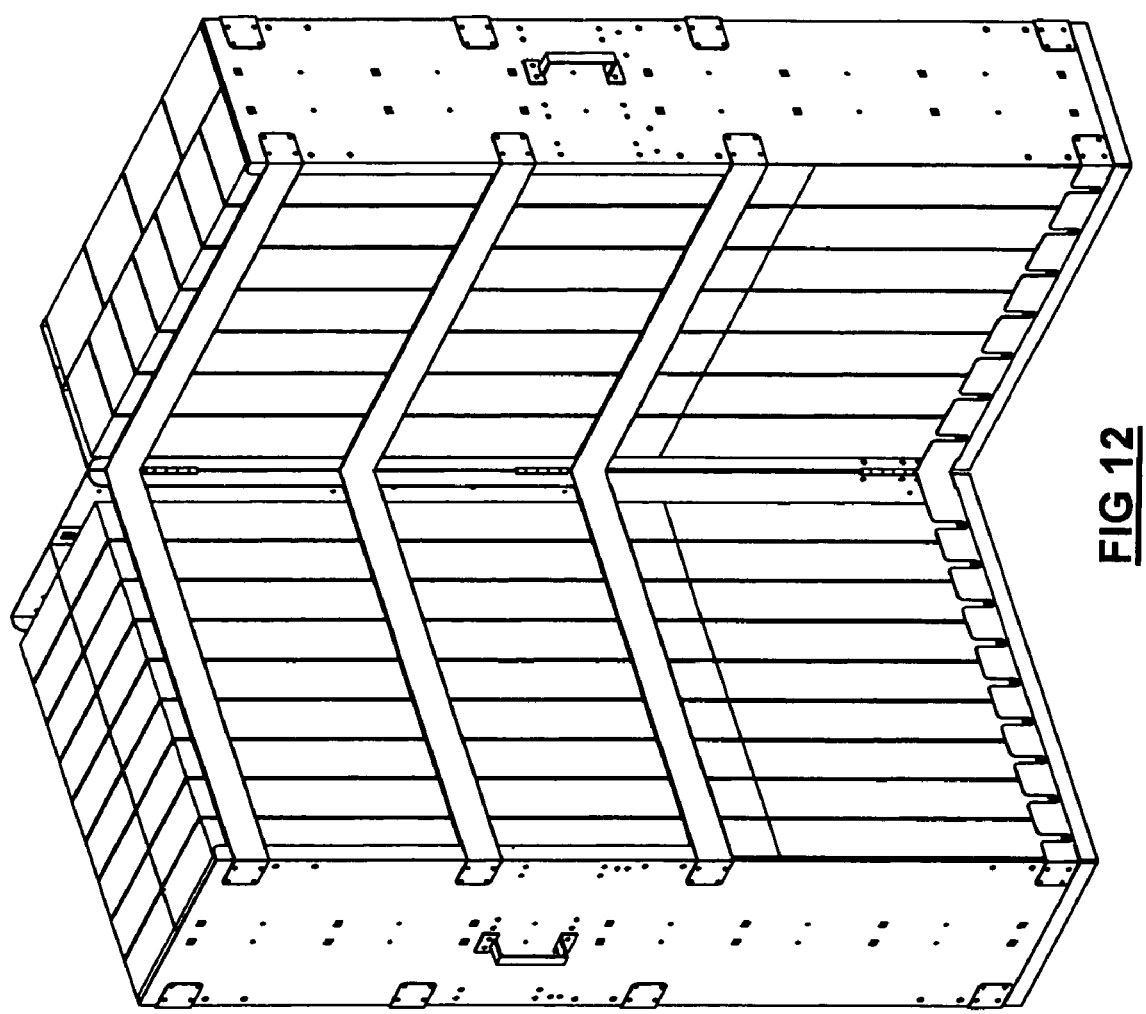
FIG. 12 is a photograph of the front you a bin magazine 504 in an opened position so as to show the article storage bins therein.
Figure 15:
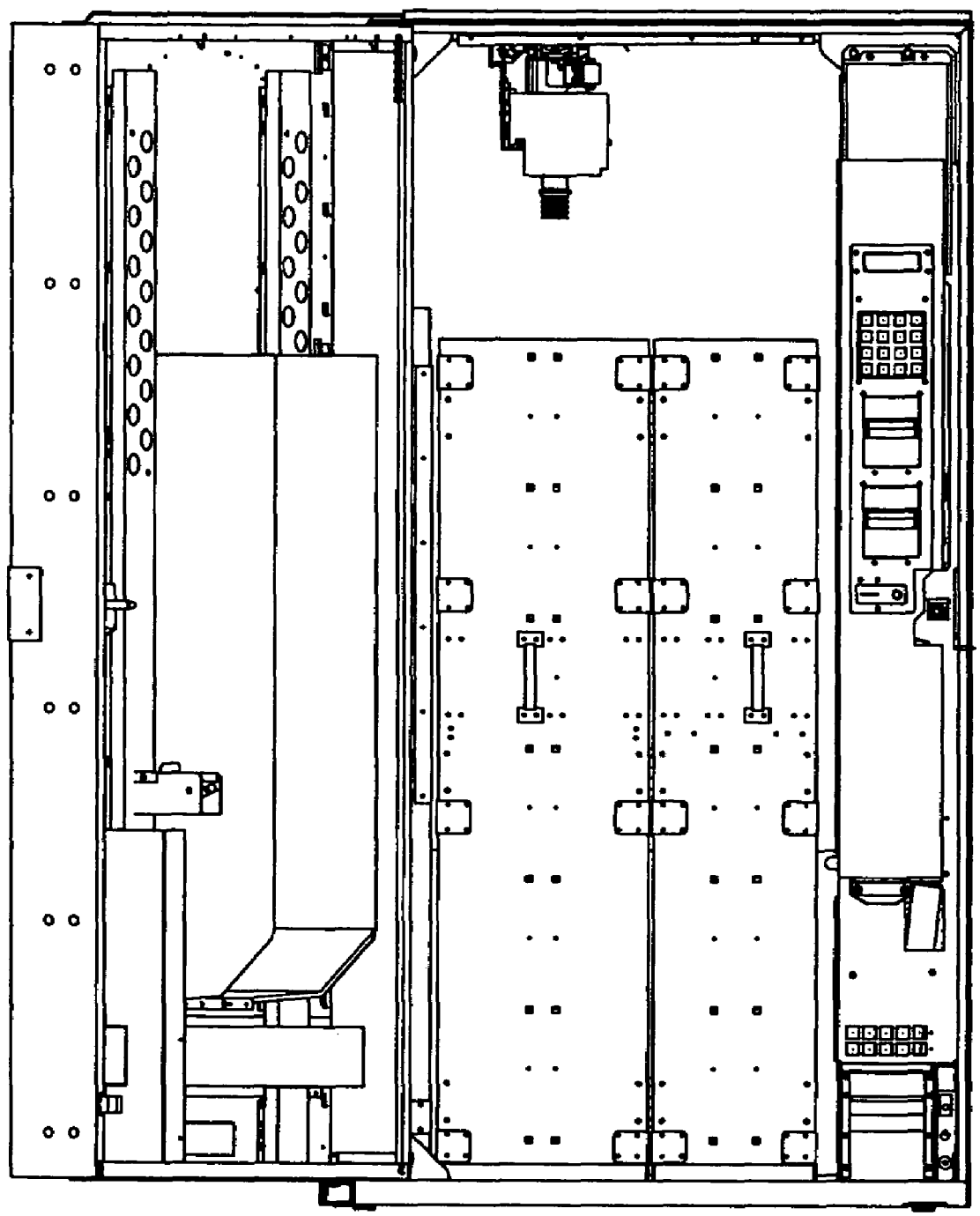
FIG. 15 is a photograph illustrating a vending machine fully loaded with bin magazines in accordance with the present invention.

The following photographs are provided for farther illustration of the above noted aspects of the inventions: FIG. 11 is a photograph of the front view of bin magazine 504; FIG. 12 is a photograph of the front view of a bin magazine 504 in an opened position so as to show the article storage bins positioned therein; FIG. 13 is a photograph illustrating one technique for loading a bin magazine of the type described herein with a replacement article storage segment; FIG. 14 is a photograph illustrating the bin magazine of FIG. 8 in position in the storage area of the vending machine of FIG. 1; and FIG. 15 is a photograph illustrating a vending machine fully loaded with bin magazines in accordance with the plan-o-gram of FIG. 5.

Although the illustrated magazines 502-506 in accordance with the invention have openings formed on one or both of the front and back sides of the magazine, in a further embodiment, the openings can be formed in the floor of the magazine, in which case new segments can be reloaded into the magazine from directly below the column.

As previously noted, in accordance with one aspect of the present invention, article storage segments 512 are provided for use in conjunction with the bin magazines, which segments are advantageously pre-filled with articles to be vended so as to minimize time spent reloading machine 10 with articles. Such pre-filling can advantageously be done by the operator by loading articles into the segments 512 back at the operator's warehouse, and even more preferably, the operator can purchase the articles to be vended directly from the article manufacturer in a form where they are already pre-packaged in such segments, or paper sleeves which bundle groups of the articles and allow quick refilling of the segments 512. Segments 512 can provide all of the functionality and advantageous of the prior art segments 1202 shown in FIGS. 4A-C herein, plus more. Of course one of the primary advantages is the time saved at the vending machine during a typical refilling operation, however there are additional advantageous. For example, one of the advantages provided by segments 512 is that they can include flexible "anti-crush" tabs 1302 such as those shown in FIG. 4B herein, for at least partially, and preferably fully, supporting the weight of articles stored above the tab in the segments.

Extra strong tabs are particularly advantageous at the bottom of bin segments, and can function as "end stops" to prevent articles stored in the segment from falling out during transport and handling of the segments from a manufacture of the articles, a distribution center for the articles, as well as during refilling of a bin magazine. If the articles are sufficiently sturdy, additional anti-crush tabs along the length of the segment will not be required. Additionally, if required, they can be used along the length of the segment or segment insert, so as to provide corresponding tabs on opposed or adjacent walls of the segments, or both opposed and adjacent walls for maximum support of the articles stored therein. Further embodiments for article segments will now be described.

Figure 16:
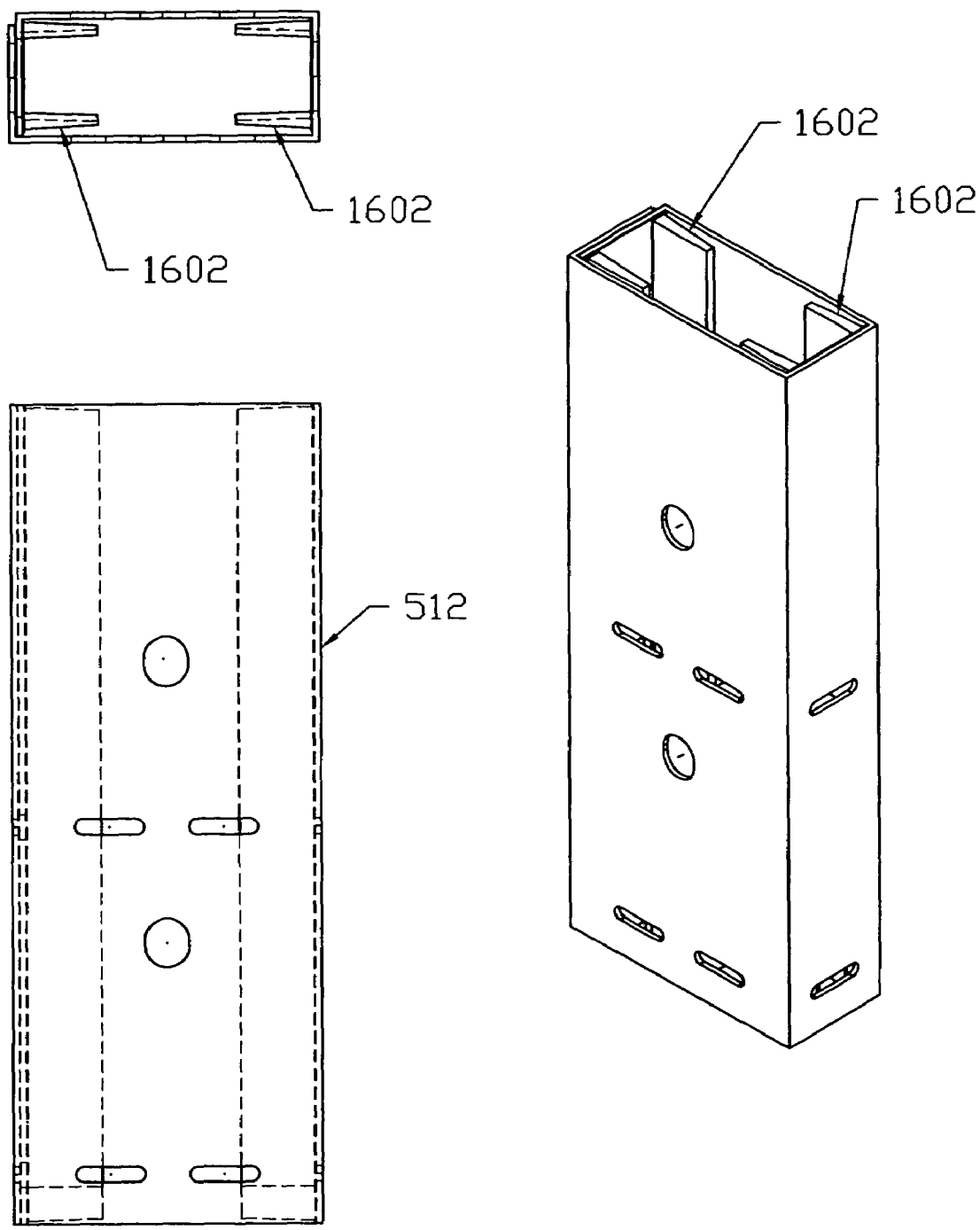
FIG. 16 illustrates top, side and isometric views of exemplary bin segment including an article resizing insert in accordance with one aspect of the present invention.
Figure 17:
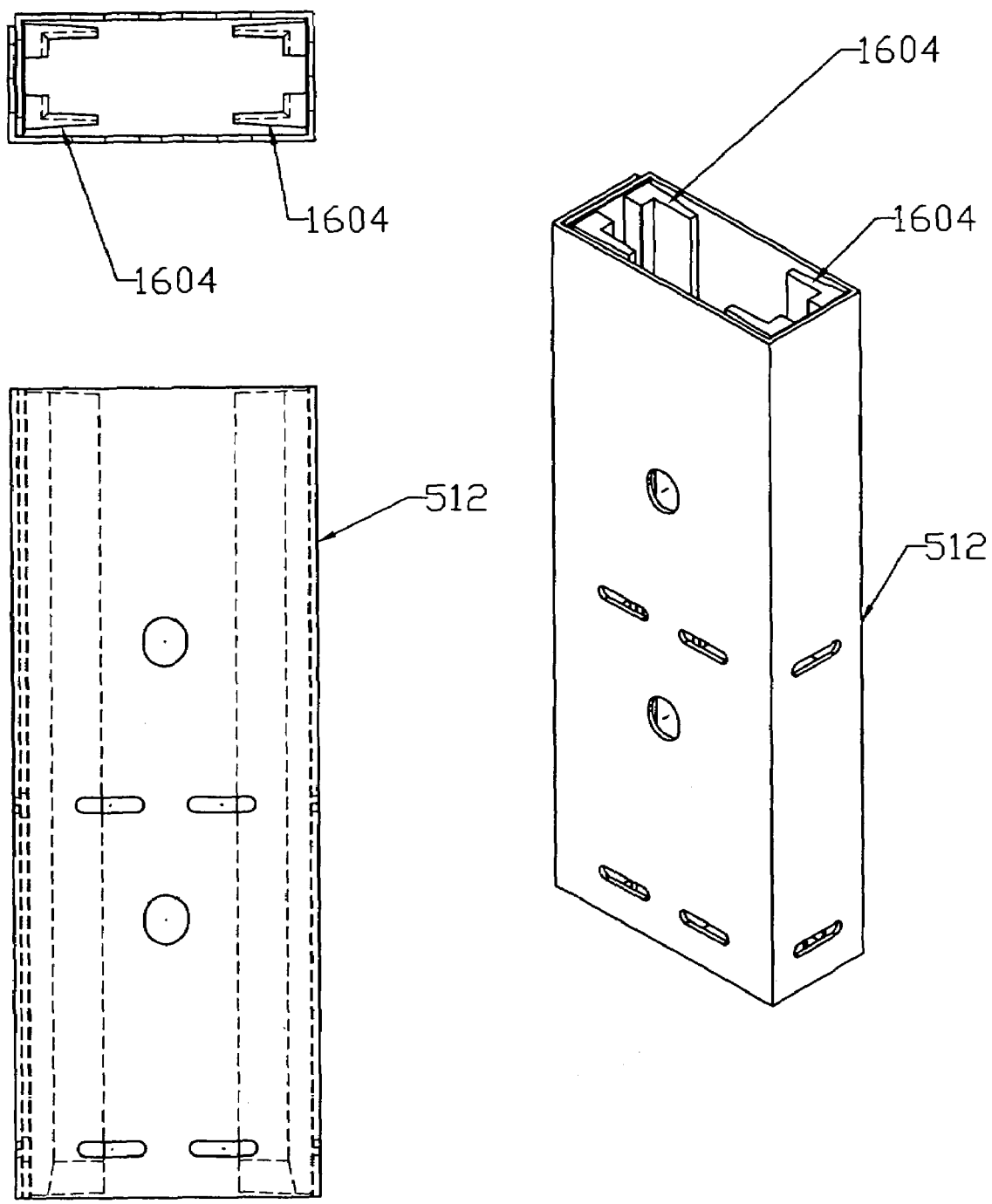
FIG. 17 illustrates a bin segment similar to that of FIG. 16, but which has an article resizing insert adapted for articles of a different shape/size.

FIGS. 16 and 17 illustrate top, front and isometric views of segments 512 constructed in accordance with one aspect of the present invention which are useful in the described bin magazine. To have the advantage of economy of scale, and to allow the bin columns in the magazines to have a standard with, it is desired to minimize the number of differently sized bin segments. Accordingly, a few standard sizes are generally chosen, and a portion of a bin magazine arrangement is dedicated to storing bins of that dimension and orientation, such as the row of bins in magazines 502 and 506, or one or both rows of bins in magazine 504A and 504B. Thus, segments 512 include, as necessary, resizing elements 1602 (as shown in FIG. 16) and 1604 (as shown in FIG. 17), which elements are inserted so as to adhere to opposed inside walls of the bin segments. Glue, double sided tape, etc. could be used to secure the resizing elements within opposed walls, and preferably the end walls, of the segments 512. It is noted that resizing elements 1602 and 1604 only narrow the inside cross-section of a bin at its ends, and not in the central area thereof, so as to minimize obstruction, and in fact so as to help guide, the article grabbing pickup head when it is moving in the bins 512. Resizing elements 1602 are useful for centering in the bin segments articles that are not as wide as the full width of the bins, but have approximately the same length as the bins, while elements 1604 include shoulder portions 1606 which are useful for centering in the bin segments articles that in addition to not being as wide as the full width of the bins, are also shorter than the length of the bins. Accordingly, the resizing elements will allow bin segments which have the same outer dimensioning (and therefore be mass produced), to be used to fit in a standard size column of a mass produced bin magazine. Using the appropriate resizing elements, such mass produced segments can properly position therein not only items having a form factor such as found in a bag of potato chips, but also items as differently shaped as a roll of breadth mints, or a snack bar. Such versatility in article grasping is easily provided by the suction cup gripper of previously described pickup head 224. Note that resizing elements 1602 and 1604 each include a taper at their lower end, so that the resizing elements do not present a sharp edge to any products as they are being lifted up the column past bin segments from which all of the articles stored therein have already been dispensed.

Additionally, the resizing inserts allow for different storage orientations for the items to be dispensed, such as placing bags of potato chips "on end" instead of flat. This will reduce the relatively large cross-sectional area presented to the dispensing end of the column to that which approximates a candy bar, and thereby allow a bin segment which is dimensioned for candy bars to be used to dispense items which have a much different form factor, such as bags of potato chips. This aspect of the invention facilitates improved utilization of standardized bin segments and bin magazine dimensions, while maximizing the variety of articles which can be efficiently stored using the bin segments and bin magazines constructed in accordance with the principles of the invention.

The technique of using resizing inserts allows one to use relatively low cost, mass produced bin segments. However, other techniques can be used to form the bin segments so that the resizing elements are integrally formed with the segments, such as the use of blow molding and extrusion processing.

It is noted that even though tabs such as 1612 are not integrally formed with the segments, these tabs are not likely to ever come loose, since they are essentially "locked in place" due to protection of them by being trapped between the inserts and the segment walls.

It is noted that although the tabs shown herein are generally rectangular, other shapes for the tabs are possible and may be desirable in some situations. The same is also true for the shape of the bin segments, i.e., shapes other than rectangular, such as round or doughnut shaped may also be desirable in some situations.

FIG. 18 illustrates a further embodiment of a resizing element, which simply comprises a a wall 2300 which divides a bin segment in half or other fraction. Each portion of the segment can now easily store smaller bar-type items by positioning them diagonally in the sub-cross section of the segment. Such items may comprise, for example, life-savers or breadth mints. Note, that irrespective of left or right slant of the articles, the center of the article will always be centered, thereby giving the service person some freedom during refilling, yet still providing a stable and definite "target" for the article pickup head 224.

In accordance with a further aspect of the present invention, a replaceable graphics display panel which enables a quick change graphics, can be used in conjunction with the previously noted "keying" aspects of the movable article storage structure, to provide further advantageous in accordance with the invention, such as to further enhance/enforce "brand loyalty".

More specifically, a unique ID (such as a bar code) associated with the replaceable graphics display panel can be sensed, for example by a bar code scanner, so as to inform the controller of the vending machine what articles are to be vended, and which columns they are stored in.

Details of one type of a replaceable graphics panel is as follows:

In accordance with this aspect of the invention, a further opening is provided in door 14, namely a display face change slot or access port 308. Slot 308 is used for juxtaposing a replaceable graphics display panel with the interior facing side of display face panel 18, enabling quick change graphics.

Face panel 18 may comprise a bubble front, shown as 402 in FIG. 21a, having a first area 406 which may include pre-printed graphics, such as a brand name or other identifying information, and a second portion 408 which has no pre-printed graphics, and therefore is clear/translucent. Portion 408 is therefore adapted for allowing the owner/operator of machine 10 to insert various ones of replaceable graphics panels 410 in juxtaposition therewith for quickly and easily changing the graphics display of the machine. Panel 410 includes multiple product selection graphics 412 thereon, and may also include for/with each graphic 412 and associated product selection indications (e.g., A1, A2, etc.) as well as a price indication. Further details about the construction of panel 410 can be found in my pending PCT application PCT/US01/51,053, incorporated herein by reference for US purposes. In a further embodiment, upper portion 408 may in fact be positioned anywhere on display panel 402, and can in fact comprise further portions, not shown, in which further replaceable graphics panels 410 can be juxtaposed above, below or to the side of retrieval area 22. In fact, portion 406 of bubble front 18 could also be provided with no graphics, i.e., clear, and a panel similar to graphics panel 410 could also be inserted in the lower portion of bubble front 18.

Replaceable graphics panel 410 is placed in juxtaposition with the interior facing side of panel 402 by the machine operator passing the replaceable graphics display panel 410 from the interior side of door 14, through slot 308, and into a press fit against panel 402. With an arrangement in accordance with the illustrated embodiment, the operator will push panel 410 into slot 308 so that the lower side of panel 410 rests against a top portion of customer retrieval area 22, and extends across the expanse of face panel 402 until it reaches stops mounted along the side of frame 9 which is opposed to slot 308. Panel 410 is dimensioned to make a tight fit in this position. Supported in this position panel 410 is visible to a user of the vending machine through the clear portion 408 of bubble front 18. Since slot 308 is only accessible from inside machine 10, unauthorized access to slot 308 and attendant change of the display graphics is substantially prevented. In a further embodiment of the invention, a hinged lockable cover, not shown, may be included over slot 308, for further control over access to slot 308 from inside of machine 10, as well to prevent access to the interior of the machine by vandals located outside of machine 10. Even furthermore, a bar code could be printed on the panel 410 so as to uniquely identify the articles shown thereon, as well as, for example, the selection numbers and prices associated with each article.

FIG. 21b illustrates a completed assembly of the replaceable graphics panel 410 in juxtaposition with the interior facing side of panel 402, for forming a complete graphics face for machine 10. If desired, panel 410 may have graphics or colored areas which surround graphics 412, and which in fact may make a seamless image with a portion of the graphics on portion 406 of panel 402. Additionally, panel 410 can have a clear, window portion 414 (shown in phantom) which aligns with window 205 of FIG. 2, thereby providing an entrainment opportunity for users of the machine to view its "workings" during the dispensing operation.

Even furthermore, the novel article storage apparatus may include a bar code which also can be used to inform the controller what articles are stored therein, and which columns they are stored in. Due to the "keying" aspects of the movable article storage structure, this information can, in effect, auto-program the controller of the vending machine, thereby further enhancing the desired benefits of providing for quick, accurate and reliable filling the article storage area of the article handling apparatus with a large number of articles. Additionally, due to the preprogramming aspect of this invention, "brand loyalty" by the machine operator is enforced since the machine will operate/vend incorrectly if it is not refilled with the articles as expected by the combination of the bar codes on the graphics card and novel article storage apparatus. Even furthermore, these aspects of the invention are particularly useful when the vending machine includes an article ID device, as described above, since adherence to the brand loyalty can then be independently monitored, and even reported to a third party via the communication link portion of the control portion of the vending machine.

Where not inconsistent, the methods and apparatus described in the following text can be used with the methods and apparatus described above. For example, in the following text there is described an alternative embodiment for the guidance of the columns in the bin magazine, wherein instead of dividers and wall portions forming the columns, there are a plurality of sets of vertical tracks arranged on a lateral wall which spans the center of the bin magazine, and the segments slide along those tracks to form the article storing columns. Embodiments such as these are compatible with the embodiments described above.

Figure 22A:
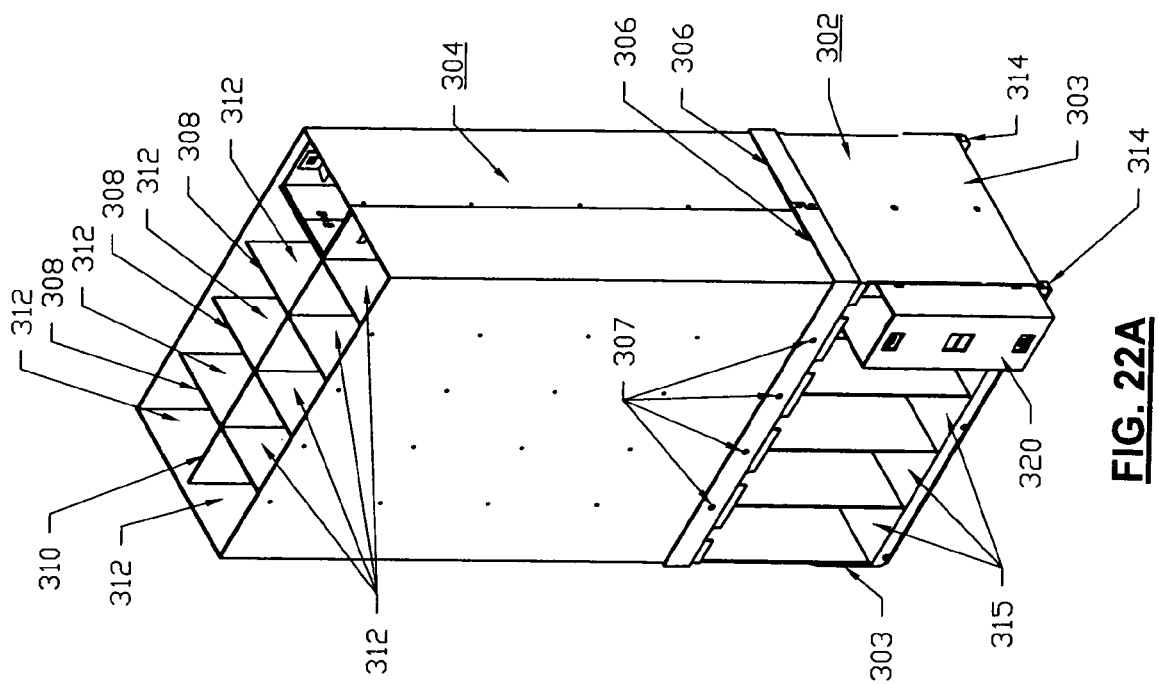
FIGS. 22A, 22B and 22C illustrate a perspective, front and end view, respectively, of one embodiment of an article storage arrangement for an article handling apparatus which is constructed and operates in accordance with the principles of the present invention.
Figure 22B:
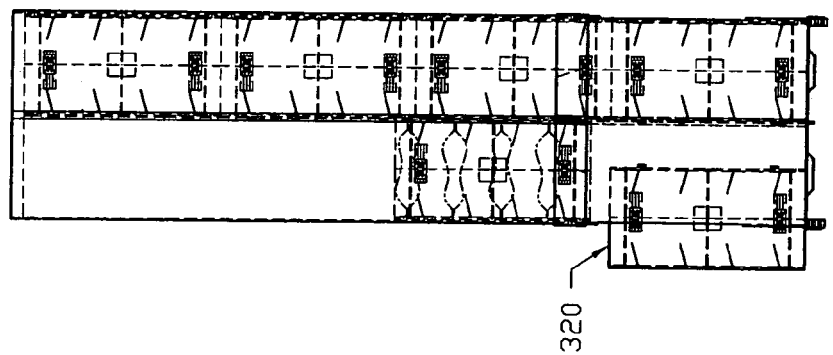
Figure 22C:
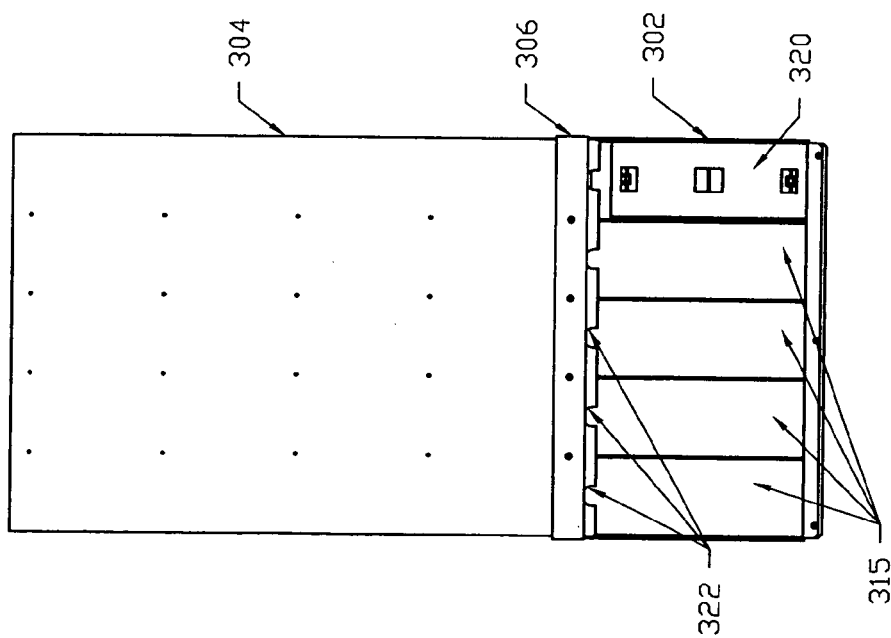

Accordingly, FIGS. 22A, 22B and 22C illustrate a perspective, front and end view, respectively, of a further embodiment of the present invention, as represented by an article storage magazine 300 constructed in accordance with the principles of the present invention. Magazine 300 is adapted for being quickly, accurately and easily reloaded with articles to be handled, and for being quickly, accurately and easily positioned into or out of the storage area of an article handling apparatus, such as a vending machine of the type generally shown in FIGS. 1-3 herein.

In the illustrated embodiment, the body of magazine 300 is constructed using two main components, a U-shaped sled portion 302 and an upper body portion 304. Two U-shaped support brackets 306 are used to join the upper portion of the vertically oriented opposed end walls 303 of U-shaped sled 302, so as to maintain the structural rigidity of the sled structure. In an alternative arrangement, those portions forming the sled and upper body portions could be somewhat mixed, so that portions of the upper body portion could actually be extension portions from the sled portion.

The sled portion 302 may be constructed using sheet metal or plastic, and the upper body portion 304 can be constructed using a corrugated sheet material, such as plastic, but in fact any suitable material can be used.

A support bracket 306 provides a means for attaching the upper body portion 304 to sled 302 using, for example, a series of screws 307. A plurality of lateral dividers 308 are positioned in a spaced manner along the longer direction of the cross-section of body portion 304, and in combination with a longitudinal divider 310 which bifurcates the shorter direction of the cross-section of body portion 304, forms a plurality of axially aligned article storage columns 312. The bottom portion of sled 302 includes a pair of opposed strips 314 so as to facilitate a sliding/repositioning of magazine 300 with respect to the article storage area of a vending machine. By using a U-shaped bottom portion 302, i.e., a bottom having only one set of opposed walls as compared with two sets, openings 315 are automatically formed at the bottom of columns 312 on both the front and back sides of magazine 300. In accordance with an aspect of the present invention, openings 315 are used as an access port for filling/refilling columns 312 with articles to be vended.

Although illustrated magazine 300 in accordance with the invention has openings 315 formed on both the front and back sides of magazine 300, in a further embodiment, the openings 315 can be formed on only one side of magazine 300. However, by having the openings 315 on opposed sides of the removable magazine, by removing a single magazine from the article handling apparatus, twice as many article columns can be loaded/refilled as compared with having such openings on only one side of the removable magazine.

More specifically, in accordance with this aspect of the present invention, article storage cartridges 320 are provided for use in conjunction with magazine 300, which cartridges are advantageously pre-filled with articles to be vended so as to minimize time spent reloading machine 2 with articles. Such pre-filling can advantageously be done by the operator by loading articles into the cartridges 320 back at operator's warehouse, and even more preferably, the operator can purchase the articles to be vended directly from the article manufacturer in a form where they are already pre-packaged in cartridges, or paper sleeves, 320. Cartridges 320 can provide all of the functionality and advantageous of the prior art segments 1202 shown in FIG. 2B herein, plus more. Of course one of the primary advantages is the time saved at the machine 2 during a typical refilling operation, however there are additional advantageous. For example, one of the advantages provided by cartridges 320 is that they can be provided with flexible "anti-crush" tabs 1302 such as those shown in FIG. 2B herein, for at least partially, and preferably fully, supporting the weight of articles 1304 stored in the cartridges 320. As will be describe in conjunction with FIG. 9, the anti-crush tabs can be provided by attachment of a supplemental structure to the wall of cartridges 320, or in an alternative embodiment, the tabs can be formed integrally with the walls of the cartridges.

Cartridges 320 are dimensioned for being slidably positioned into the bottom of an article storage column 312 via a respective one of openings 315, and thereafter are manually or automatically slid upwards in order to allow room for insertion of the next cartridge 320 into the given column of magazine 300. Repetition of this procedure provides a quick, accurate and reliable technique for complete refilling of the plurality of article storage columns of magazine 300 in a manner which is customized/optimized for each column.

FIGS. 22A and 22C illustrate installation of the cartridges 320 into the rightmost columns 312 of magazine 300, with FIG. 3B illustrating the inserted cartridges 320 in dashed-line form. Of course, when completely refilled, this embodiment of magazine 300 will house 10 columns of 4 stacks of cartridges, for a total of 40 cartridges. In one embodiment of the invention, the individual cartridges are 12 inches high, and can therefore store therein, for example, approximately 24 products which have a thickness of ½ inch, such as a package of cookies, or for example, 6 bags of potato chips which are 2 inches thick. If the cross-sectional area of the articles were, for example, one-half the size illustrated in FIG. 3, each cartridge would store twice as many articles, and in this case would have divider positioned within its interior to divide the cartridge into two columns. These examples result in an exemplary article storage capacity for one magazine 300 of between 240-960 full width articles, and 480-1,920 one-half width articles.

Of course, a vending machine embodiment of the invention would normally have a storage area which could enclose a columnar matrix which is more than only two columns deep by 5 columns long, and accordingly two or more of such magazines 300 could fit into the storage area of a conventional vending machine, such as one having a 2 by 5 matrix which is centered in the machine, and two more 1 by 5 matrixes adapted for being positioned on either side thereof. Even furthermore, a magazine 300 could in fact be more than two columns deep, as long as the columns greater than two do not obstruct the reloading access openings 315 for the first two columns. For example, a third row of axially aligned columns could be provided that is only 3 cartridges high, and with the lowermost cartridge being positioned above opening 315.

In an alternative embodiment, adjacent ones of magazines 300 could be hinged together along, for example a rear edge thereof, for added stability/safety, as well as for providing a method and apparatus for simultaneously handling an even larger article storage area during the reloading processes. The hinged magazines could therefore be removed as a single unit, and once removed, they could be easily spread apart so as to separate the adjacent magazines, and thereby expose the openings 315 of the respective cartridges for refilling of the respective magazines. Thus, the invention provides a method and apparatus for quickly, accurately and reliably refilling a large number of articles into an article handling apparatus.

As will be described later-on, a further embodiment of the invention describes a re-loading apparatus which facilitates customized and simultaneous reloading of a plurality of columns 312 at one time, such as all of the columns 312 on a given side of magazine 300.

A plurality of cut-outs 322, shown in FIG. 22C (and also in FIG. 4A), formed at the bottom of wall body portion 304 so as to be aligned with each of columns 312, provides several advantages, one of which being that it allows a cartridge 320 already positioned at the bottom of a column 312 to be raised to a height within column 312 which is sufficient so as to make room for insertion of the next cartridge 320 into opening 315. By inserting cartridges 320 in this manner, a FIFO order for the stored products is preserved. In the illustrated embodiment, a total of four cartridges are used for fully refilling a column 312, as shown by the dashed lines in FIG. 3B. Further details concerning cartridges 320 are given in conjunction with FIGS. 6-10.

FIGS. 23A and 23B illustrate front and edge views, respectively, of a sheet 402 of corrugated sheet material used to form upper body portion 304. Sheet 402 includes pre-formed fold lines 404 which are used to divide the sheet into panels 406, 408, 410,412 and 414, which panels are appropriately dimensioned so as to form the walls of body portion 304 upon folding along lines 404. FIG. 23C is a top view of sheet 402 after it has been folded to form upper body portion 304

In accordance with another aspect of the invention, before folding sheet 402, one or more reinforcement rods 416 (in the illustrated embodiment two are used), which rods each simply comprise a round wire of suitable diameter, are inserted into spaced flutes (sometimes called "corrugations" of the sheet 402. Such flutes are shown in the enlargement 418 of edge view FIG. 23B. The sheet 402 is oriented so that the flutes are perpendicular to the fold lines 404. With this arrangement, upon folding sheet 402, rods 416 are bent, and thereafter the rods provide a substantial structural support for maintaining the shape that sheet 402 was bent to form.

FIG. 23C illustrates a top cross-section view of portion 402 after bending, so as to comprise body portion 304 shown in FIGS. 22A, B and C.

Figure 23D:
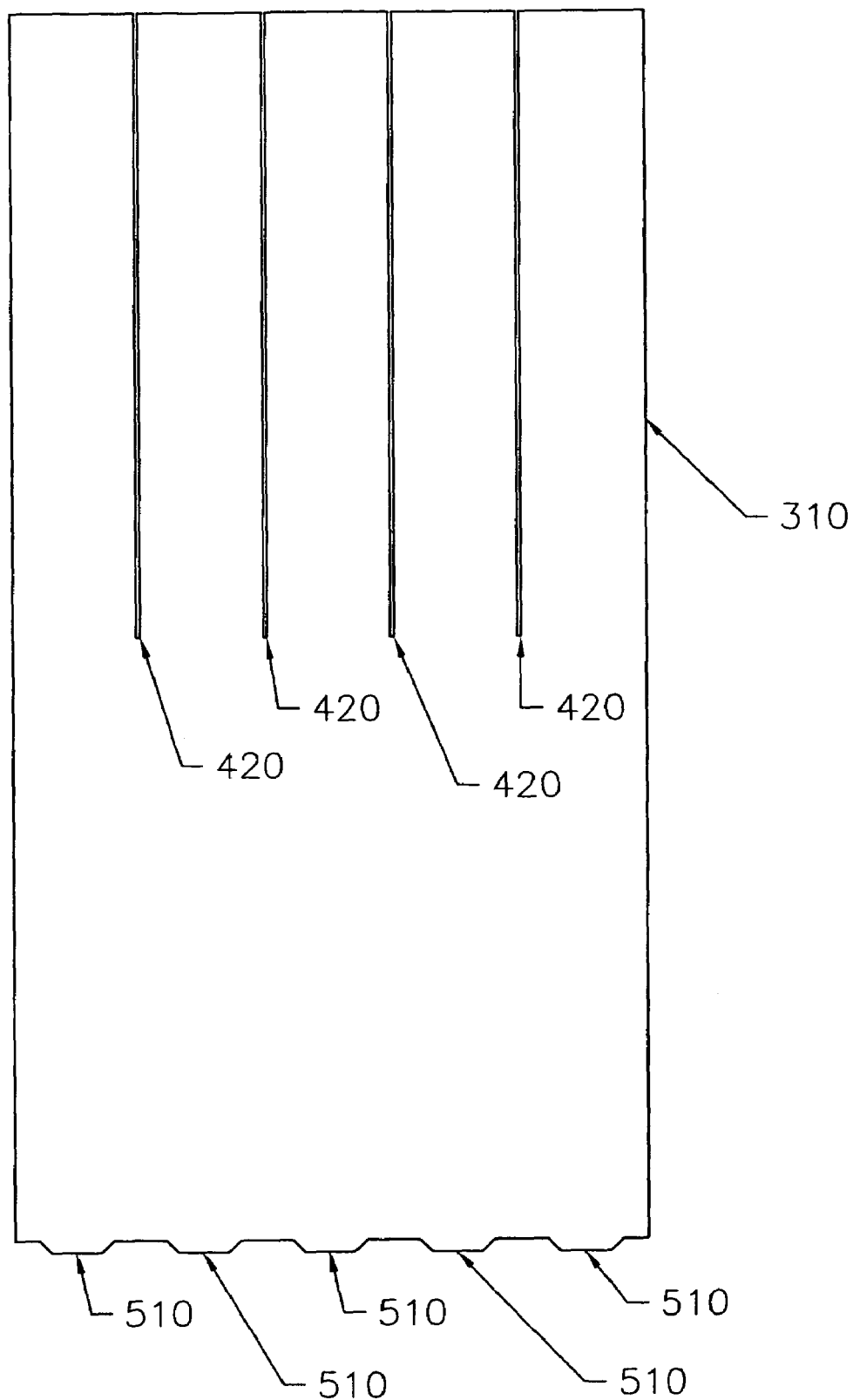

FIGS. 23D and 23E illustrate the internal divider portions 310 and 308, respectively. The divider is assembled by sliding engagement into a respective one of the spaced slots 420 of divider 310 (shown in FIG. 4D), of the slot 422 of each divider 308 (shown in FIG. 4E), so as to form the 2×5 matrix of article storage columns 312 (shown in FIG. 3A.)

FIG. 23F illustrates one example of a clip useful for maintaining dividers 308 and 310 in their "egg crate"-shaped position inside upper body 304. Clip 424 may comprise two identically shaped leg portions 426a and 426b, each leg portion including at opposed ends thereof a downwardly facing barbed prongs 428. Portions 426 and 426b should be joined together in an orthogonal relationship, such as by the use of glue or using some other suitable means of attachment. In operation, while the intersection of dividers 308 and 310 is maintained orthogonal, the prongs 426 of clips 424 are inserted into the corrugations/flutes at the top ends of each of the intersections. Many alternative means for maintaining the orthogonal relationship of dividers 308 and 310 could be used, such as gluing, or the use of a pin orthogonally projecting from each side of the top of divider 308 so as to pierce and hold in the predetermined spaced relationship, the adjacent slotted top sections of dividers 310. Even furthermore, and somewhat equivalently, a rod, such as the type of rod 416 of FIG. 23A, could be inserted directly across the full length of divider 310 along a top portion thereof, so as to thereby pierce each divider 308 along the way and maintain it's predetermined position with respect to divider 310. Alternatively, as noted in the Summary of the Invention portion of the application, no clip may be used, since the cartridges themselves will automatically cause the dividers in the interior of magazine 300 to reposition themselves to make room for the inserted cartridges.

In an alternative embodiment, in order to accommodate a quick, easy and reliable method and apparatus for re-dimensioning the matrix of columns for a different size, and/or quantity of articles, the sled may have a bottom portion that has multiple slots which will allow for different arrangements of dividers. For example, in one embodiment which is different from the one shown above, two slotted tracks, for example can be formed along the longitudinal length of the sled, and equally spaced within its width. The intersection walls can be formed of straight wall sections having the width of one column and having a "tee" fitting at the bottom thereof. The "tee" portion at the bottom of each wall section is inserted into the track, and then the wall section is slide down the track to an appropriate position. At that point, the wall section is rotated ninety degrees so as to lock that wall section in place. In effect, the combination of the dividers at first looks like a solid row or curtain along the line of the slot, but then when each divider is rotated so as to lock it into position on the track, the view is something like a opening Venetian blind, and the plurality of columns are formed thereby. By appropriate positioning/re-positioning of such wall sections, a different matrix of columns can be easily formed, as well know.

Figure 24:
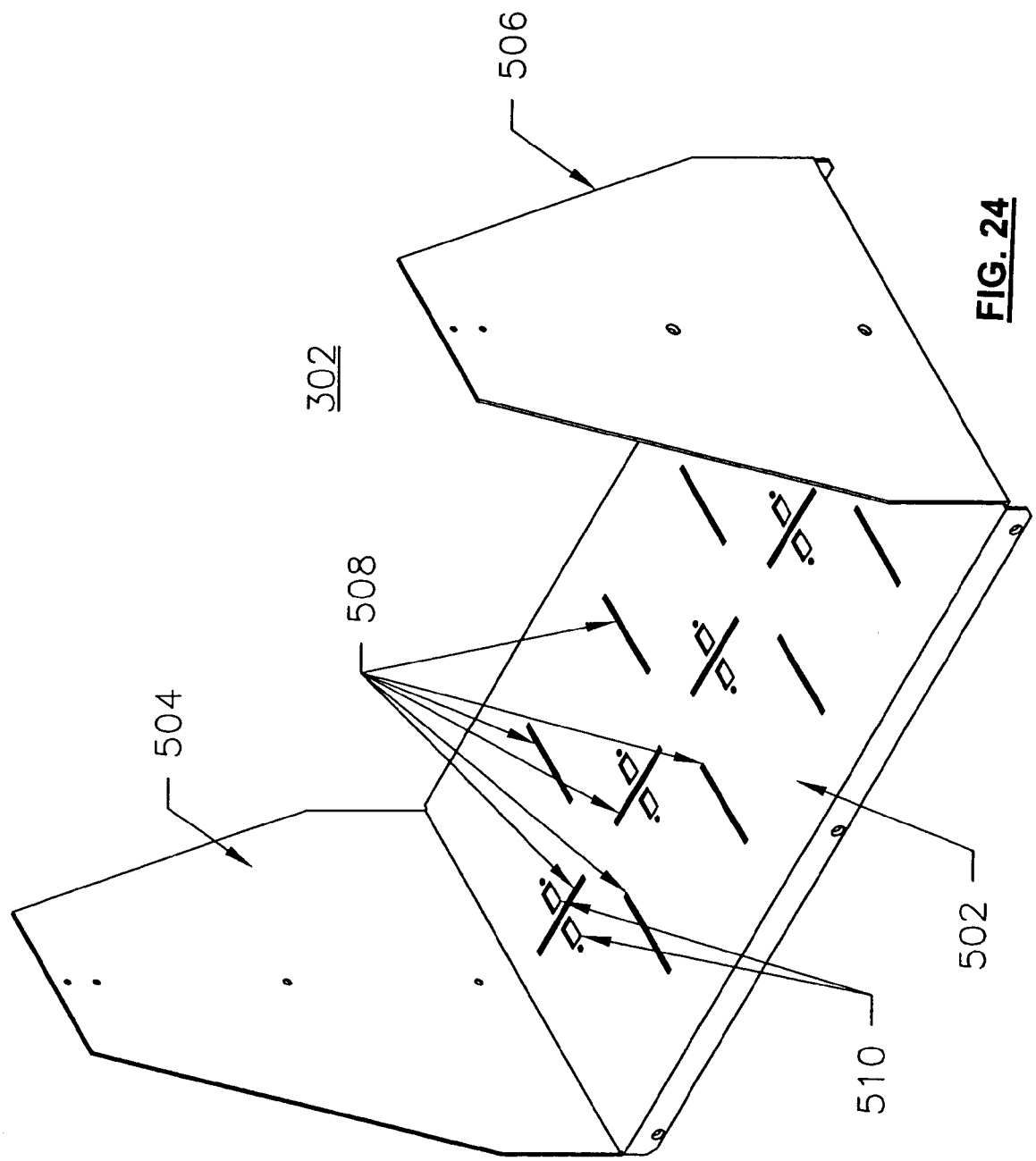
FIG. 24 illustrates further details for forming one embodiment of the lower portion of the storage arrangement of FIG. 22.
Figure 25:
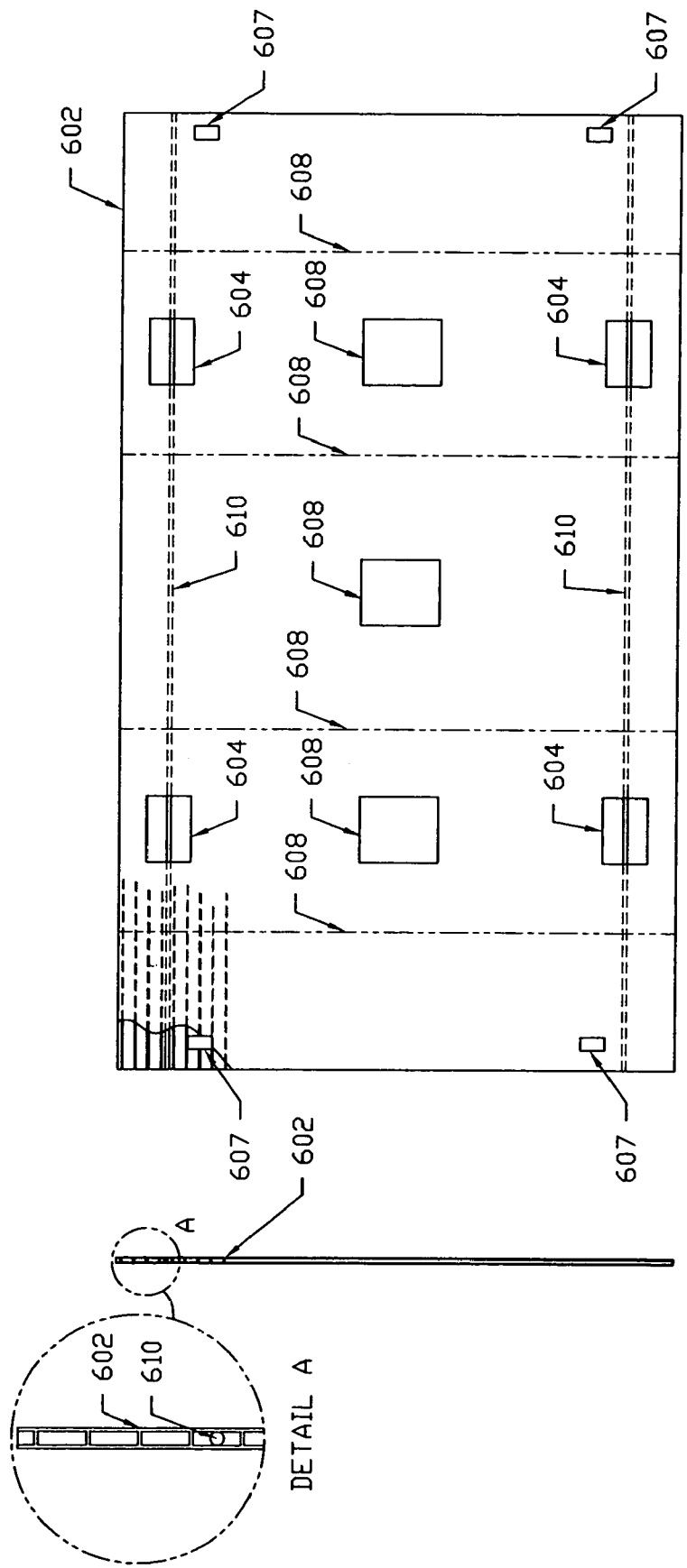
FIGS. 25A and 25B illustrate one embodiment and method for forming an article storage cartridge which is constructed and operates in accordance with the principles of the present invention, and useful in the storage arrangement of FIG. 22.

FIG. 24 illustrates a perspective view of sled 302. As shown therein, the U-shaped sled comprises a floor portion 502 and two opposed leg portions 504 and 506 (corresponding to leg portions 303 of FIG. 3). Floor 502 has a plurality of slots 508 cut or formed therein which mate with tabs 510 formed at the bottom portions of dividers 308 and 310, to assist the proper positioning of the lower ends dividers 308 and 310 within body portion 304 so that, in conjunction with the forenoted clips 424, the columns 312 formed thereby are formed and maintained in the predetermined dimension/spatial relationship. As previously noted, sled 302 can be formed using sheet metal, or can be an assembly of plastic and/or metal parts, as dictated by design choice.

Referring for a moment back to FIGS. 22A and 22C, note the use of screws to secure the entire aforementioned arrangement into a cohesive unit, the screw heads being visible on the outside walls of upper body portion 304. In the illustrated embodiment, it was found that inexpensive drywall screws could be used to easily pierce the corrugated sheet material, and when the flutes of dividers 308 and 312 are arranged in the vertical direction, this technique secured the assembly together with adequate rigidity. Alternative techniques, such as adhesives, could have been used in place of screws. Even further, it has been found that other than the use of some means, such as screws for attaching the upper body portion to the sled, in fact no means may be necessary to hold the dividers in a specific position within upper body 304. That is, the loading of the cartridges 320 into the upper body 304 forces the dividers therein to automatically take their proper place, due to the force presented therein by the combined effect of all of the inserted cartridges 320.

In accordance with one aspect of the invention, as shown in FIG. 24, a plurality of windows 510 are provided in the floor portion 502 of sled 302 so as to be aligned within one of each of the columns 312. Windows 510 are used to mount a tab or detent clip or piece of spring material (not specifically shown), so that as a new cartridge 320 is inserted into magazine 300 via opening 315, the detent engages a bottom wall portion of the inserted cartridge 320 so as to securely hold it within column 312 and thereby prevent it from accidentally falling out during, for example, movement of magazine 300.

In accordance with a further aspect of the present invention, note also that a space between walls 303 of the sled portion 302, and below the lower end of body portion 304, automatically forms the access openings 315 which are aligned with the bottom of columns 312.

In accordance with an even further aspect of the present invention, to help enforce adherence to a First-In-First-Out (FIFO) technique for refilling magazine 300 with articles to be vended, a further detent/snap, to be described in greater detail later, is positioned near the top edge of each column 312 and operative so as to engage a portion of a cartridge near the top of column 312 and prevent it from moving away from the dispensing direction, i.e., in the illustrated embodiment, cartridges 320 can only move up; thereby helping ensure a FIFO refilling of articles to be vended into magazine 300.

FIGS. 25-29 illustrate one embodiment and method for forming an article storage cartridge 320. More specifically, FIGS. 25A and 25B illustrate front and edge views, respectively, of a flat sheet 602 useful for forming a cartridge 320. Sheet 602 may be formed of, for example, the same type of corrugated plastic material used to form upper body 304. Sheet 602 is prepared by punching out edge windows 604, center windows 606 and edge-joining windows 607. A plurality of spaced apart parallel fold lines 608 are also provided to facilitate proper folding of sheet 602 into the desired rectangular shape for a cartridge 320.

In accordance with one aspect of the invention, before folding sheet 602, a reinforcement rod 610, which may simply comprise a round wire of suitable diameter, is inserted into a spaced flute or "corrugation" of the sheet 602 at opposed longitudinal edges of the sheet. Preferably, the rods 610 also pass through the windows 604. Such flutes are shown in the enlargement Detail A of edge view FIG. 25B. The sheet 602 is oriented so that the flutes are perpendicular to the fold lines 608. With this arrangement, upon folding sheet 602 into the rectangular cross-section needed for cartridges 320, rods 610 are bent, and thereafter provide a substantial structural member for maintaining the rectangular shape that sheet 602 was bent to form. Although in the illustrated embodiment two rods 604 are used, additional rods may be used, such as one near the middle of cartridge 320. Furthermore, other shapes for the cartridges are contemplated, such as round or even doughnut shaped. For folding sheet 602, a simple "wing-bender" having a design well known to those familiar with manufacturing technology, could be used. Although only two rods 610 are shown, use of additional rods may be desirable, such as one passing through center windows 606.

Figure 26:
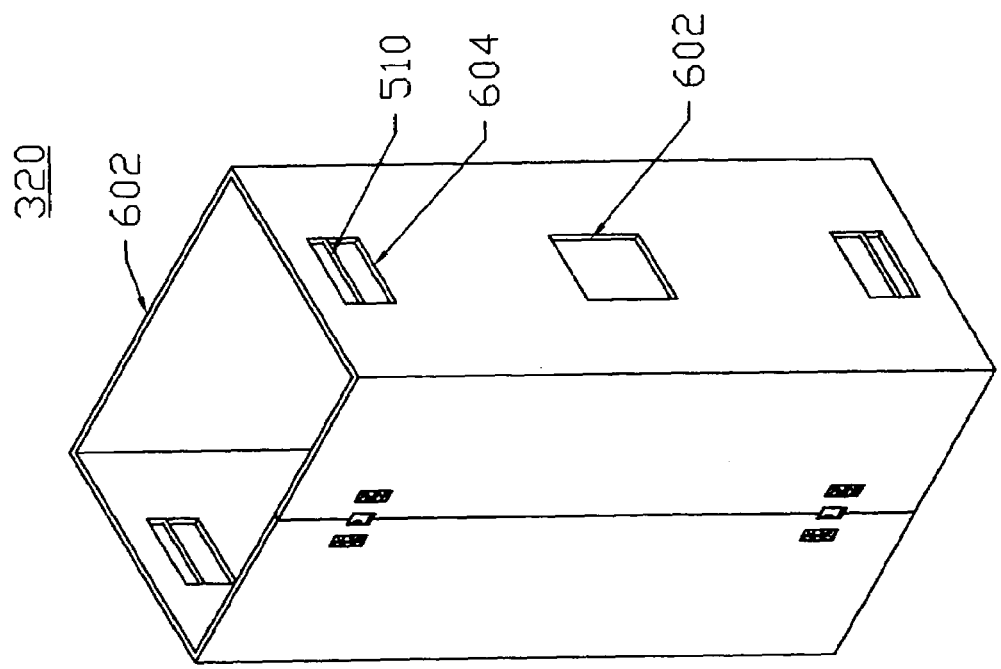
FIG. 26 illustrates further details for forming one embodiment of the article storage cartridge of FIG. 25.
Figure 27:
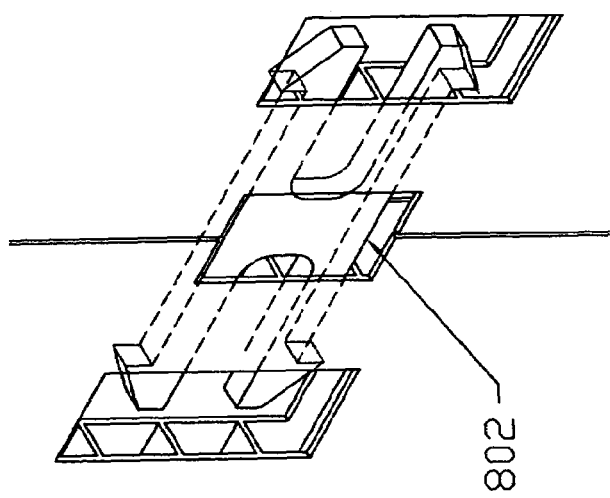
FIG. 27 illustrates a clip useful for forming one embodiment of the article storage cartridge of FIG. 26.

FIG. 26 illustrates a perspective view of the final shape for cartridge 320 after sheet 602 has been folded, and FIG. 27 illustrates an enlarged perspective view of a clip 802 used in the illustrated embodiment to join the opposed edges of sheet 602 together so as to maintain the rectangular cross-sectional shape for the cartridge. As shown in FIG. 27, clip 802 comprises a central body having two sets of opposed legs. Each leg is dimensioned so as to be able to pass through the flutes of sheet 602, and an orthogonal projection or barb at the distal end of each leg. The legs of each set are biased for springing away from each other, and the windows 607 are positioned and sized so that when the legs are inserted into the sheet 602, the barbs at their ends cooperate with the sidewalls of the opposed joining windows 607, so as to tightly hold together the opposed sides of sheet 602. In an alternative embodiment, some other type of securing apparatus could be used to hold the opposed edges of sheet 602 together, such as a different type of clip, a "heat weld" of the plastic sheet 602, or even something as simple as an adhesive tape.

Windows 604 and 606 are useful for viewing the articles stored therein, although to further facilitate this use, sheet 602 could be formed of a translucent or even transparent material. A further use for windows 604 and 606 is as an attachment opportunity for additional structures. One such structure would be an article supporting tab/flap clip, such as to be described in conjunction with FIG. 28 herein, which also makes advantageous use of the rods 610 which pass through the windows 604, and another such structure would be a spacer for resizing the internal space of the column, or for repositioning articles stored therein. An even further use for windows 604 or 606 would be as an opportunity to catch and hold a cartridge 320 so it can only slide one-way within the columns 310, thereby ensuring FIFO ordering of the articles stored in the columns.

More specifically, in accordance with this aspect of the invention, although not specifically shown, a window is provided at a top portion of one of the walls used to form each column 312 in upper body 304. This window is advantageously used to mount a tab or detent/clip, formed, for example from a piece of spring material. Although not specifically shown, this wall-mounted detent/clip is of the type such as described above in FIG. 24 for use in the windows 510 formed in the floor of the sled, which floor-mounted detents/clips are used for retaining a cartridge 320 within the opening 315 at the proper, fully inserted position at the bottom of a column 312. The wall-mounted detents/clips are provided so that as a previously inserted cartridge 320 is raised within column 312 to make room for insertion into magazine 300 of the next cartridge 320, the detent/clip engages a top inside wall portion of the window in the raised cartridge 320 (or the rod 610 passing through the window, which rod may advantageously offer a more firm grasping/holding point to the cartridge), so as to hold the raised cartridge 320 within the column 312 and thereby prevent it from moving in the downward direction. Since the access opening 315 is at the lower end of each column, and this wall-mounted detent/clip comprises a "one-way" mechanism in each of the columns that prevents previously inserted cartridges from moving in a direction away from the dispensing end of the column, a FIFO dispensing/handling of the articles stored in the magazine 300 is ensured. As previously noted, FIFO dispensing/handling of the articles is particularly desirable for date sensitive articles.

FIGS. 28A-28D illustrate perspective, edge, and two detail views, respectively, of one embodiment of an article supporting strip 902 for the article storage cartridge of FIG. 26, and FIGS. 29A-29E illustrate details of a completed article storage cartridge constructed and operating in accordance with the principles of the present invention, which has the strip of FIG. 28 mounted therein. As shown in the views of FIG. 28, strip 902 comprises a base portion 904 having spaced along it's length article supporting tabs 906. Tabs 906 are adapted to support at least the edges of articles to be stacked in the cartridges 320, and thereby serve to prevent the full weight, and in a preferred embodiment, any weight, of articles stored above a tab from exerting any of its weight on the articles stored in the column below a given tab. Another name for tabs 902 are "anti-crush" tabs.

Figure 29D:
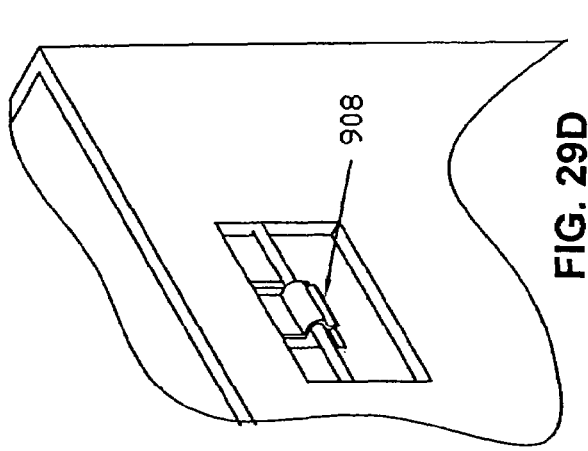
FIGS. 29A-29E illustrate further details of one embodiment of a completed article storage cartridge which is constructed and operates in accordance with the principles of the present invention.
Figure 29E:
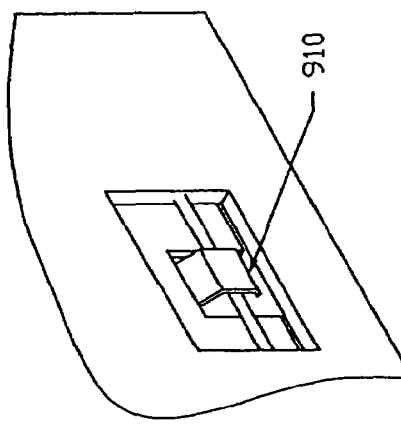
Figure 29A:
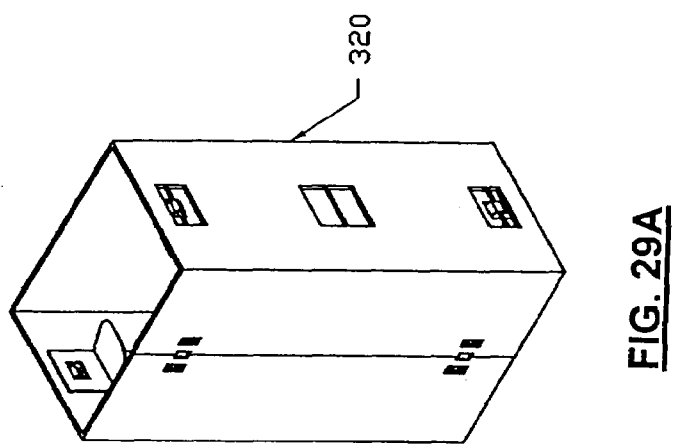

In one preferred embodiment of this aspect of the invention, the strips 902 are positioned on opposed sidewalls of each cartridge 320, as shown in FIG. 29A. The tabs extend from the inside wall of the cartridges into it's interior. The tabs are flexibly biased so as to facilitate movement of the articles in a dispensing direction, i.e., towards the dispensing end of the column, and which at the same time hinder movement of the articles in a direction which is opposite to the dispensing direction. The length of the tabs are predetermined so that the space between the free ends on opposed walls of a cartridge 320 is sufficient to allow the article gripping mechanism to freely pass therebetween, and the flexible biasing of the tabs is not strong enough to dislodge an article from the article gripping mechanism as a result of contact between the article being removed and the tabs that are positioned in the column above the article being removed. In a specific embodiment of this aspect of the invention, strip 902 can be manufactured of plastic using well know molding techniques.

FIGS. 28C and 28D illustrate in Detail A and Detail B, respectively, the edge view of strip 902 shown in FIG. 9B. As shown therein, the opposed ends of base 904 can have clips 908 and 910 molded integrally with the strip 902, or such clips could be manufactured separately and inserted onto the opposed ends of base 904 using conventional techniques. As previously noted, one use for windows 604 and 606 is as an attachment opportunity for additional structures, one such structure being the article supporting strips 902. Accordingly, as shown in FIGS. 29D and 29E, clips 908 and 910 make use of the rods 610 which pass through the windows 604 in order to make a secure "snap-on" connection to the cartridges 320. A myriad of further devices and means could also be used for attaching strips 902 to the cartridges, such as an double-sided adhesive.

Figure 29C:
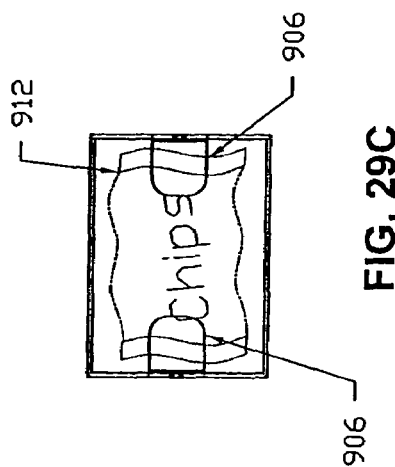
Figure 29B:
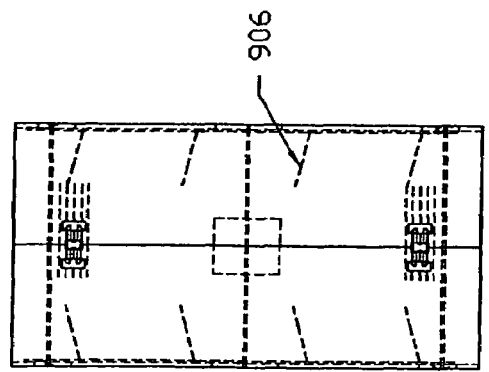

FIG. 29B illustrates a side view of a completed cartridge shown by FIG. 29A, where the main internal components are shown using dashed lines, and FIG. 29C illustrates a top view of a cartridge 320, having an article comprising a bag of chips 912 supported by a pair of opposed tabs 906.

While this invention has been particularly shown and described with references to preferred embodiments thereof, it will be understood by those skilled in the art that various changes in form and details may be made therein without departing from the sphere and scope of the invention. In fact, many such changes are already noted in this description but it should be realized that the above-noted changes were not exhaustive, and merely exemplary. Those skilled in the art will recognize, or be able to ascertain using no more than routine experimentation, many equivalents to the specific embodiments of the invention described herein.

For example, in a further embodiment of the cartridge 320 shown in FIGS. 29A-29E, instead of forming/attaching the article supporting tabs on a strip 902, the tabs could be formed integrally with the material used to make cartridges 320. More specifically, in this embodiment, a plurality of spaced apart "inverted-U" shaped slits can simply be punched into sheets 602 before they are bent so as to form the cartridges. Thereafter, the article supporting tabs can be simply and easily formed by pushing the inverted-U" shaped slits into the interior of the cartridge, so that they can provide support to the articles at the time that they are loaded into the cartridge. Article supporting tabs manufactured in this manner have a tendency to be self-retracting as the articles below the flaps are raised past the flap, thereby further preventing the flaps from interfering with retrieval of articles below the flap, or later reinsertion of the article retrieving device.

Figure 30A:
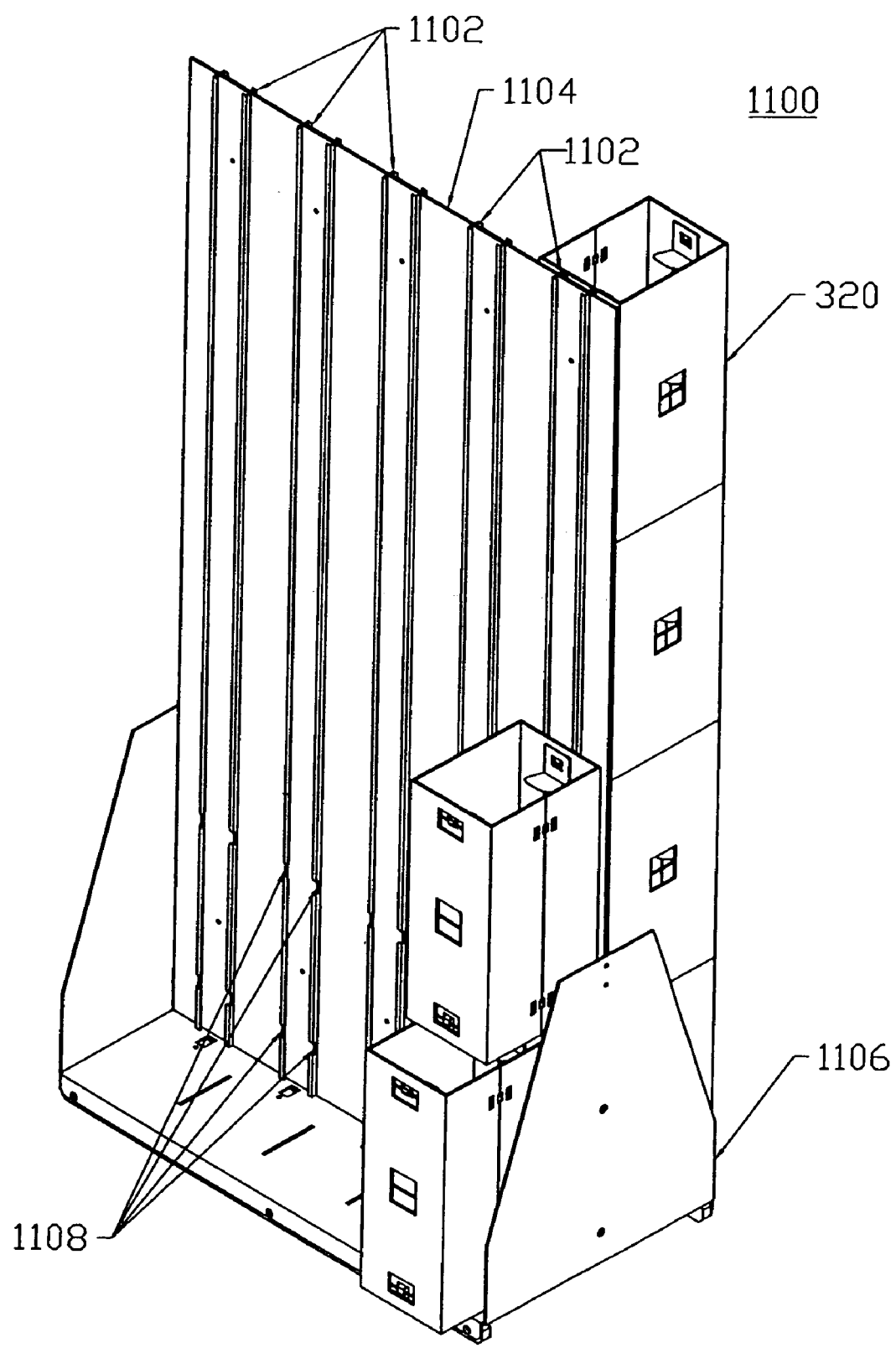
FIGS. 30A-30C illustrate a perspective, front and end view, respectively, of another embodiment of an article storage arrangement which is constructed and operates in accordance with the principles of the present invention.
Figure 30B:
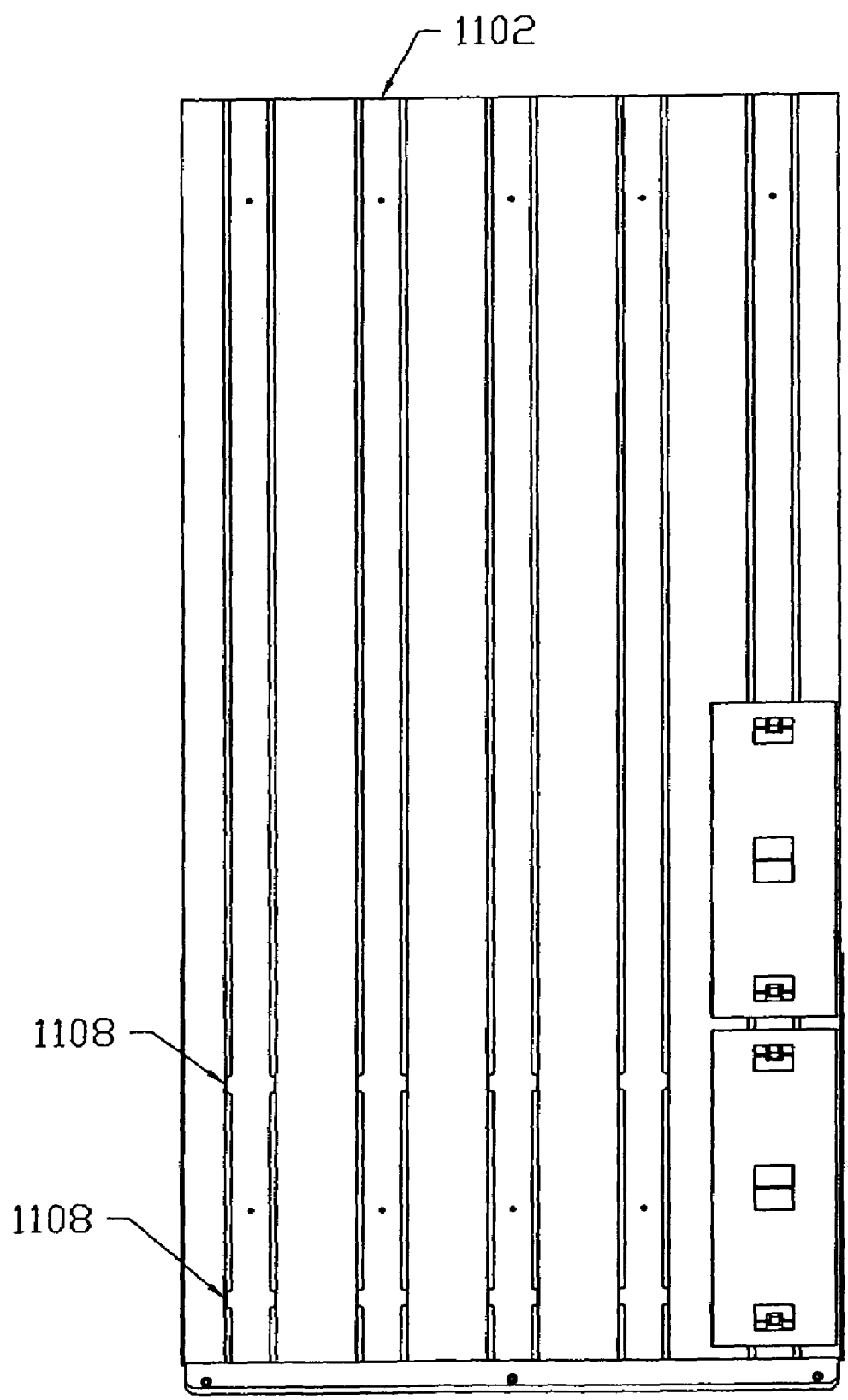
Figure 30C:
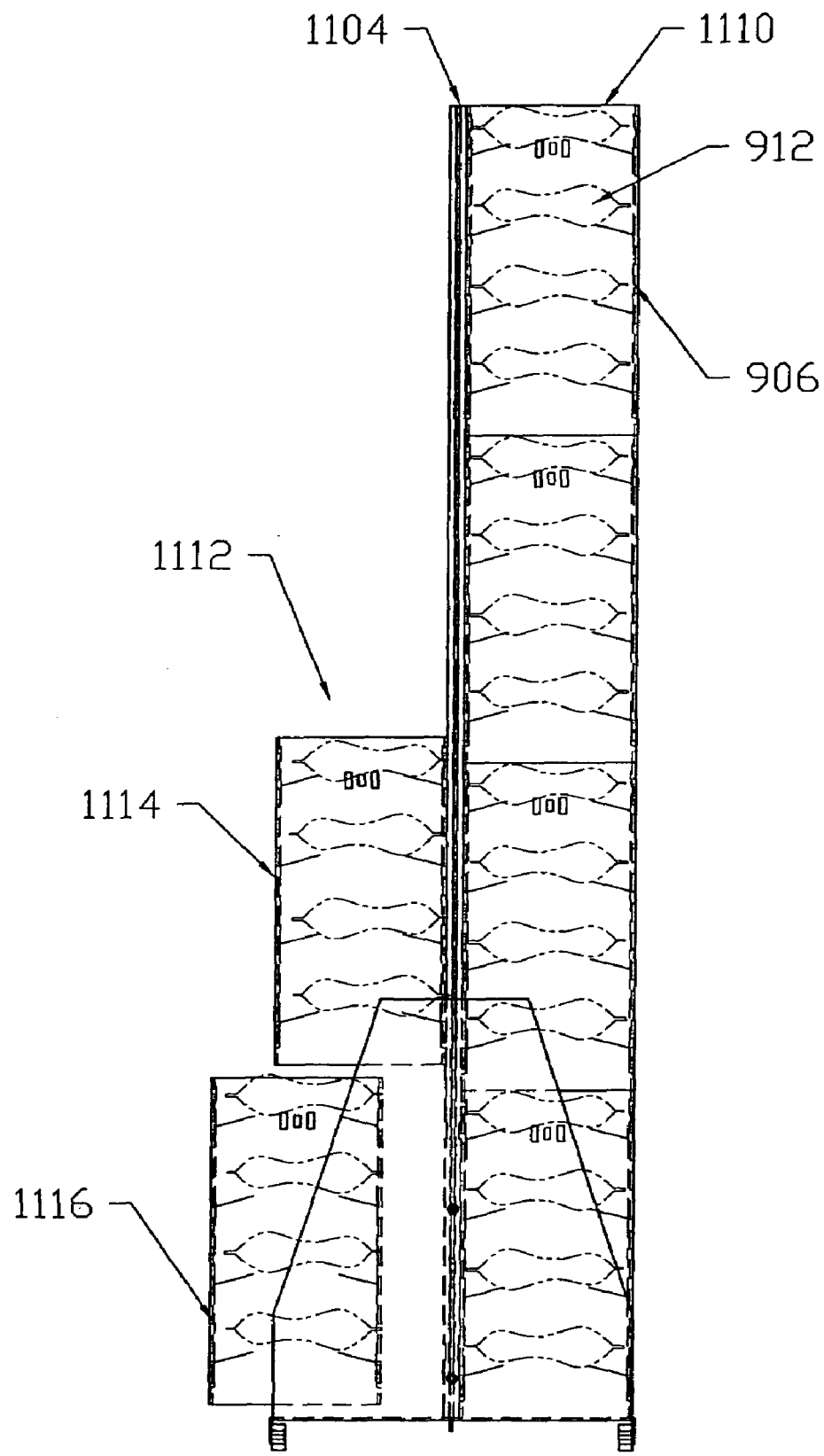

A further example of an alternative embodiment of an article storage arrangement which is constructed and operates in accordance with the principles of the present invention is shown in FIGS. 30A-30C. In this embodiment, the guidance structure of the removable article storage apparatus 1100 includes sets of tracks 1102 attached to opposed sides of a wall 1104. A lower portion of the removable article storage apparatus 1100 comprises a sled 1106 which is substantially the same as the previously described sled 302. Tracks 1102 serve to individually guide the pre-packaged groups of articles to be handled, i.e., article storage cartridges 320, so as to form the forenoted plurality of axially aligned article storage columns. The tracks 1102 include openings 1108 at a lower portion thereof as a receiving device which provides individual coupling to tabs, not shown) on the back of the article storage cartridges 320, so as to allow coupling of the article storage cartridges into the tracks, and thereby formation of the plurality of axially aligned article storage columns. Once the cartridges are coupled to the tracks 1106, they are individually guided by the tracks from a bottom portion of the track, along the longitudinal axis of the column and in a direction toward the article grasping portion of the article handling apparatus, which in the illustrated embodiment is adjacent a top portion of the column. The edge view of FIG. 30C shows that a column 1110 has already been fully loaded with cartridges 320, while a column 1112 which is on the opposed portion of wall 1104, is still in the process of being loaded with articles. In this regard, a cartridge 1114 is shown being in a raised position, while a second cartridge 1116 is being inserted in the openings 1108. The tracks 1102, or the wall 1104, could have a spring/detent clip structure similar to what was described with respect to the FIG. 3 embodiment of the removable article storage apparatus, for holding a cartridge previously inserted into the column at a position which is away from opening and toward the dispensing end of the column. Note that FIG. 30C also illustrates in dashed line form stored articles 912 and the article supporting tabs/Raps 906.

In a more simplified embodiment of the FIG. 30 arrangement, tracks 1106 may only be attached to one side of wall 1104 (i.e., for an embodiment where the matrix of the removable magazine is a 1 by N matrix), or wall 1104 can be eliminated altogether, and the tracks 1106 may be guided by rods, or even be free-standing, in their extension from the bottom portion of the sled. In an even further embodiment, the guidance apparatus may be formed on various walls of the individual article storage cartridges themselves, so that a vertical interlocking of the article storage cartridges with adjacent article storage cartridges provides along a common planar wall of an article storage column formed by the grouped article storage cartridges, a track for slidably positioning of individual ones of article storage cartridges so as to form an adjacent article storage column.

It is noted that the simplified construction could also be a simplification of the 506 of FIG. 8, for example. More specifically, two independent columns each having receiving device for receiving a bin segment, whereby the independent columns are connected or attachable to each other. By connecting several single columns together as a group one can achieve such a simplified bin magazine.

Figure 31:
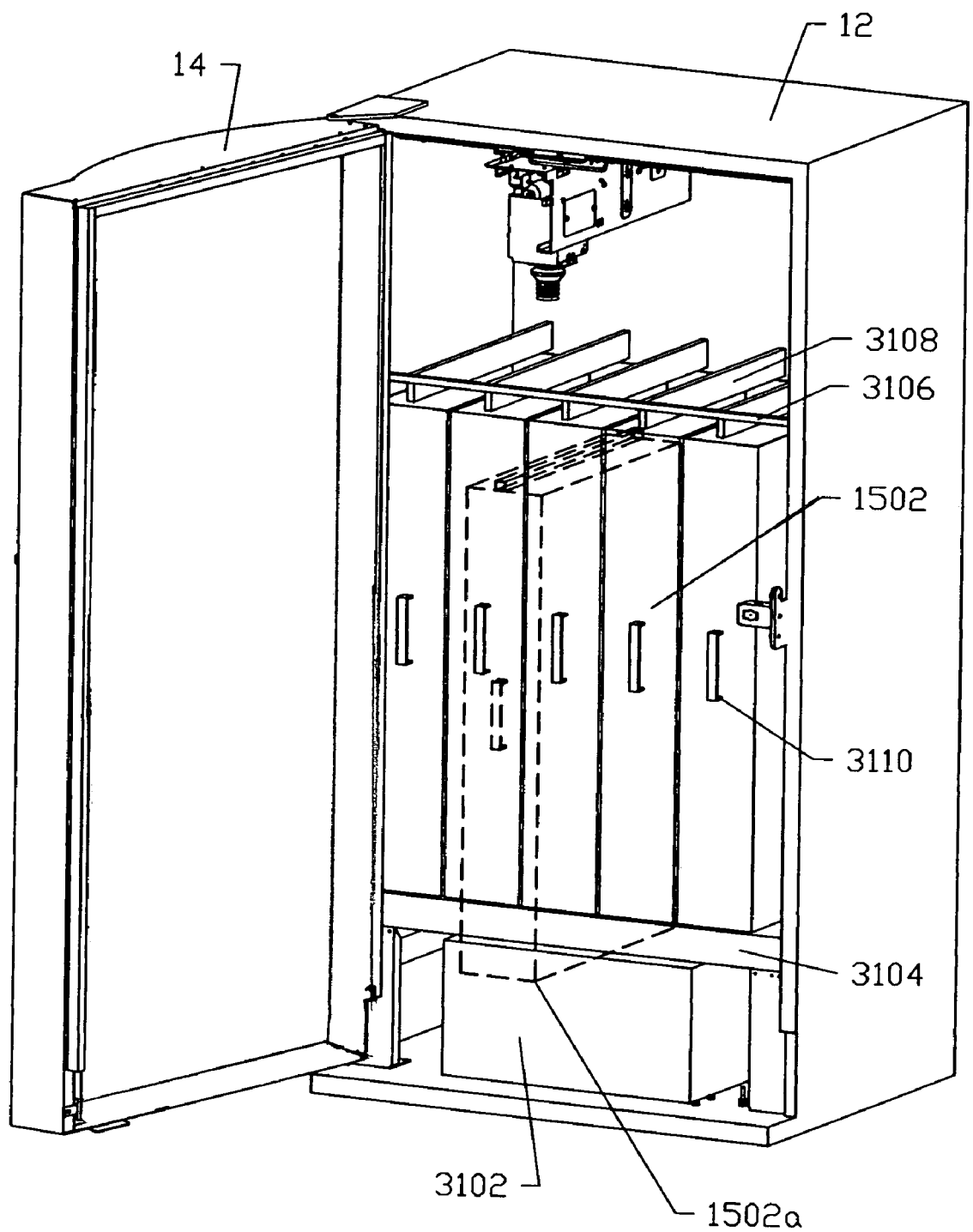
FIG. 31 describes a further embodiment of an article storage arrangement which is constructed and operates in accordance with the principles of the present invention

It should be noted that although in the illustrated embodiments weight bearing support for the bin magazine is provided by coupling at the bottom of the magazine, for example by use of wheels or slides, other types of weight bearing supports for the bin magazine are possible, slides mounted on top or to the side of the bin magazines. For example, FIG. 31 illustrates a vending machine basically similar to the one shown in FIG. 1, however, the bin magazines 1502 shown therein are all only one column wide and several columns deep, such as magazines 502 shown in FIG. 6. In this embodiment all of the bin magazines 1502 are arranged to be on top of a shelf 3104 that establishes a thermally isolated lower portion of the cabinet 12 where refrigeration equipment 3102 is positioned for generating cooled air for refrigerating the storage area of the machine, thereby cooling the articles held in magazines 1502. The magazines 1502 are movable for the same reasons noted in the prior descriptions, however the technique for moving them is somewhat different. More specifically, each magazines 1502 is able to be moved or slid (as shown by dashed lines for magazine 1502a) so as to be at least partially outside the storage area, thereby allowing the reloading advantageous noted above. The weight of the magazines 1502 is relatively low, since they are each only one column wide. The weight of the magazines can be supported by a coupling between the bottom of the magazines 1502 and a portion of the apparatus below the magazines 1502, such as the shelf 3104. Alternatively, the weight of the magazines 1502 can be supported by a coupling between the top of the magazines 1502 and a portion of the apparatus above the magazines 1502, such as an overhead support bar 3106. In one embodiment, such coupling may be a slide 3108, but it may also comprise a leg, shelf (with or without wheels) or other support that drops or folds down from the bottom or front of the bin magazines to support at least part of the weight of the magazine when it is fully extended out from the storage area. For example, a leg attachable permanently or removably to the front of one of the magazines can have a wheel at its lowest point which rolls onto the ground in front of the cabinet of the article handler. A handle 3110 on an outward facing portion of each magazine can be used to move the magazines one at a time at least partially out of the storage area (as shown for bin 1502a) for loading of bin segments into the bin magazines in accordance with the forenoted techniques. It is noted that such loading for all the magazines can take place from the exposed right side of each magazine after it is pulled out, thereby avoiding obstruction from other parts of the machine, such as the open door 14.

Although no specific figure is provided, in accordance with another aspect of the invention, the bottom portion of the sled may include any of several well know types of "mating" or "keying" apparatus (such as a plurality of tabs), which can be provided to mate with a corresponding keying apparatus in the storage area of the article handling apparatus (such as slots), to insure a quick, reliable and accurate positioning/repositioning of magazine 300 within the storage area of the article handling machine.

In, for example, prior art spiral-wire vending machines, article reloading is done by hand, one article at a time, and thus is prone to inaccurate replenishing of the storage area by the service personnel. Having a see-through glass front in such machines is almost a necessity in order that the consumer can see actually the article to be vended. The reloading methods and apparatus of the present invention greatly simplify, speed up, and improve the accuracy and reliability of the refilling operation of the article handling apparatus with articles to be handled/retrieved, so much so that customer viewing of the actually "next item to be vended" via, for example, a glass window, is not necessary.

It is also noted that a magazine or group of magazines of the present invention lends itself to a method of loading the storage area of a plurality of article handling machines so that a predetermined percentage of the quantity of stored articles in a machine can be considered "standard" articles. As such, the standard articles can be provided in, for example, two of three magazines used in a article handling apparatus in accordance with the present invention. The third magazine can be easily, quickly and reliably moved to a different article handling apparatus upon each servicing of the article handling apparatus. This method facilitates providing new/different articles to the users of the article handling apparatus on a rotating basis, in an easy, quick accurate and reliable manner.

While this invention has been particularly shown and described with references to preferred embodiments thereof, it will be understood by those skilled in the art that various changes in form and details may be made therein without departing from the sphere and scope of the invention. In fact, many such changes are already noted in this description but it should be realized that the above-noted changes were not exhaustive, and merely exemplary. Those skilled in the art will recognize, or be able to ascertain using no more than routine experimentation, many equivalents to the specific embodiments of the invention described herein.

The invention claimed is:

1. An article handling apparatus, comprising:
   an article storage area for storing in bin-segments groups of articles to be handled;
   an article grasping mechanism adapted to be positionable adjacent the article storage area for selectively grasping articles stored therein and removing them from the article storage area; and
   a movable article storage structure adapted to be positionable from fully inside the article storage area to at least partially outside the article storage area, the movable article storage structure comprising:
   a plurality of guidance apparatuses, each adapted for individually guiding therealong at least two bin-segments of articles to be handled, so as to form a plurality of paraxially aligned article storage columns, wherein each guidance apparatus includes a receiving device which provides individual coupling to the bin-segments, so as to allow serial loading of the bin-segments into each of the plurality of paraxially aligned article storage columns.

2. The article handling apparatus of claim 1, wherein the guidance apparatus includes structure for individually guiding bin-segments from one end of an article storage column, along the longitudinal axis of the column, and in a direction toward an opposed dispensing end of the column, which dispensing end is positionable adjacent the article grasping mechanism.

3. The article handling apparatus of claim 1, wherein at least two of the guidance apparatuses are coupled together along a longitudinal edge thereof using a hinge device, so as form a hinged guidance apparatus, the hinged guidance apparatus having an opened position and a closed position.

4. The article handling apparatus of claim 3, wherein each guidance apparatus of the hinged guidance apparatus forms two parallel rows of article storage columns, one row along an outward facing side of the hinged guidance apparatus, and another row along an inward facing side of the hinge guidance apparatus, so that when the hinged guidance apparatus is in the open position, access is provided to the inward facing rows of each guidance apparatus.

5. The article handling apparatus of claim 1, wherein the guidance apparatus additionally includes a mechanism that co-acts with the bin-segments so as to help enforce a FIFO (First-In-First-Out) ordering of the segments in the column.

6. The article handling apparatus of claim 1, wherein the guidance apparatus additionally includes a mechanism that co-acts with the bin-segments at the dispensing end of said columns, so as to provide a retaining force to said bin-segments to help ensure that the bin-segments remain in said columns during removal of articles from said bin-segments by said article grasping mechanism.

7. The article handling apparatus of claim 1, wherein the receiving devices comprise openings near, the bottom of the guidance apparatus, which openings provide access for respective ones of article storage segments to be admitted into respective ones of the plurality of paraxially aligned article storage columns.

8. The article handling apparatus of claim 5, wherein said mechanism includes one-way tabs that prevent the segments from being loaded into the column from the dispensing end.

9. The article handling apparatus of claim 1, wherein flexible dividers are positioned between the columns of segments, so that when a segment is removed from a top of the column, the divider flexes into the space of the column, thereby blocking the insertion of an additional segment into the column from the dispensing end thereof.

10. A method of refilling a vending machine with articles to be dispensed, comprising:
    moving at least partially outside of the vending machine an article storage structure having hinged article storage magazines therein, which article storage structure is adapted to be selectively positionable from filly inside to at least partially outside an article storage area of the machine;
    opening the hinged structure so as to provide access to interior portions of the article storage magazines;
    using prepackaged groups of articles for successively loading respective article storage columns of the article storage magazines with articles while it is at least partially outside the article storage area
    closing the hinged structure, and
    moving the hinged structure into the storage area of the vending machine.

11. A movable article storage structure adapted to be selectively positionable from fully inside to at least partially outside an article storage area of an article handling device, the movable article storage structure comprising:
    a hinged combination of at least two bin-segment guidance apparatuses, each guidance apparatus adapted for individually guiding therealong at least two bin-segments of articles to be handled, so as to form therewith a plurality of paraxially aligned article storage columns, and wherein the guidance apparatus of each hinged structure includes a receiving device which provides individual coupling to the bin-segments, so as to allow serial loading of the bin-segments into one end of the plurality of paraxially aligned article storage columns.

12. The apparatus of claim 11, further including a weight supporting device coupled between the article storage structure and a support for the article handling device, said weight supporting device adapted to provide for movement of the article storage structure into and out of the article storage area.

13. The apparatus of claim 12, wherein said weight supporting device comprises a ramp.

14. The apparatus of claim 13, wherein said ramp includes one or more raised walls that serve to guide the article storage structure during its movement into and out of the storage area, which walls also serves to protrude into the storage area and reside therein against the article storage structure, so as to help maintain the article storage structure at a predetermined position within the storage area during operation of the article handling device.

15. The apparatus of claim 11, wherein the guidance apparatus includes a mechanism that co-acts with the bin-segments so as to help enforce a FIFO (First-In-First-Out) ordering of the segments in the column.

16. The apparatus of claim 15, wherein said mechanism includes one-way tabs that prevent the segments from being coupled into the column from a place other than at said one end.

17. The apparatus of claim 15, wherein flexible dividers are positioned between the columns of segments, so that when a segment is removed from a dispensing end of the column which is opposite said one end, the divider flexes into the space of the column, thereby blocking the insertion of an additional segment into the column from the dispensing end of the column.

18. The apparatus of claim 11, wherein the receiving devices comprise openings near one end of the guidance apparatus, which openings provide access for respective ones of article storage segments to be admitted into respective ones of the plurality of paraxially aligned article storage columns.

19. The apparatus of claim 18, where the movable article storage structure comprises a refillable article storage magazine having a 2 by 1+N matrix (where N=0 or a positive integer), and the openings comprise openings in the bottom of opposed sidewalls that are used to form an outside perimeter for the magazine.

20. The apparatus of claim 11, further including bin segments having a standardized size for use within the columns of the magazine.

21. The apparatus of claim 20, further including resizing means which change the interior shape of the bin segment so as to accommodate articles of different size.

22. The apparatus of claim 21, wherein the resizing means is integrally formed with the bin segments.

23. The apparatus of claim 22, wherein the resizing means comprises a spacer which when inserted into a bin segment, changes the interior shape/size thereof so as to accommodate the articles of different size.

24. The apparatus of claim 11, wherein the guidance apparatus includes a track extending in a columnar direction from the one end to a dispensing end of the column which is opposite said one end.

25. An article handling apparatus having a removable article storage structure from which said article handling apparatus obtains said articles to be handled, said removable article storage structure including:

a. a guidance apparatus adapted for individually guiding cartridges of pre-packaged groups of articles to be handled, so as to form therewith a plurality of axially aligned article storage columns; the guidance apparatus including, b. a receiving device which provides individual coupling to the cartridges, so as to allow serial loading of the cartridges into the plurality of axially aligned article storage columns.

26. The apparatus of claim 25, wherein the removable article storage structure comprises a refillable article storage magazine having a bottom portion and an elongated upper portion supported by the bottom portion for providing the guidance apparatus.

27. The apparatus of claim 26, wherein the upper portion comprises an intersecting arrangement of walls, arranged so as to form a matrix of columns.

28. The apparatus of claim 26, wherein the guidance apparatus comprises a track guidance apparatus mounted in said removable article storage structure so as to extend upward in the columnar direction from the bottom portion of the article storage structure.

29. The apparatus of claim 28, wherein the track guidance apparatus is free-standing in its extension from the bottom portion.

30. The apparatus of claim 28, wherein the track guidance apparatus is attached to walls that extend up from the bottom portion in the columnar direction.

31. The apparatus of claim 26, wherein the receiving devices comprise magnetic couplings that slide on the guidance apparatus.

32. The apparatus of claim 25, wherein the receiving devices comprise openings near the bottom of the guidance apparatus, which openings provide access for respective ones of the article storage cartridges to be admitted into respective ones of the plurality of axially aligned article storage columns.

* * * * *